US012785226B2

(12) United States Patent
Hwangbo et al.

(10) Patent No.: US 12,785,226 B2
(45) Date of Patent: Nov. 3, 2026

(54) CYLINDRICAL BATTERY, AND BATTERY PACK AND VEHICLE INCLUDING THE SAME

(71) Applicant: LG ENERGY SOLUTION, LTD., Seoul (KR)

(72) Inventors: Kwang-Su Hwangbo, Daejeon (KR); Jae-Won Lim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 407 days.

(21) Appl. No.: 18/699,681

(22) PCT Filed: Oct. 21, 2022

(86) PCT No.: PCT/KR2022/016207
§ 371 (c)(1),
(2) Date: Apr. 9, 2024

(87) PCT Pub. No.: WO2023/068897
PCT Pub. Date: Apr. 27, 2023

(65) Prior Publication Data

US 2025/0239747 A1 Jul. 24, 2025

(30) Foreign Application Priority Data

Oct. 22, 2021 (KR) ........................ 10-2021-0142182

(51) Int. Cl.
*H01M 2/02* (2006.01)
*H01M 50/152* (2021.01)
(Continued)

(52) U.S. Cl.
CPC ....... *H01M 50/559* (2021.01); *H01M 50/152* (2021.01); *H01M 50/188* (2021.01);
(Continued)

(58) Field of Classification Search
CPC ............. H01M 50/559; H01M 50/586; H01M 50/567; H01M 50/528; H01M 50/531;
(Continued)

(56) References Cited

U.S. PATENT DOCUMENTS

2001/0004505 A1 6/2001 Kim et al.
2005/0014064 A1 * 1/2005 Matsubara .......... H01M 50/562 429/180

(Continued)

FOREIGN PATENT DOCUMENTS

CN 105810875 A 7/2016
CN 111656574 A 9/2020

(Continued)

OTHER PUBLICATIONS

Machine translation of CN-113346201-A, published on Sep. 3, 2021.

(Continued)

*Primary Examiner* — Raymond Alejandro
(74) *Attorney, Agent, or Firm* — Birch, Stewart, Kolasch & Birch, LLP

(57) ABSTRACT

Disclosed is a battery, which includes an electrode assembly; a battery housing accommodating the electrode assembly through an open portion; a current collecting plate having a support portion, a plurality of uncoated portion coupling portions coupled to the first uncoated portion, and a plurality of first housing coupling portions coupled to an inner surface of the battery housing; a cap plate covering the open portion; an electrode terminal riveted through a perforated hole formed in a closed portion of the battery housing and electrically coupled to the second uncoated portion; and an insulating gasket interposed between the electrode terminal and the perforated hole, wherein the electrode terminal includes a body portion; an outer flange portion; an inner (Continued)

flange portion; and a flat portion provided on an inner side of the inner flange portion.

31 Claims, 36 Drawing Sheets

(51) Int. Cl.

| | |
|---|---|
| ***H01M 50/188*** | (2021.01) |
| ***H01M 50/528*** | (2021.01) |
| ***H01M 50/531*** | (2021.01) |
| ***H01M 50/559*** | (2021.01) |
| ***H01M 50/567*** | (2021.01) |
| ***H01M 50/586*** | (2021.01) |
| ***H01M 50/588*** | (2021.01) |
| *H01M 50/107* | (2021.01) |

(52) U.S. Cl.
CPC ....... *H01M 50/528* (2021.01); *H01M 50/531* (2021.01); *H01M 50/567* (2021.01); *H01M 50/586* (2021.01); *H01M 50/588* (2021.01); *H01M 50/107* (2021.01)

(58) Field of Classification Search
CPC ............. H01M 50/152; H01M 50/188; H01M 50/588; H01M 50/107
See application file for complete search history.

(56) References Cited

U.S. PATENT DOCUMENTS

| | | | | |
|---|---|---|---|---|
| 2006/0063069 | A1 | 3/2006 | Kim | |
| 2007/0202364 | A1 | 8/2007 | Uh et al. | |
| 2010/0310927 | A1* | 12/2010 | Imai .................... | H01M 50/538 429/246 |
| 2018/0287104 | A1* | 10/2018 | Urushihara ......... | H01M 50/188 |
| 2020/0106098 | A1 | 4/2020 | Kobayashi | |
| 2021/0043918 | A1 | 2/2021 | Maeyama et al. | |
| 2023/0118425 | A1 | 4/2023 | Kadowaki et al. | |
| 2023/0335868 | A1 | 10/2023 | Wang et al. | |
| 2024/0128608 | A1 | 4/2024 | Kang et al. | |
| 2024/0222815 | A1 | 7/2024 | Lim et al. | |
| 2024/0258619 | A1 | 8/2024 | Lim et al. | |
| 2025/0105470 | A1 | 3/2025 | Lim et al. | |
| 2025/0239747 | A1 | 7/2025 | Hwangbo et al. | |

FOREIGN PATENT DOCUMENTS

| | | | |
|---|---|---|---|
| CN | 112151732 | A | 12/2020 |
| CN | 113224472 | A | 8/2021 |
| CN | 113346201 | A | 9/2021 |
| CN | 219350420 | U | 7/2023 |
| EP | 3 920 275 | A1 | 12/2021 |
| JP | 60-7058 | A | 1/1985 |
| JP | 60-105165 | A | 6/1985 |
| JP | 11-297301 | A | 10/1999 |
| JP | 2000-58024 | A | 2/2000 |
| JP | 2003-86171 | A | 3/2003 |
| JP | 2004-296388 | A | 10/2004 |
| JP | 2006-93145 | A | 4/2006 |
| JP | 2007-234586 | A | 9/2007 |
| JP | 2009-110885 | A | 5/2009 |
| JP | 2016-225014 | A | 12/2016 |
| JP | 2017-130387 | A | 7/2017 |
| JP | 2018-125305 | A | 8/2018 |
| JP | 2019-102439 | A | 6/2019 |
| JP | 2019-160550 | A | 9/2019 |
| KR | 10-2001-0022031 | A | 3/2001 |
| KR | 2001-0056363 | A | 7/2001 |
| KR | 10-2008-0094662 | A | 9/2005 |
| KR | 10-0599793 | B1 | 7/2006 |
| KR | 10-0560512 | B1 | 8/2006 |
| KR | 10-0786871 | B1 | 12/2007 |
| KR | 10-0882915 | B1 | 2/2009 |
| KR | 10-1679413 | B1 | 11/2016 |
| KR | 10-2020-0094453 | A | 8/2020 |
| WO | WO 2020/202708 | A1 | 10/2020 |
| WO | WO 2021/145438 | A1 | 7/2021 |
| WO | WO 2022/177371 | A1 | 8/2022 |
| WO | WO 2023/068887 | A1 | 4/2023 |
| WO | WO 2023/068892 | A1 | 4/2023 |
| WO | WO 2023/101352 | A1 | 6/2023 |

OTHER PUBLICATIONS

European Communication pursuant to Article 94(3) EPC for European Application No. 22 884 118.5, dated Jan. 2, 2026.
Extended European Search Report for European Application No. 22884118.5, dated May 19, 2025.
International Search Report (PCT/ISA/210) issued in PCT/KR2022/016207, dated Feb. 1, 2023.

* cited by examiner

Conventional Art

Conventional Art

Conventional Art

Conventional Art

New CNT

Existing CNT

| Property | | Existing CNT | New CNT |
|---|---|---|---|
| Powder | Specific Surface Area($m^2/g$) | 200~300 | 300~450 |
| | Diameter (nm) | 10 | 3~6 |
| | Wall Number | 9~14 | 2~5 |

| | #1 | #2 | #3 | #4 | #6 |
|---|---|---|---|---|---|
| Item | Existing CNT | New CNT | | | |
| Conductive Material Content | 0.90% | 0.45% | 0.50% | 0.55% | 0.6% |
| Solid Content | 67% | 73% | 72% | 71% | 70.5% |
| Viscosity (cp) | 7,000 | 8,500 | 6,400 | 6,900 | 6,600 |
| MP Coating Layer | 10.57 | 13.44 | 13.67 | 10.03 | 9.55 |
| MP Interface Layer | 0.095 | 0.106 | 0.070 | 0.061 | 0.053 |

CYLINDRICAL BATTERY, AND BATTERY PACK AND VEHICLE INCLUDING THE SAME

TECHNICAL FIELD

The present disclosure relates to a cylindrical battery, and a battery pack and a vehicle including the cylindrical battery.

The present application claims priority to Korean Patent Application No. 10-2021-0142182 filed on Oct. 22, 2021 in the Republic of Korea, the disclosures of which are incorporated herein by reference.

BACKGROUND ART

Conventional cylindrical batteries generally have a structure in which a tab connecting a jelly-roll and an external terminal is welded to a foil of the jelly-roll. In a cylindrical battery with this structure, the path of current is limited, and the resistance of the jelly-roll itself is inevitably very high.

Accordingly, a method of lowering the resistance by increasing the number of tabs connecting the jelly-roll and the external terminal has been attempted, but increasing the number of tabs in this way has a limit in lowering the resistance to a desired level and securing a sufficient current path.

Accordingly, it is necessary to develop a new jelly-roll structure and a current collecting plate structure suitable for the jelly-roll structure to reduce the resistance of the jelly-roll. In particular, the application of such a new structured jelly-roll and current collecting plate is more necessary for devices that require a battery pack with high output/high capacity, such as, for example, an electric vehicle.

In addition, the battery pack applied to an electric vehicle or the like is inevitably exposed to a lot of vibration and shock when considering the use environment. Therefore, there is a need to develop a cylindrical battery having a structure in which there is little risk of damage to the welded portion even when vibration and external impact are applied, and a current collecting plate structure applied to the cylindrical battery.

Meanwhile, secondary batteries that are easily applicable to various product groups and have electrical characteristics such as high energy density are universally applied not only to portable devices but also to electric vehicles (EVs) or hybrid electric vehicles (HEVs) driven by an electric drive source.

These secondary batteries are attracting attention as a new energy source to improve eco-friendliness and energy efficiency because they have the primary advantage that they can dramatically reduce the use of fossil fuels as well as the secondary advantage that no by-products are generated from the use of energy.

Secondary batteries currently widely used in the art include lithium ion batteries, lithium polymer batteries, nickel cadmium batteries, nickel hydrogen batteries, nickel zinc batteries, and the like. Such a unit secondary battery cell has an operating voltage of about 2.5V to 4.5V. Therefore, when a higher output voltage is required, a battery pack is configured by connecting a plurality of battery cells in series. In addition, a plurality of battery cells may be connected in parallel to form a battery pack according to the charge/discharge capacity required for the battery pack. Accordingly, the number of battery cells included in the battery pack and the form of electrical connection may be variously set according to the required output voltage and/or charge/discharge capacity.

Meanwhile, as a kind of secondary battery cell, there are known cylindrical, rectangular, and pouch-type battery cells. In the case of a cylindrical battery cell, a separator serving as an insulator is interposed between a positive electrode and a negative electrode, and they are wound to form an electrode assembly in the form of a jelly roll, which is inserted into a battery housing together with an electrolyte to configure a battery. In addition, a strip-shaped electrode tab may be connected to an uncoated portion of each of the positive electrode and the negative electrode, and the electrode tab electrically connects the electrode assembly and an electrode terminal exposed to the outside. For reference, the positive electrode terminal is a cap plate of a sealing body that seals the opening of the battery housing, and the negative electrode terminal is the battery housing.

However, according to the conventional cylindrical battery cell having such a structure, since current is concentrated in the strip-shaped electrode tab coupled to the uncoated portion of the positive electrode and/or the uncoated portion of the negative electrode, the current collection efficiency is not good due to large resistance and large heat generation.

For small cylindrical battery cells with a form factor of 18650 or 21700, resistance and heat are not a major issue. However, when the form factor is increased to apply the cylindrical battery cell to an electric vehicle, the cylindrical battery cell may ignite while a lot of heat is generated around the electrode tab during the rapid charging process.

In order to solve this problem, there is provided a cylindrical battery cell (so-called tab-less cylindrical battery cell) in which the uncoated portion of the positive electrode and the uncoated portion of the negative electrode are designed to be positioned at the top and bottom of the jelly-roll type electrode assembly, respectively, and the current collecting plate is welded to the uncoated portion to improve the current collecting efficiency.

FIGS. 1 to 4 are diagrams showing a process of manufacturing a tab-less cylindrical battery. FIG. 1 shows the structure of an electrode, FIG. 2 shows a process of winding the electrode, and FIG. 3 shows a process of welding a current collecting plate to a bent surface of an uncoated portion. FIG. 4 is a sectional view showing a tab-less cylindrical battery, taken along the longitudinal direction Y.

Referring to FIGS. 1 to 4, a positive electrode 210 and a negative electrode 211 have a structure in which a sheet-shaped current collector 220 is coated with an active material 221, and include an uncoated portion 222 at one long side along the winding direction X.

An electrode assembly A is manufactured by sequentially stacking the positive electrode 210 and the negative electrode 211 together with two sheets of separators 212 as shown in FIG. 2 and then winding them in one direction X. At this time, the uncoated portions of the positive electrode 210 of the negative electrode 211 are arranged in opposite directions.

After the winding process, the uncoated portion **210*a* of the positive electrode 210 and the uncoated portion 211*a* of the negative electrode 211 are bent toward the core. After that, current collecting plates 230, 231 are welded and coupled to the uncoated portions 210*a*, 211*a***, respectively.

An electrode tab is not separately coupled to the positive electrode uncoated portion **210*a* and the negative electrode uncoated portion 211*a*, the current collecting plates 230, 231** are connected to external electrode terminals, and a current path is formed with a large cross-sectional area along the winding axis direction of electrode assembly A (see arrow), which has an advantage of lowering the resistance of the battery. This is because resistance is inversely proportional to the cross-sectional area of the path through which the current flows.

However, when the form factor of the cylindrical battery increases and the magnitude of the charging current during rapid charging increases, the heat problem occurs again in the tab-less cylindrical battery.

Specifically, the conventional tab-less cylindrical battery 240 includes a battery housing 241 and a sealing body 242 as shown in FIG. 4. The sealing body 242 includes a cap plate 242*a*, a sealing gasket 242*b* and a connection plate 242*c*. The sealing gasket 242*b* surrounds the edge of the cap plate 242*a* and is fixed by a crimping portion 243. In addition, the electrode assembly A is fixed in the housing 241 by a beading portion 244 to prevent vertical movement.

Typically, the positive electrode terminal is the cap plate 242*a* of the sealing body 242, and the negative electrode terminal is the battery housing 241. Therefore, the current collecting plate 230 coupled to the uncoated portion 210*a* of the positive electrode 210 is electrically connected to the connection plate 242*c* attached to the cap plate 242*a* through the lead 245 in a strip form. In addition, the current collecting plate 231 coupled to the uncoated portion 211*a* of the negative electrode 211 is electrically connected to the bottom of the housing 241. The insulator 246 covers the current collecting plate 230 to prevent the battery housing 241 and the uncoated portion 210*a* of the positive electrode 210 having different polarities from contacting each other and causing a short circuit.

When the current collecting plate 230 is connected to the connection plate 242*c*, the lead 245 of a strip form is used. The lead 245 is separately attached to the current collecting plate 230 or is manufactured integrally with the current collecting plate 230. However, since the lead 245 is in the form of a thin strip, its sectional area is small, and thus, when a rapid charging current flows, a lot of heat is generated. In addition, excessive heat generated from the lead 245 is transferred toward the electrode assembly A to shrink the separator 212, which may cause an internal short circuit that is a main cause of thermal runaway.

The lead 245 also occupies a significant installation space inside the battery housing 241. Therefore, the cylindrical battery 240 including the lead 245 has low space efficiency, so there is a limit in increasing the energy density.

Moreover, in order to connect the conventional tab-less cylindrical batteries 240 in series and/or parallel, it is necessary to connect a bus bar component to the cap plate 242*a* of the sealing body 242 and the bottom surface of the housing 241, so space efficiency is reduced. A battery pack mounted to an electric vehicle includes hundreds of cylindrical batteries 240. Accordingly, the inefficiency of the electrical wiring causes considerable inconvenience in the electric vehicle assembling process and the maintenance of the battery pack.

On the other hand, by applying a conventional positive electrode active material containing secondary particles, particle breakage may occur during electrode manufacturing, and the amount of gas generated due to internal cracking during charging and discharging may increase, which may cause problems with battery stability.

To solve this problem, a positive electrode active material in the form of a single particle or pseudo-single particle having a relatively large primary particle size has been developed. However, if the positive electrode active material in the form of a single particle or pseudo-single particle is applied to a high loading electrode and then rolling is performed, there is a problem in that the electrode is broken in a state where the electrode porosity is not achieved to a target level, and there is a problem in that the resistance characteristics and charge/discharge efficiency of the lithium secondary battery are not good.

DISCLOSURE

Technical Problem

The present disclosure is designed to solve the problems of the related art, and therefore the present disclosure is directed to providing a current collecting plate having a structure suitable for an electrode assembly having a low resistance structure, and a cylindrical battery including the same.

The present disclosure is also directed to providing a current collecting plate having a structure that may greatly reduce the possibility of damage to a welded portion with an electrode assembly and/or a welded portion with a battery housing even when vibration and impact are applied, and a cylindrical battery including the same.

The present disclosure is also directed to providing a current collecting plate having a structure capable of increasing the convenience of a welding process for electrical connection between a battery housing and a current collecting plate in manufacturing a cylindrical battery, thereby improving productivity, and a cylindrical battery including the same.

Meanwhile, the present disclosure is designed to solve the problems of the related art, and the present disclosure is also directed to reducing the internal resistance of a cylindrical battery cell and increase the energy density by improving the electrode terminal structure of the cylindrical battery to increase space efficiency a the battery housing.

The present disclosure is also directed to solving the internal heating problem during rapid charging by improving the electrode terminal structure of the cylindrical battery cell to enlarge the cross-sectional area of the current path.

The present disclosure is also directed to providing a cylindrical battery cell with an improved structure capable of performing electrical wiring work for serial and/or parallel connection of cylindrical battery cells on one side of the cylindrical battery cells.

The present disclosure is also directed to providing a battery pack manufactured using the cylindrical battery cells having an improved structure and a vehicle including the battery pack.

The present disclosure is also directed to providing an electrode that can implement excellent thermal stability, high electrical conductivity and high rolling characteristics by applying single particles or pseudo-single particles as a positive electrode active material, and an electrode assembly including the same.

The present disclosure is also directed to providing an electrode assembly with improved energy density by including a silicon-based negative electrode active material in the negative electrode.

The present disclosure is also directed to providing an electrode assembly in which the range of the positive electrode active material portion is increased without worrying about lithium precipitation.

The present disclosure is also directed to providing a cylindrical battery capable of exhibiting excellent thermal stability even when the volume of the battery increases due to an increase in form factor.

However, the technical object to be solved by the present disclosure is not limited to the above, and other objects not mentioned herein will be clearly understood by those skilled in the art from the following disclosure.

Technical Solution

In one aspect of the present disclosure, there is provided a battery, comprising: an electrode assembly including a first electrode having a first uncoated portion and a second electrode having a second uncoated portion; a battery housing configured to accommodate the electrode assembly through an open portion, a current collecting plate having a support portion disposed on a first surface of the electrode assembly, a plurality of uncoated portion coupling portions extending from the support portion and coupled to the first uncoated portion, and a plurality of first housing coupling portions extending from the support portion and coupled to an inner surface of the battery housing; a cap plate configured to cover the open portion; an electrode terminal riveted through a perforated hole formed in a closed portion of the battery housing provided opposite to the open portion and electrically coupled to the second uncoated portion; and an insulating gasket interposed between the electrode terminal and the perforated hole, wherein the electrode terminal includes: a body portion inserted into the perforated hole; an outer flange portion configured to extend along an outer surface of the closed portion of the battery housing from a circumference of the body portion exposed through the outer surface of the closed portion; an inner flange portion configured to extend from a circumference of the body portion exposed through an inner surface of the closed portion; and a flat portion provided on an inner side of the inner flange portion.

The first housing coupling portion may be coupled to a beading portion of the battery housing.

The first housing coupling portion may include a first contact portion coupled to the inner surface of the battery housing; and a first connection portion for connecting the support portion and the first contact portion.

At least a part of the first contact portion may have a curved shape extending along an inner circumference of the battery housing.

The first connection portion may include a first bending portion in which an extension direction of the first connection portion is changed.

The current collecting plate may further include a second housing coupling portion extending from an end of the uncoated portion coupling portion and coupled to the inner surface of the battery housing.

The second housing coupling portion may include a second contact portion coupled to the inner surface of the battery housing; and a second connection portion for connecting the uncoated portion coupling portion and the second contact portion.

At least a part of the second contact portion may have a curved shape extending along an inner circumference of the battery housing.

The second connection portion may include a second bending portion in which an extension direction of the second connection portion is changed.

The flat portion of the electrode terminal and the inner surface of the closed portion may be parallel to each other.

An angle between the inner flange portion and the inner surface of the closed portion may be 0 degrees to 60 degrees.

A recess portion may be provided between the inner flange portion and the flat portion.

The recess portion may have a cross section of an asymmetric groove.

The asymmetrical groove may include a sidewall of the flat portion and an inclined surface of the inner flange portion connected to an end of the sidewall of the flat portion.

The sidewall of the flat portion may be perpendicular to the inner surface of the closed portion.

A thickness of the inner flange portion may decrease in a direction extending away from the body portion.

The insulating gasket may include an outer gasket interposed between the outer flange portion and the outer surface of the closed portion; and an inner gasket interposed between the inner flange portion and the inner surface of the closed portion, and the inner gasket and the outer gasket may have different thicknesses depending on positions thereof.

A thickness of the insulating gasket in an area interposed between an inner edge of the perforated hole and the inner flange portion may be smaller than a remainder of the insulating gasket.

The inner edge of the perforated hole may include an opposing surface facing the inner flange portion.

The inner gasket may extend further from the electrode terminal than the inner flange portion.

A height of the flat portion from the inner surface of the closed portion may be greater than or equal to a height of an end of the inner gasket from the inner surface of the closed portion.

A height of the flat portion from the inner surface of the closed portion may be greater than or equal to a height of an end of the inner flange portion from the inner surface of the closed portion.

An active material layer of the second electrode may include a positive electrode active material containing a single particle, a pseudo-single particle, or a combination thereof, $D_{min}$, which a minimum particle size in a cumulative volume distribution of the positive electrode active material, may be 1.0 μm or more; in the volume cumulative distribution of the positive electrode active material, $D_{50}$, which is a particle size when a volume cumulative amount is 50%, may be 5.0 μm or less, and $D_{max}$, which is a maximum particle size in the volume cumulative distribution of the positive electrode active material, may be 12 μm to 17 μm.

The positive electrode active material may have a unimodal particle size distribution showing a single peak in a volume cumulative particle size distribution graph, and the particle size distribution (PSD) represented by the following formula may be 3 or less:

$$PSD = (D_{max} - D_{min})/D_{50}.$$

The single particle, the pseudo-single particle, or the combination thereof may be included in an amount of 95 wt % to 100 wt % based on a total weight of the positive electrode active material included in the active material layer of the second electrode.

The positive electrode active material may include 80 mol % or more of Ni based on the total number of moles of a transition metal.

The active material layer of the second electrode may have a porosity of 15% to 23%, and the active material layer of the first electrode may contain flake graphite in a weight ratio of 0.05 wt % to 5 wt %.

An active material layer of the first electrode may include a silicon-based negative electrode active material and a carbon-based negative electrode active material, and the silicon-based negative electrode active material and the carbon-based negative electrode active material may be included in a weight ratio of 1:99 to 20:80.

In another aspect of the present disclosure, there is also provided a battery pack, comprising a battery according to an embodiment of the present disclosure as above, and a pack housing configured to accommodate the plurality of batteries.

In another aspect of the present disclosure, there is also provided a vehicle, comprising the battery pack according to an embodiment of the present disclosure as above.

Advantageous Effects

According to the present disclosure, it is possible to greatly reduce resistance in electrically connecting the electrode assembly and the battery housing.

In addition, according to the present disclosure, even when vibration and impact are applied in using a secondary battery, it is possible to greatly reduce the possibility of damage to a welded portion between the current collecting plate and the electrode assembly and/or a welded portion between the current collecting plate and the battery housing.

In addition, according to the present disclosure, in manufacturing a cylindrical battery, it is possible to increase the convenience of a welding process for electrical connection between the battery housing and the current collecting plate, thereby improving productivity.

Meanwhile, according to an aspect of the present disclosure, by improving the electrode terminal structure of the cylindrical battery cell to increase the space efficiency in the housing, it is possible to lower the internal resistance of the cylindrical battery cell and increase the energy density.

According to another aspect of the present disclosure, by improving the structure of the electrode terminal of the cylindrical battery cell to enlarge the sectional area of the current path, it is possible to improve the problem of internal heat generated during rapid charging.

According to still another aspect of the present disclosure, an electrical wiring operation for serial and/or parallel connection of the cylindrical battery cells may be performed at one side of the cylindrical battery cells.

According to still another aspect of the present disclosure, it is possible to provide a battery pack manufactured using the cylindrical battery cell having an improved structure and a vehicle including the same.

According to still another aspect of the present disclosure, since the positive electrode includes positive electrode active material powder having $D_{min}$ of 1.0 μm or more, thermal safety of the battery may be further improved. According to the study by inventors of the present discloser, even if a single particle and/or pseudo-single particle is applied as the positive electrode active material, the effect of suppressing particle breakage and improving thermal safety after rolling is different depending on the particle size of the positive electrode active material powder. In particular, when particles with a particle diameter of less than 1.0 μm are included in the positive electrode active material powder, the line pressure increases during the rolling process, resulting in increased particle breakage and reduced thermal stability, so it is impossible to sufficiently secure thermal stability when applying a large-sized cylindrical battery. Therefore, in the present disclosure, the effect of improving thermal safety can be maximized by using a positive electrode active material powder having a minimum particle size ($D_{min}$) controlled to 1.0 μm or more.

According to still another aspect of the present disclosure, since the positive electrode contains a positive electrode active material powder whose $D_{50}$, $D_{max}$, and particle size distribution (SD) are appropriately adjusted so as to minimize the increase in resistance due to single particle application, it is possible to implement excellent capacity characteristics and power characteristics.

According to still another aspect of the present disclosure, the conductivity of the electrode can be improved by including a single particle-based positive electrode active material coated with a conductive coating layer or by containing new CNT as a conductive material.

According to still another aspect of the present disclosure, since the positive electrode active material layer contains flake graphite, when the positive electrode active material layer is rolled, the flake graphite provides a sliding effect to the positive electrode active material, so that the rolling properties of the electrode are improved, and the electrode porosity can be lowered to the target level. Accordingly, stability, initial resistance characteristics, and charge/discharge efficiency of the cylindrical battery are improved.

According to still another aspect of the present disclosure, a higher energy density can be implemented by including a silicon-based negative electrode active material with a large capacity in the negative electrode.

According to still another aspect of the present disclosure, since a loading reduction portion with a small loading amount of the positive electrode active material is included in the positive electrode, the range of the positive electrode active material portion can be increased without worrying about lithium precipitation.

According to still another aspect of the present disclosure, compared to a conventional battery having a strip-shaped electrode tab, internal heat generation of the battery can be effectively reduced, so the thermal safety of the battery can be improved.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
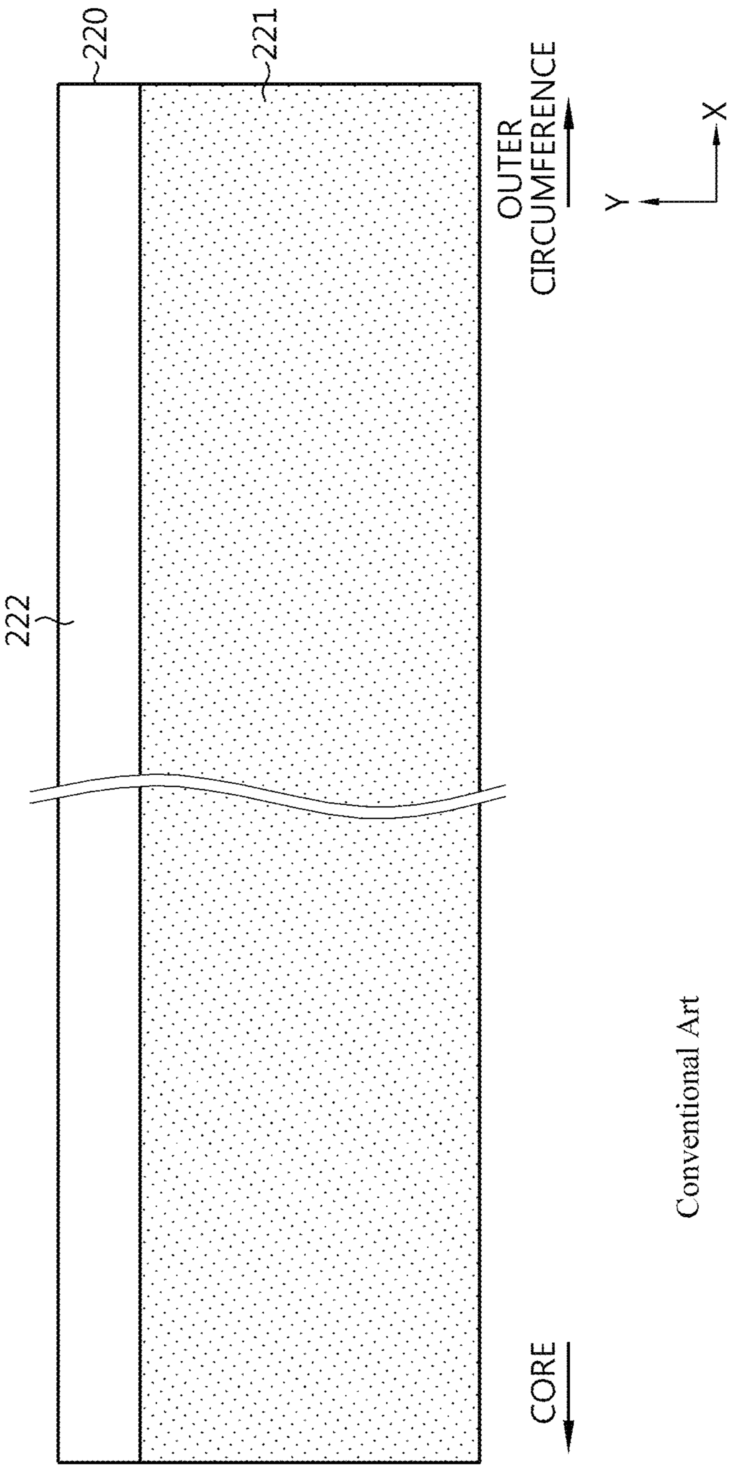
FIG. 1 is a plan view showing a structure of an electrode used for a conventional tab-less cylindrical battery.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In addition, in order to help the understanding of the present disclosure, the accompanying drawings are not drawn to scale, but dimensions of some components may be exaggerated. Also, the same reference signs may be assigned to the same components in different embodiments.

Since the size and thickness of each component shown in the drawings are arbitrarily illustrated for convenience of description, the present disclosure is not necessarily limited to the drawings. In the drawings, the thickness is shown enlarged to clearly express the various layers and regions. In addition, in the drawings, for convenience of explanation, the thicknesses of some layers and regions are exaggerated.

In addition, when a part such as a layer, film, region, plate, etc. is described to be "above" or "on" another part, this includes not only the case where it is "directly on" another part, but also the case where still another part exists therebetween. Conversely, when a part is described to be "directly on" another part, it means that there is no other part therebetween. In addition, to be "above" or "on" a reference part means to be located above or below the reference part, and does not mean to be located "above" or "on" in a direction opposite to gravity.

In addition, throughout the specification, when a certain part is described to "include" a certain component, it means that it may further include other components without excluding other components, unless otherwise stated.

In addition, throughout the specification, when it is referred to as "in a planar form", it means when the target part is viewed from above, and when it is referred to as "in a cross-sectional form", it means when the target part is vertically cut and viewed from the side.

Figure 5:
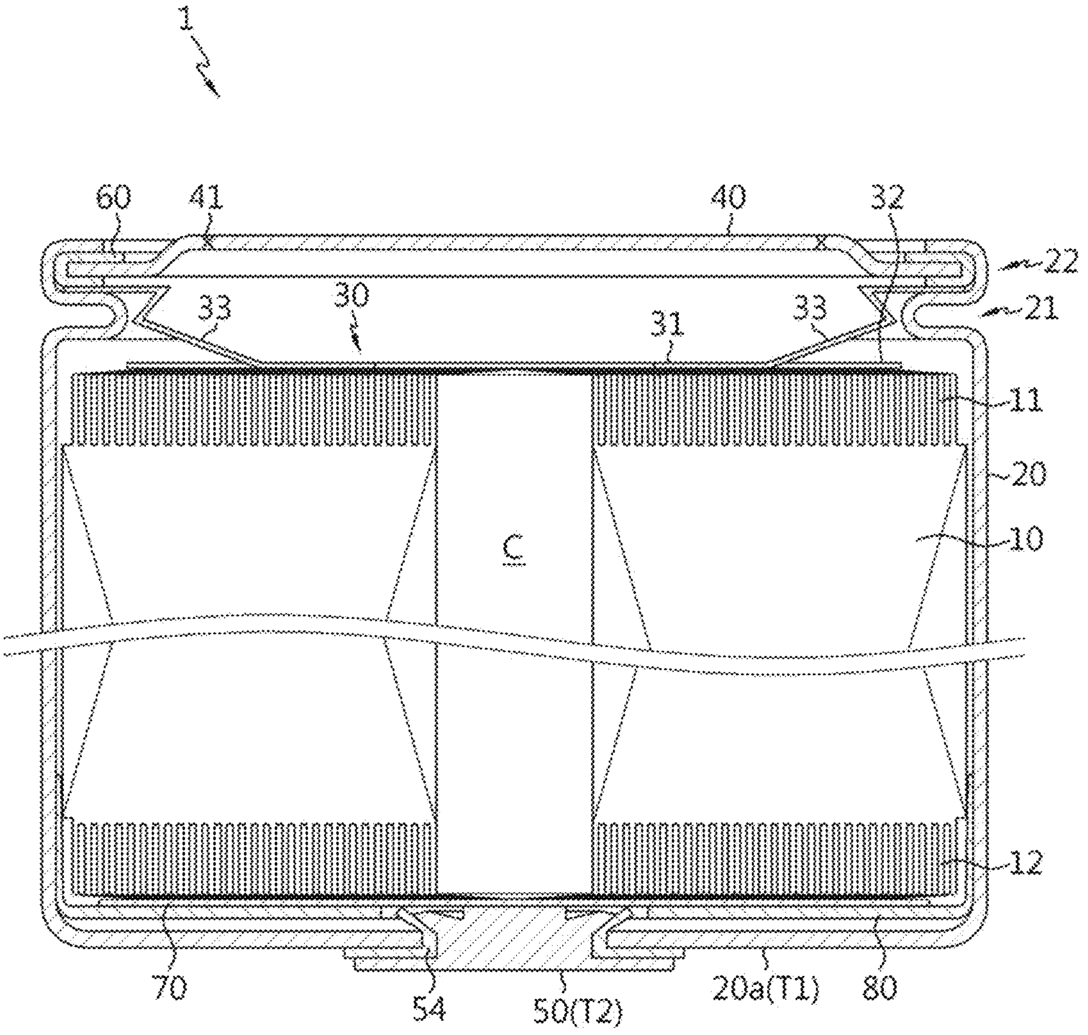
FIG. 5 is a cross-sectional view showing the internal structure of a cylindrical battery according to an embodiment of the present disclosure.

First, referring to FIG. 5, the cylindrical battery 1 according to an embodiment of the present disclosure includes an electrode assembly 10, a battery housing 20, a current collecting plate (first current collecting plate) 30, a cap plate 40, and an electrode terminal 50. The cylindrical battery 1 may further include a sealing gasket 60 and/or an insulating gasket 54 and/or a second current collecting plate 70 and/or an insulator 80 in addition to the above.

The electrode assembly 10 includes a first electrode having a first uncoated portion (first electrode tab) 1l and a second electrode having a second uncoated portion (second electrode tab) 12. The electrode uncoated portion or the uncoated portion referred to below means an electrode tab. The electrode assembly 10 may include a first electrode having a first polarity, a second electrode having a second polarity, and a separator interposed between the first electrode and the second electrode. The electrode assembly 10 may be manufactured by winding a stack, which is formed by sequentially stacking the first electrode, the separator and the second electrode, at least once. That is, the electrode assembly 10 applied to the present disclosure may be a jelly-roll type electrode assembly. In this case, an additional separator may be provided on the outer circumference of the electrode assembly 10 to insulate the electrode assembly 10 from the battery housing 20.

The first electrode includes a first electrode current collector and a first electrode active material coated on one surface or both surfaces of the first electrode current collector. At one end in the width direction (direction parallel to the height direction of the cylindrical battery 1 shown in FIG. 5) of the first electrode current collector, there is a first uncoated portion 11 on which the first electrode active material is not coated. The first uncoated portion 11 serves as a first electrode tab. The first uncoated portion 11 is provided to an upper portion in the height direction (direction parallel to the height direction of the cylindrical battery 1 shown in FIG. 5) of the electrode assembly 10 accommodated in the battery housing 20. The first uncoated portion 11 may be, for example, a negative electrode uncoated portion.

The second electrode includes a second electrode current collector and a second electrode active material coated on one surface or both surfaces of the second electrode current collector. At the other end in the width direction (direction parallel to the height direction of the cylindrical battery 1 shown in FIG. 5) of the second electrode current collector, there is a second uncoated portion 12 on which the second electrode active material is not coated. The second uncoated portion serves as a second electrode tab. The second uncoated portion 12 is provided to a lower portion in the height direction of the electrode assembly 10 accommodated in the battery housing 20. The second uncoated portion 12 may be, for example, a positive electrode uncoated portion.

In the present disclosure, the positive electrode active material coated on the positive electrode and the negative electrode active material coated on the negative electrode may use any active materials known in the art without limitation.

The battery housing 20 is a substantially cylindrical receptor having an open portion formed on one side thereof, and is made of a conductive metal material. In general, the side surface of the battery housing 20 and the closed portion 20*a* located on the opposite side of the open portion (lower side based on FIG. 5) are integrally formed. That is, in general, the battery housing 20 has an open upper end and a closed lower end in the height direction. The lower surface of the battery housing 20 may have a substantially flat shape. The battery housing 20 accommodates the electrode assembly 10 through the open portion formed on one side in the height direction. The battery housing 20 may also accommodate an electrolyte through the open portion.

The battery housing 20 may have a beading portion 21 formed at an upper end thereof. The battery housing 20 may further include a crimping portion 22 formed on the beading portion 21. The beading portion 21 has a shape in which the periphery of the outer circumferential surface of the battery housing 20 is press-fitted to a predetermined depth. The beading portion 21 is formed on the upper portion of the electrode assembly 10. The inner diameter of the battery housing 20 in a region where the beading portion 21 is formed is smaller than the diameter of the electrode assembly 10.

The beading portion 21 provides a support surface on which the cap plate 40 may be seated. In addition, the beading portion 21 may provide a support surface on which at least a part of the edge circumference of the current collecting plate 30, explained later, may be seated and coupled. That is, on the upper surface of the beading portion 21, at least a part of the edge periphery of the current collecting plate 30 of the present disclosure and/or the edge periphery of the cap plate 40 of the present disclosure may be seated. In order to stably support at least a part of the edge periphery of the current collecting plate 30 and/or the edge periphery of the cap plate 40, the upper surface of the beading portion 21 may have an extended form along a direction substantially parallel to the lower surface of the battery housing 20, that is, along a direction substantially perpendicular to the sidewall of the battery housing 20. It is also possible that this beading portion 21 is omitted and at least a part of the edge periphery of the current collecting plate 30 is directly attached to the flat sidewall of the battery housing 20.

The crimping portion 22 is formed on the upper portion of the beading portion 21. The crimping portion 22 has an extended and bent shape to surround an edge periphery of the cap plate 40 disposed on the upper portion of the beading portion 21. Due to the shape of the crimping portion 22, the cap plate 40 is fixed on the beading portion 21. Of course, it is also possible that the crimping portion 22 is omitted and the cap plate 40 is fixed while covering the open portion of the battery housing 20 through another fixing structure.

Next, with reference to FIGS. 5 to 9, a current collecting plate (first current collecting plate) 30 according to an embodiment of the present disclosure will be described in detail.

Figure 6:
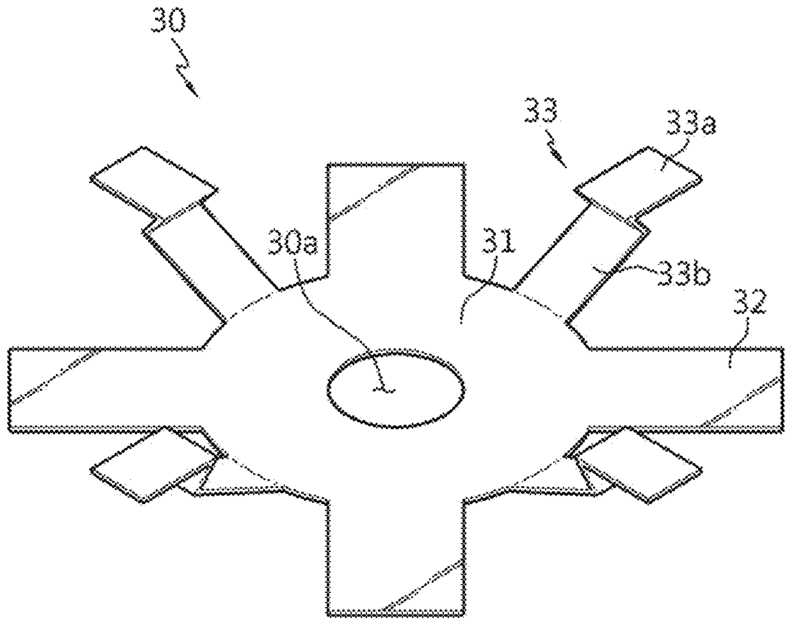
FIG. 6 is a diagram showing a current collecting plate according to an embodiment of the present disclosure.

First, referring to FIGS. 5 and 6, the current collecting plate 30 according to an embodiment of the present disclosure is accommodated inside the battery housing 20, electrically connected to the electrode assembly 10, and also electrically connected to the battery housing 20. That is, the current collecting plate 30 electrically connects the electrode assembly 10 and the battery housing 20.

The current collecting plate 30 includes a support portion 31 disposed approximately at a center on one surface of the electrode assembly 10, a plurality of uncoated portion coupling portions 32 extending from the support portion 31 and coupled to the first uncoated portion 11, and a plurality of first housing coupling portions 33 extending from the support portion 31 and coupled to the inner surface of the battery housing 20. The uncoated portion coupling portion 32 and the first housing coupling portion 33 are indirectly connected through the support portion 31 and are not directly connected to each other. Therefore, when an external impact is applied to the cylindrical battery 1 of the present disclosure, it is possible to minimize the possibility of damage to the coupling portion between the current collecting plate 30 and the electrode assembly 10 and the coupling portion between the current collecting plate 30 and the battery housing 20.

The support portion 31 and the plurality of uncoated portion coupling portions 32 are disposed on the upper portion of the electrode assembly 10, and are located below the beading portion 21 when the beading portion 21 is formed in the battery housing 20.

The support portion 31 includes a current collecting plate hole 30*a* formed at a position corresponding to the winding center hole C formed in the center of the electrode assembly 10. The winding center hole C and the current collecting plate hole 30*a* communicating with each other may function as a passage for insertion of a welding rod for welding between the electrode terminal 50, explained later, and a current collecting plate (second current collecting plate) 70 or welding between the electrode terminal 50 and a lead tab (not shown), or for laser irradiation.

The plurality of uncoated portion coupling portions 32 may have a shape extending substantially radially toward the sidewall of the battery housing 20 from the support portion 31 of the current collecting plate 30. The plurality of uncoated portion coupling portions 32 may be spaced apart from each other along the periphery of the support portion 31. Meanwhile, in order to secure the coupling force and reduce electrical resistance by increasing the coupling area between the current collecting plate 30 and electrode assembly 10, not only the uncoated portion coupling portion 32 but also the support portion 31 may be coupled with the first uncoated portion 11. An end of the first uncoated portion 11 may be formed in a bent shape parallel to the uncoated portion coupling portion 32. When the end of the first uncoated portion 11 is formed and coupled to the uncoated portion coupling portion 32 in a state parallel to the uncoated portion coupling portion 32 in this way, the coupling area may be increased to obtain an effect of improving the coupling force and reducing the electrical resistance, and the energy density may be improved by minimizing the total height of the electrode assembly 10.

The plurality of first housing coupling portions 33 may have a shape extending substantially radially toward the sidewall of the battery housing 20 from the support portion 31 of the current collecting plate 30. The plurality of first housing coupling portions 33 may be spaced apart from each other along the periphery of the support portion 31. At least one first housing coupling portion 33 may be positioned between the uncoated portion coupling portions 32 adjacent to each other. The plurality of first housing coupling portions 33 may be coupled to, for example, the beading portion 21 of the inner surface of the battery housing 20. The first housing coupling portions 33 may be particularly coupled to the upper surface of the beading portion 21. In the cylindrical battery 1 of the present disclosure, when this structure is applied, the first housing coupling portion 33 may be naturally placed on the beading portion 21 through a process of accommodating the electrode assembly 10 in a state where the current collecting plate 30 is coupled into the battery housing 20. Therefore, the process of welding the battery housing 20 and the current collecting plate 30 may be performed easily. In addition, as the upper surface of the beading portion 21 extends in a direction substantially parallel to the lower surface of the battery housing 20, that is, in a direction substantially perpendicular to the sidewall of the battery housing 20, and the first housing coupling portion 33 also extends in the same direction, the first housing coupling portion 33 may make stable contact to the beading portion 21. In addition, since the first housing coupling portion 33 is in stable contact with the beading portion 21, welding between the two components may be performed smoothly, thereby improving the coupling force between the two components and minimizing the increase in resistance at the coupling portion Next, referring to FIGS. 7 to 11, the first housing coupling portion 33 includes a first contact portion 33*a* coupled to the inner surface of the battery housing 20 and a first connection portion 33*b* for connecting the support portion 31 and the first contact portion 33*a* to each other.

The first contact portion 33*a* is coupled to the inner surface of the battery housing 20. In the case where the beading portion 21 is formed in the battery housing 20, the first contact portion 33*a* may be coupled to the beading portion 21 as described above. In this case, as described above, for stable contact and coupling, both the beading portion 21 and the first contact portion 33*a* may have a shape extending in a direction substantially parallel to the lower surface of the battery housing 20, that is, in a direction substantially perpendicular to the sidewall of the battery housing 20.

The first connection portion 33*b* may include at least one first bending portion B1 in which an extension direction is changed between the support portion 31 and the first contact portion 33*a*. That is, the first connection portion 33*b* may have a spring-like structure or bellows-like structure capable of contraction and expansion within a certain range. In this structure of the first connection portion 33*b*, even if the height distribution of the electrode assembly 10 exists within a certain range, the first contact portion 33*a* may be closely adhered on the beading portion 21 in the process of accommodating the electrode assembly 10 to which the current collecting plate 30 is coupled within the battery housing 20.

For example, the vertical distance (D) between the first contact portion 33*a* and the support portion 31 in a state where no external force is applied to the current collecting plate 30 and there is no deformation is preferably equal to the vertical distance between the upper surface of the beading portion 21 and the support portion 31 when the electrode assembly 10 is seated in the battery housing 20 or smaller within the extendable range of the first connection portion 33*b*. If the first connection portion 33*b* is configured to satisfy the above conditions, when the electrode assembly 10 to which the current collecting plate 30 is coupled is seated in the battery housing 20, the first contact portion 33*a* may naturally come into close contact with the beading portion 21.

Moreover, even if the electrode assembly 10 moves up and down due to vibration and/or shock occurring in the use of the cylindrical battery 1 (see FIG. 5), the structure capable of contraction and expansion of the first connection portion 33*b* may alleviate the impact caused by the movement of the electrode assembly 10. That is, the structure capable of contraction and expansion of the first connection portion 33*b* may act as a buffer so that an impact is not transmitted to the coupling portion between the first contact portion 33*a* and the battery housing 20 and the coupling portion between the uncoated portion coupling portion 32 and the first uncoated portion 1I (see FIGS. 5 to 9).

Figure 12:
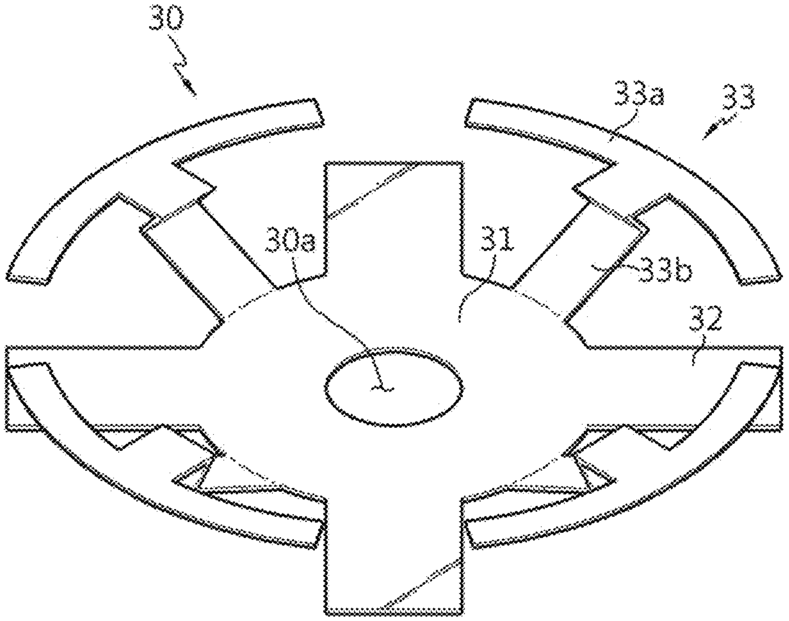
FIG. 12 is a diagram showing a current collecting plate according to another embodiment of the present disclosure.

Next, referring to FIG. 12, a current collecting plate 30 according to another embodiment of the present disclosure is shown. The current collecting plate 30 according to another embodiment of the present disclosure has a difference only in the shape of the first contact portion 33*a* compared to the current collecting plate 30 (the current collecting plate illustrated exemplarily with reference to FIG. 6) described above, and the structure of the current collecting plate 30 described above may be applied in substantially the same way.

Referring to FIGS. 5 and 12, at least a part of the first contact portion 33*a* may have a shape extending along the inner circumferential surface of the battery housing 20. In this case, in order to maximize the contact area, the current collecting plate 30 may be configured so that the sum of the extended lengths of the first contact portions 33*a* of the plurality of first housing coupling portions 33 is approximately equal to the inner circumference of the battery housing 20.

Figure 13:
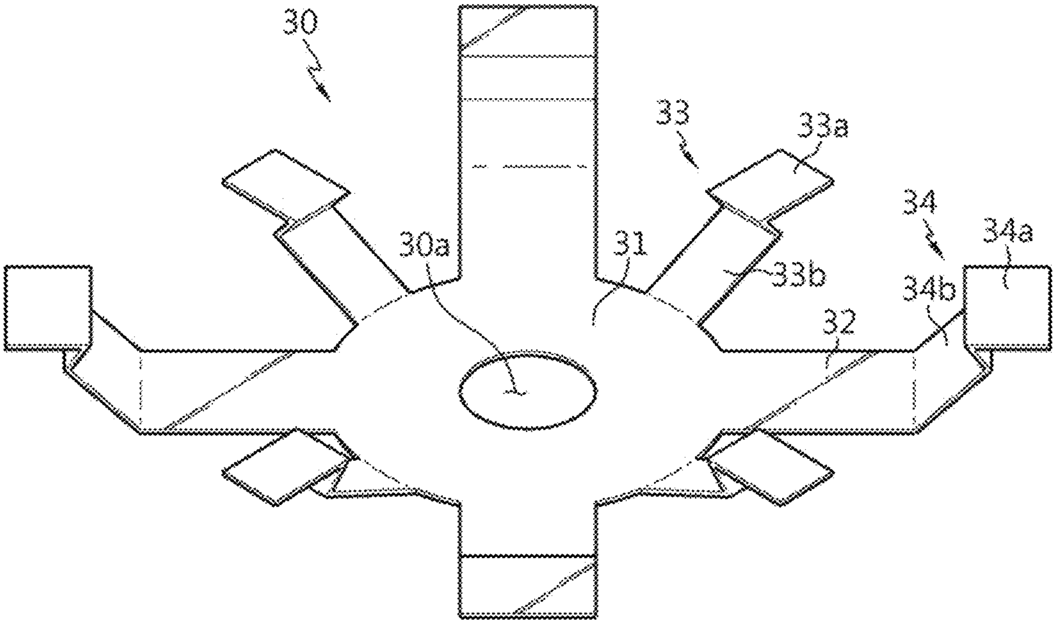
FIG. 13 is a diagram showing a current collecting plate according to still another embodiment of the present disclosure.
Figure 14:
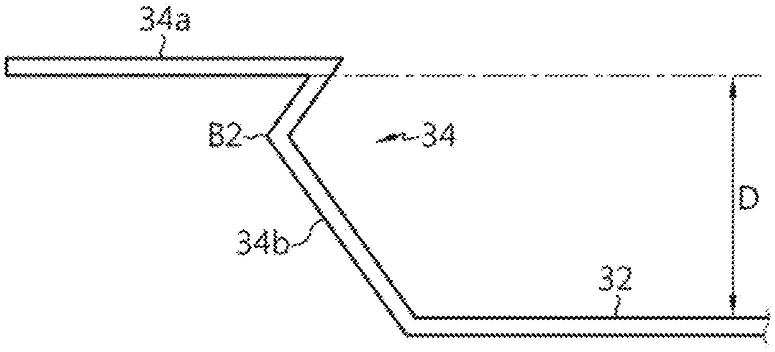
FIG. 14 is a diagram showing an exemplary form of a second connection portion of the current collecting plate shown in FIG. 13.

Next, referring to FIGS. 13 and 14, a current collecting plate 30 according to still another embodiment of the present disclosure is shown. Compared to the current collecting plates 30 according to the former embodiments (the current collecting plates illustrated exemplarily with reference to FIGS. 6 and 12), the current collecting plate 30 according to still another embodiment of the present disclosure has only a difference in that a second housing coupling portion 34 is further included, and the structure of the current collecting plates 30 described above may be applied in substantially the same way.

The second housing coupling portion 34 extends from an end of the uncoated portion coupling portion 32 and is coupled to the inner surface of the battery housing 20. The second housing coupling portion 34 is provided at an end of at least one of the plurality of the uncoated portion coupling portions 32. The second housing coupling portion 34 includes a second contact portion 34*a* coupled to the inner surface of the battery housing 20 and a second connection portion 34*b* for connecting the support portion 31 and the second contact portion 34*a* to each other.

The second contact portion 34*a* is coupled to the inner surface of the batter housing 20. In the case where the beading portion 21 is formed in the battery housing 20, the second contact portion 34*a* may be coupled to the beading portion 21, like the first contact portion 33*a* described above. In this case, as described above, for stable contact and coupling, both the beading portion 21 and the second contact portion 34*a* may have a shape extending in a direction substantially parallel to the lower surface of the battery housing 20, that is, in a direction substantially perpendicular to the sidewall of the battery housing 20.

Meanwhile, although not shown in the drawing, like the shape of the first contact portion 33*a* shown in FIG. 12, at least a part of the second contact portion 34*a* may also have a shape extending along the inner circumference of the battery housing 20. In this case, in order to maximize the contact area between the current collecting plate 30 and the battery housing 20, the current collecting plate 30 may be configured so that the sum of the extended lengths of the second contact portions 34*a* of the plurality of second housing coupling portions 34 is approximately the same as the inner circumference of the battery housing 20.

Like the first connection portion 33*b* described above, the second connection portion 34*b* may include at least one second bending portion B2 in which an extension direction is changed between the uncoated portion coupling portion 32 and the second contact portion 34*a*. The second connection portion 34*b* has a structure capable of contraction and expansion due to the formation of the second bending portion B2, and thus has an advantage in the assembly process of the cylindrical battery 1 and a buffering effect, which is the same as described above.

Figure 8:
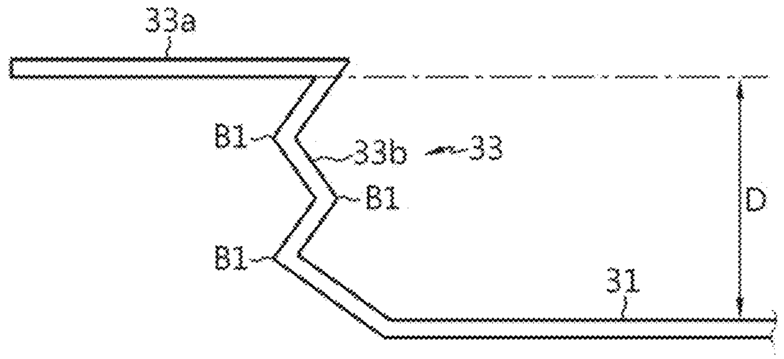
Figure 9:
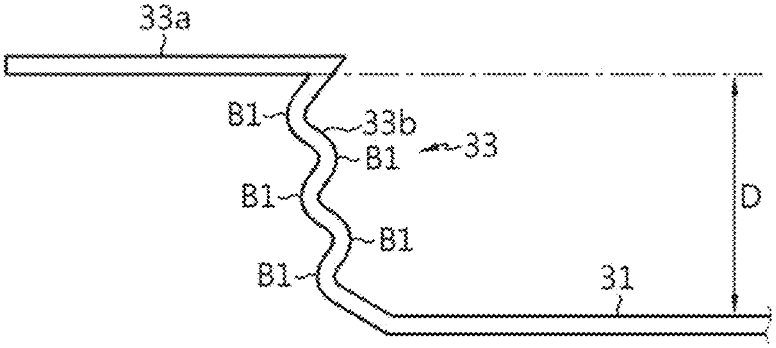
Figure 10:
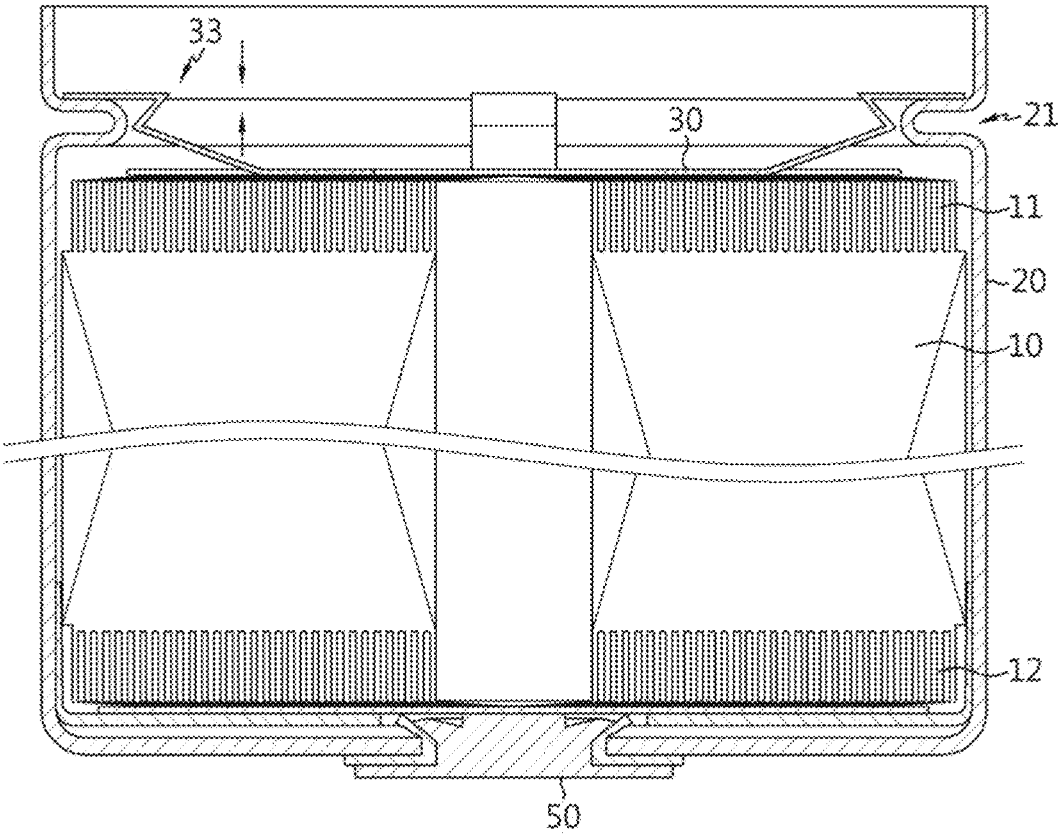
FIGS. 10 and 11 are diagrams showing the shape of the first connection portion according to the height of the electrode assembly, respectively.
Figure 11:
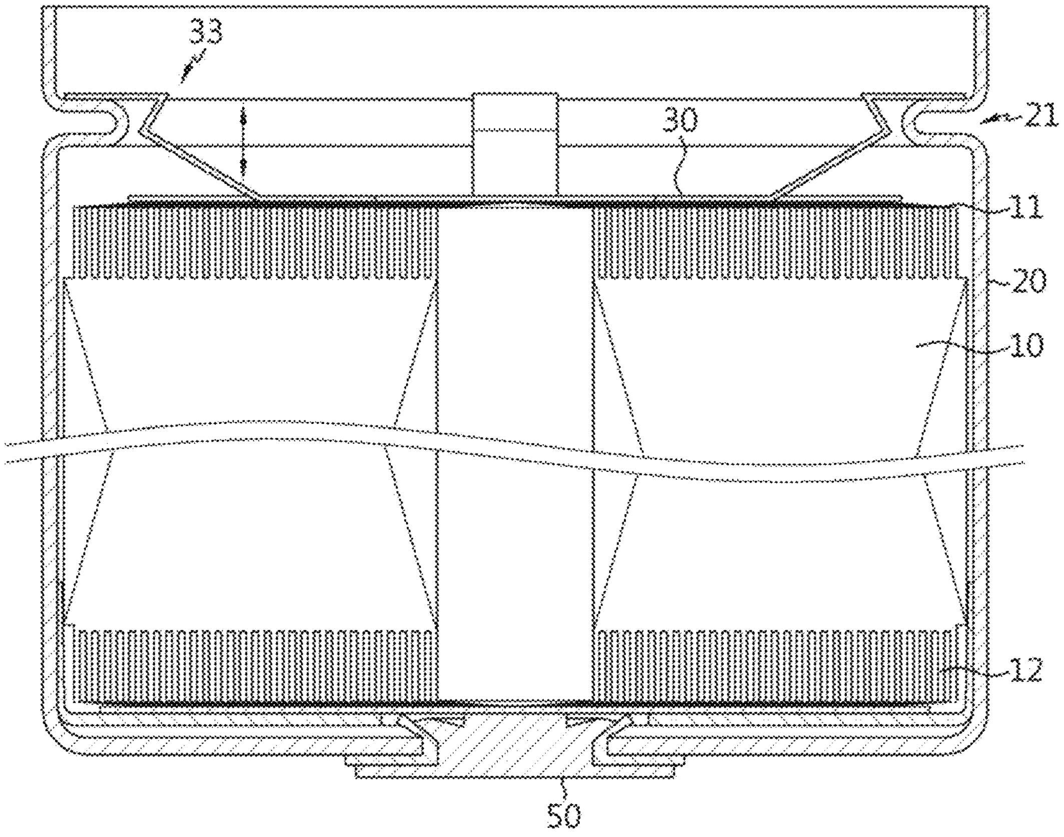

In the drawing of the present disclosure, only the case where one second bending portion B1 is provided is shown, but the present disclosure is not limited thereto, and like the first connection portion 33*b* previously described with reference to FIGS. 8 and 9 as an example, the second bending portion B2 may also be provided in plurality.

Referring to FIG. 5, the cap plate 40 covers the open portion formed on one side of the battery housing 20. The cap plate 40 may be fixed by the crimping portion 22 formed on the top of the battery housing 20. In this case, a sealing gasket 60 may be interposed between the battery housing 20 and the cap plate 40 and between the current collecting plate 30 and the cap plate 40 to improve the fixing force and the sealing property of the battery housing 20. However, in the present disclosure, the cap plate 40 is not a component that should function as a current passage. Therefore, as long as it is possible to firmly fix the battery housing 20 and the cap plate 40 through welding or fixing by applying other components and to secure the sealing property of the open portion of the battery housing 20, the application of the sealing gasket 60 is not essential.

When the sealing gasket 60 is applied, the extension length of the region of the sealing gasket 60 interposed between the current collecting plate 30 and the cap plate 40 may be shorter than the extension length of the region interposed between the battery housing 20 and the cap plate 40. If the sealing gasket 60 extends too long in the direction toward the center of the cylindrical battery 1 from the inner side of the battery housing 20, due to the interference between the sealing gasket 60 and the current collecting plate 30, the current collecting plate 30 may deform, and thus a force may be applied to the welded portion between the current collecting plate 30 and the battery housing 20 and/or the welded portion between the current collecting plate 30 and the first uncoated portion 11 to cause defects. Therefore, as described above, by partially controlling the extension length of the sealing gasket 60, it is possible to prevent such defects from occurring.

Meanwhile, the cap plate 40 may include a venting portion 41 formed to prevent an increase in internal pressure due to gas generated inside the battery housing 20. The venting portion 41 is formed on a part of the cap plate 40 and corresponds to an area that is structurally weaker than the surrounding area so that it can be easily ruptured when internal pressure is applied. The venting portion 41 may be, for example, a region having a smaller thickness compared to the surrounding region. The venting portion 41 may be formed by partially reducing the thickness of the battery housing 20 by notching one side or both sides of the cap plate 40, for example.

The electrode terminal 50 is electrically connected to the second uncoated portion 12 of the electrode assembly 10 through the closed portion 20*a* of the battery housing 20 on the opposite side of the open portion of the battery housing 20. The electrode terminal 50 may pass through the approximate center of the lower surface of the battery housing 20. The electrode terminal 50 may be electrically connected to the electrode assembly 10 by, for example, being coupled with the current collecting plate (second current collecting plate) 70 coupled to the second uncoated portion 12 or being coupled to a lead tab (not shown) coupled to the second uncoated portion 12. Therefore, the electrode terminal 50 has the same polarity as the second electrode of electrode assembly 10 and may function as the second electrode terminal T2. When the second uncoated portion 12 is a positive electrode uncoated portion, the electrode terminal 50 may function as a positive electrode terminal.

Considering the polarity and function of the electrode terminal 50, the electrode terminal 50 must remain an insulated state from the battery housing 20 having the opposite polarity. To this end, an insulating gasket 54 may be applied between the electrode terminal 50 and the battery housing 20. Alternatively, a part of the surface of the electrode terminal 50 may be coated with an insulating material to implement insulation.

For the same reason, the second uncoated portion 12 and/or the current collecting plate (second current collecting plate) 70 must remain an insulated state from the battery housing 20. To this end, an insulator 80 may be interposed between the second uncoated portion 12 and the battery housing 20 and/or between the current collecting plate (second current collecting plate) 70 and the battery housing 20. When the insulator 80 is applied, the electrode terminal 50 may pass through the insulator 80 for electrical connection with the second uncoated portion 12.

Meanwhile, in the present disclosure, the closed portion 20*a* of the battery housing 20 may function as a first electrode terminal T1 When the first uncoated portion 11 is a negative electrode uncoated portion, the first electrode terminal T1 may be a negative electrode terminal. The cylindrical battery 1 according to the present disclosure has a structure in which the electrode terminal 50 exposed on the lower surface located on the opposite side of the open portion of the battery housing 20 and the rest of the area of the lower surface of the battery housing 20 except for the area occupied by the electrode terminal 50 may be used as the second electrode terminal T2 and the first electrode terminal T1, respectively. Therefore, according to the cylindrical battery 1 of the present disclosure, in electrically connecting a plurality of cylindrical batteries 1, both the positive electrodes and the negative electrodes may be connected in one direction, thereby simplifying the electrical connection structure. In addition, since the cylindrical battery 1 according to the present disclosure has a structure in which most of the lower surface located on the opposite side of the open portion of the battery housing 20, namely the outer surface of the closed portion 20*a*, can be used as an electrode terminal, there is an advantage of securing a sufficient area for welding components for electrical connection.

Figure 15:
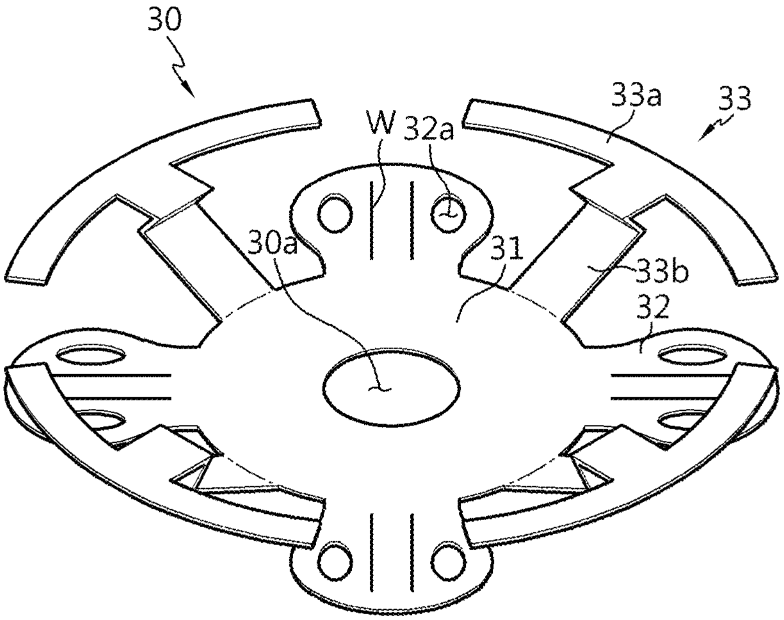
FIGS. 15 and 16 are diagrams showing a current collecting plate of the present disclosure having a form different from those described and shown in the former embodiments.

Referring to FIG. 15, the current collecting plate (first current collecting plate) 30 of the present disclosure may include at least one hole injection 32*a*. The injection hole 32*a* may be provided in the uncoated portion coupling portion 32, for example. When the uncoated portion coupling portion 32 is provided in plurality, the injection hole 32*a* may be provided in at least one uncoated portion coupling portion 32. The injection hole 32*a* may be provided at one side or both sides of at least one welding line W formed on the uncoated portion coupling portion 32, for example. Referring to FIGS. 5 and 15, in manufacturing the cylindrical battery 1 according to an embodiment of the present disclosure, after an assembly including the electrode assembly 10 and the current collecting plate (first current collecting plate) 30 is accommodated in the battery housing 20, an electrolyte solution may be injected. At this time, the liquid injection property may be improved due to the injection hole 32*a*.

Figure 7:
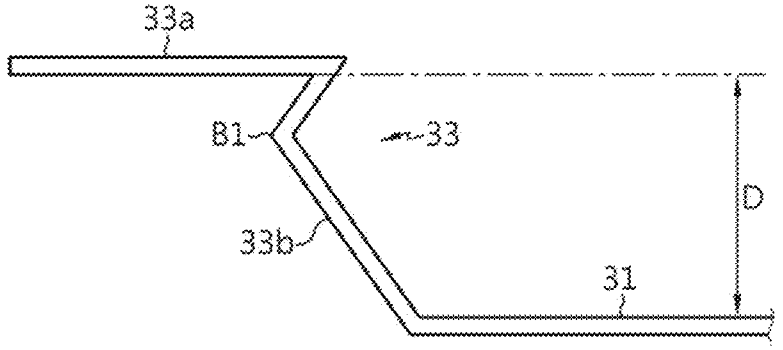
FIGS. 7 to 9 are diagrams showing various exemplary forms of a first connection portion of the current collecting plate according to an embodiment of the present disclosure.
Figure 16:
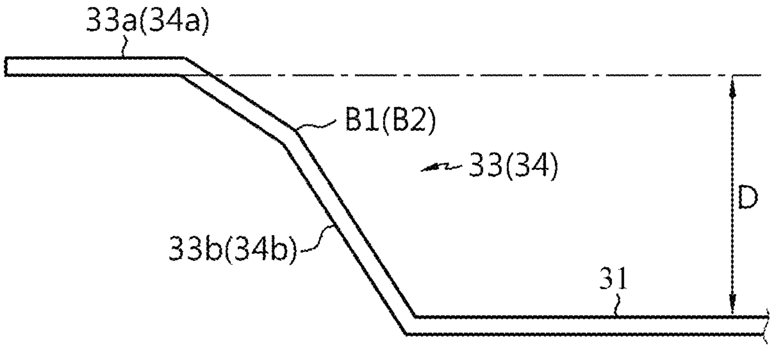

Referring to FIG. 16, the first connection portion 33*b* of the first housing coupling portion 33 of the present disclosure and/or the second connection portion 34*b* of the second housing coupling portion 34 may have a shape bent once, and may have a shape bent in a direction different from that shown in FIGS. 7 and 14. That is, the first bending portion B1 formed on the first connection portion 33*b* and/or the second bending portion B2 formed on the second connection portion 34*b* may protrude toward the center of the cylindrical battery 1 (see FIG. 5). The bending direction of the first connection portion 33*b* and/or the second connection portion 34*b* is to prevent damage to the coupling portion of the current collecting plate (first current collecting plate) 30 and the electrode assembly 10 and/or the coupling portion of the current collecting plate (first current collecting plate) 30 and the battery housing 20 during the sizing process. Sizing is a compression process for shortening the height occupied by the region of the beading portion 21 of the battery housing 20 in order to reduce the total height of the cylindrical battery 1 in manufacturing the cylindrical battery 1. As a result of checking whether the bending portion B1, B2 is formed and the degree of damage to the welded portion after the sizing process by changing the protruding direction of the bending portion B1, B2, it has been found that almost no damage has occurred in the cylindrical battery 1 having the bending portion B1, 132 protruded in the direction toward the center of the cylindrical battery 1.

Preferably, the cylindrical battery cell 1 may be, for example, a battery cell whose form factor ratio (defined as a value obtained by dividing the diameter of a cylindrical battery cell by height, namely a ratio of height (H) to diameter ((D)) is greater than about 0.4.

Here, the form factor means a value indicating the diameter and height of a cylindrical battery cell. The form factor of the cylindrical battery cell according to an embodiment of the present disclosure may be, for example, 46110 cell, 48750 cell, 48110 cell, 48800 cell, or 46800 cell. In the numerical value representing the form factor, first two numbers indicate the diameter of the cell, next two numbers indicate the height of the cell, and the last number '0' indicates that the cell has a cylindrical section, A battery cell according to an embodiment of the present disclosure may be a battery cell having an approximately cylindrical shape, whose diameter is approximately 46 mm, height is approximately 110 mm, and form factor ratio is 0.418.

A battery cell according to another embodiment may be a battery cell having an approximately cylindrical shape, whose diameter is about 48 mm, height is about 75 mm, and form factor ratio is 0.640.

A battery cell according to still another embodiment may be a battery cell having an approximately cylindrical shape, whose diameter is approximately 48 mm, height is approximately 110 mm, and form factor ratio is 0.436.

A battery cell according to still another embodiment may be a battery cell having an approximately cylindrical shape, whose diameter is approximately 48 mm, height is approximately 80 mm, and form factor ratio is 0.600.

A battery cell according to still another embodiment may be a battery cell having an approximately cylindrical shape, whose diameter is approximately 46 mm, height is approximately 80 mm, and form factor ratio is 0.575.

Conventionally, battery cells having a form factor ratio of about 0.4 or less have been used. That is, conventionally, for example, 18650 cell, 21700 cell, etc. were used. The 18650 cell has a diameter of approximately 18 mm, height of approximately 65 mm, and a form factor ratio of 0.277. The 21700 cell has a diameter of approximately 21 mm, a height of approximately 70 mm, and a form factor ratio of 0.300.

Figure 17:
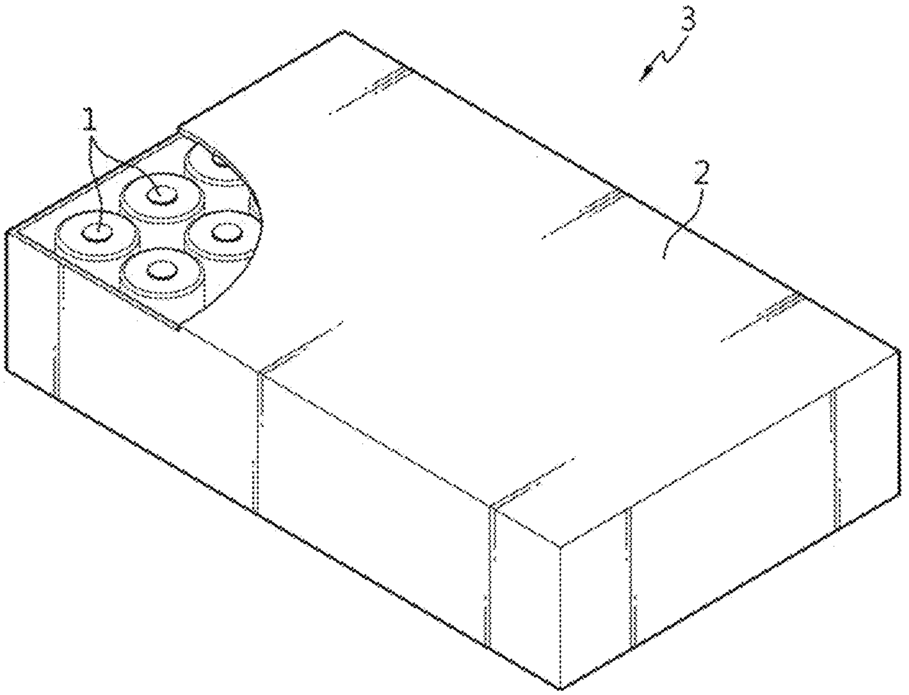
FIG. 17 is a diagram showing a battery pack according to an embodiment of the present disclosure.

Referring to FIG. 17, a battery pack 3 according to an embodiment of the present disclosure includes a secondary battery assembly in which a plurality of cylindrical batteries 1 according to an embodiment of the present disclosure as described above are electrically connected, and a pack housing for accommodating the secondary battery assembly. In the drawing of the present disclosure, components for electrical connection such as a bus bar, a cooling unit and a power terminal are not depicted for convenience of illustration.

Figure 18:
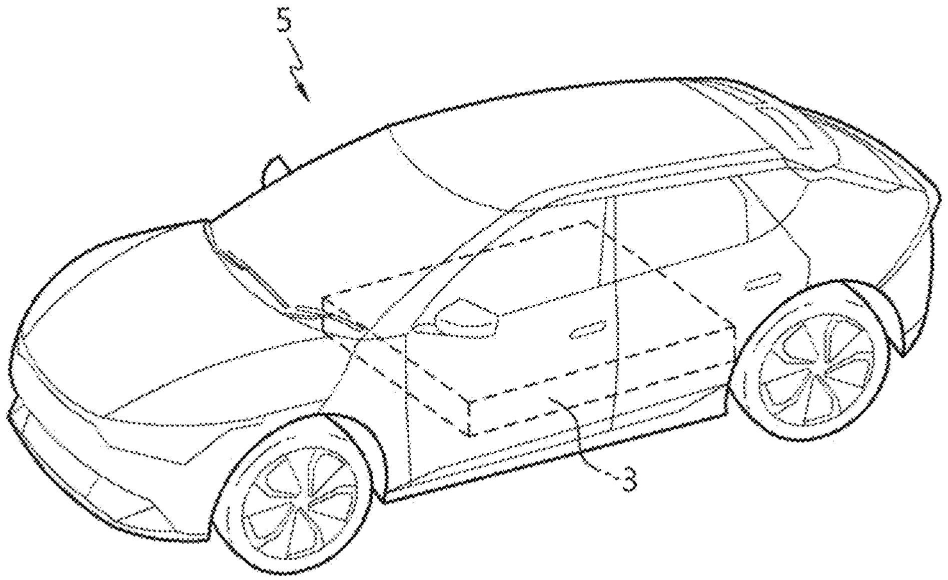
FIG. 18 is a schematic view showing a vehicle according to an embodiment of the present disclosure.

Referring to FIG. 18, a vehicle 5 according to an embodiment of the present disclosure may be, for example, an electric vehicle, a hybrid electric vehicle or a plug-in vehicle, and includes the battery pack 3 according to an embodiment of the present disclosure.

The vehicle 5 includes a four-wheeled vehicle and a two-wheeled vehicle. The vehicle 5 operates by receiving a power from the battery pack 3 according to an embodiment of the present disclosure.

Next, with reference to FIGS. 19 to 24, the cylindrical battery 1 explained above will be described in more detail.

As described above, the cylindrical battery according to an embodiment of the present disclosure may include an electrode terminal riveted to the bottom of a battery housing.

Figure 19:
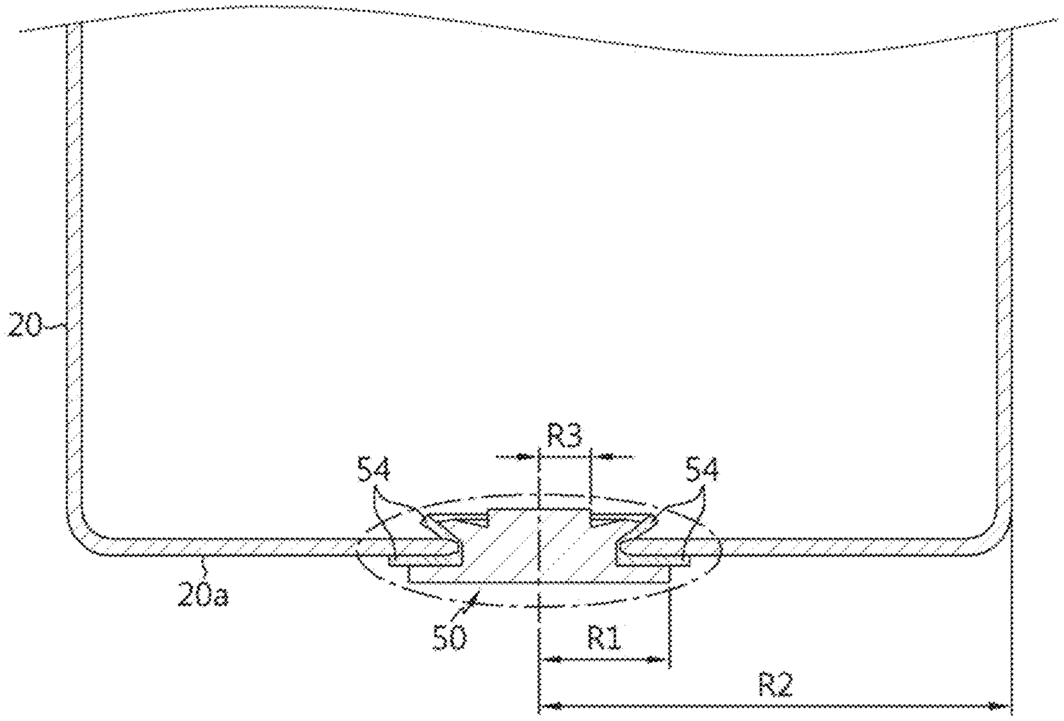
FIG. 19 is a cross-sectional view showing a riveting structure of the electrode terminal according to an embodiment of the present disclosure.
Figure 20:
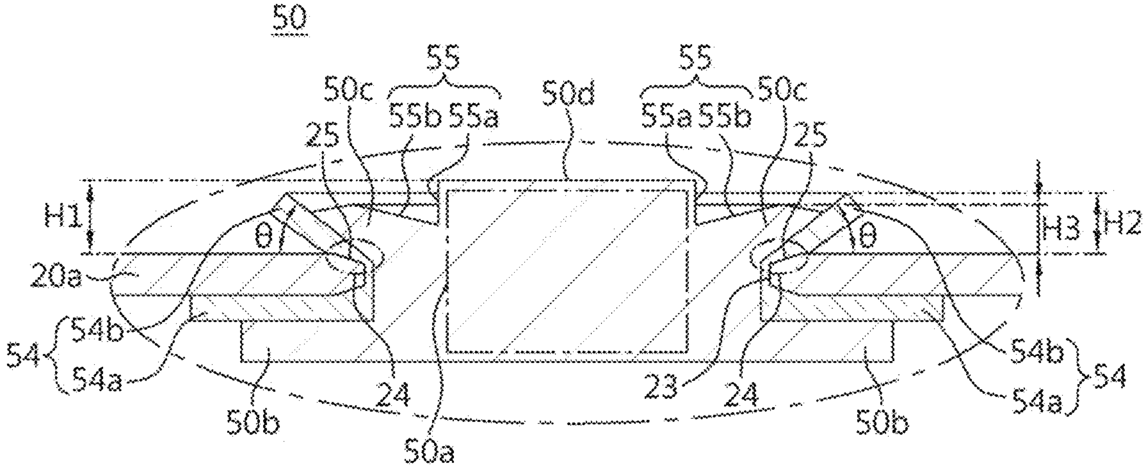
FIG. 20 is an enlarged cross-sectional view showing a portion indicated by a dotted circle in FIG. 19.

FIG. 19 is a cross-sectional view showing a riveting structure of the electrode terminal 50 according to an embodiment of the present disclosure, and FIG. 20 is an enlarged cross-sectional view showing a portion indicated by a dotted circle.

Referring to FIGS. 19 and 20, the riveting structure of the electrode terminal 50 according to an embodiment may include a cylindrical battery housing 20 with one side open, an electrode terminal 50 riveted through a perforated hole 23 formed in the closed portion 20*a* of the battery housing 20, and an insulating gasket 54 interposed between the electrode terminal 50 and the perforated hole 23.

The battery housing 20 is made of a conductive metal material. In one example, the battery housing 20 may be made of steel, but the present disclosure is not limited thereto.

The electrode terminal 50 is made of a conductive metal material. In one example, the electrode terminal 50 may be made of aluminum, but the present disclosure is not limited thereto.

The insulating gasket 54 may be made of a polymer resin having insulation and elasticity. In one example, the insulating gasket 54 may be made of polypropylene, polybutylene terephthalate, polyfluorinated ethylene, etc., but the present disclosure is not limited thereto.

Preferably, the electrode terminal 50 includes a body portion 50*a* inserted into the perforated hole 23, an outer flange portion 50*b* extending along an outer surface from a circumference of one side of the body portion 50*a* exposed through the outer surface of the closed portion 20*a* of the battery housing 20 an inner flange portion 50*c* extending toward the inner surface from a circumference of the other side of the body portion 50*a* exposed through the inner surface of the closed portion 20*a* of the battery housing 20, and a flat portion 50*d* provided on an inner side of the inner flange portion 50*c*.

Preferably, the flat portion 50*d* and the inner surface of the closed portion 20*a* of the battery housing 20 may be parallel to each other. Here, 'parallel' means substantially parallel when observed with the naked eye.

According to one aspect, an angle ($\theta$) between the inner flange portion 50*c* and the inner surface of the closed portion 20*a* of the battery housing 20 may range from 0 degrees to 60 degrees. The size of the angle is determined by the caulking strength when the electrode terminal 50 is installed in the perforated hole 23 of the battery housing 20 by the caulking method. In one example, the angle $\theta$ may decrease to 0 degree as the caulking strength increases. If the angle exceeds 60 degrees, the sealing effect of the insulating gasket 54 may deteriorate.

According to another aspect, a recess portion 55 may be provided between the inner flange portion 50*c* and the flat portion 50*d*. The recess portion 55 may have a cross-sectional structure of an asymmetric groove. In one example, the asymmetric groove may be approximately V-shaped. The asymmetric groove may include a sidewall 55*a* of the flat portion 50*d* and an inclined surface 55*b* of the inner flange portion 50*c* connected to an end of the sidewall 55*a*. The sidewall 55*a* may be substantially perpendicular to the inner surface of the closed portion 20*a* of the battery housing 20. 'Perpendicular' means substantially perpendicular when observed with the naked eye. The recess portion 55 is made by the shape of a caulking jig when the electrode terminal 50 is installed in the perforated hole 23 of the battery housing 20 by the caulking method.

Preferably, the thickness of the inner flange portion 50*c* may decrease as the distance from the body portion 50*a* of the electrode terminal 50 increases.

According to another aspect, the insulating gasket 54 includes an outer gasket 54*a* interposed between the outer flange portion 50*b* and the outer surface of the closed portion 20*a* of the battery housing 20, and an inner gasket 54*b* interposed between the inner flange portion 50*c* and the inner surface of the closed portion 20*a* of the battery housing 20.

The outer gasket 54*a* and the inner gasket 54*b* may have different thicknesses depending on positions. Preferably, a thickness of a region of the inner gasket 54*b* interposed between the inner edge 24 of the perforated hole 23 connected to the inner surface of the closed portion 20*a* of the battery housing 20 and the inner flange portion 50*c* may be relatively small. Preferably, a minimum thickness point may exist in a gasket region interposed between the inner edge 24 of the perforated hole 23 and the inner flange portion 50*c*. In addition, the inner edge 24 of the perforated hole 23 may include an opposing surface 25 facing the inner flange portion 50*c*.

Meanwhile, the upper and lower ends of the inner wall of the perforated hole 23 perpendicular to the closed portion 20*a* of the battery housing 20 are chamfered (corner-cut) to form a tapered surface toward the electrode terminal 50. However, the upper end and/or lower end of the inner wall of the perforated hole 23 may be deformed into a smooth curved surface with curvature. In this case, stress applied to the gasket 54 near the upper end and/or lower end of the inner wall of the perforated hole 23 may be more alleviated.

Preferably, the inner gasket 54*b* may extend longer than the inner flange portion 50*c* while forming an angle of 0 to 60 degrees with the inner surface of the closed portion 20*a* of the battery housing 20.

In another aspect, a height H1 of the flat portion 50*d* may be equal to or greater than a height H2 of the end of the inner gasket 54*b* based on the inner surface of the closed portion 20*a* of the battery housing 20. Also, the height H1 of the flat portion 50*d* may be equal to or greater than a height H3 of the end of the inner flange portion 50*c* based on the inner surface of the closed portion 20*a* of the battery housing 20.

When the height parameters H1, H2, and H3 satisfy the above condition, it is possible to prevent the inner flange portion 50*c* and the inner gasket 54*b* from interfering with other parts.

In another aspect, a radius (R1) from the center of the body portion 50*a* of the electrode terminal 50 to the edge of the outer flange portion 50*b* may be 10% to 60% based on a radius (R2) of the closed portion 20*a* of the battery housing 20.

When R1 is small, the welding space becomes insufficient when electric wiring parts (bus bar) are welded to the electrode terminal 50. In addition, when R1 is large, the welding space is reduced when electric wiring parts (bus bar) are welded to the outer surface of the closed portion 20*a* of the battery housing 20 excluding the electrode terminal 50.

When the ratio R1/R2 is adjusted between 10% and 60%, it is possible to appropriately secure a welding space for the electrode terminal 50 and the outer surface of the closed portion 20*a* of the battery housing 20.

In addition, the radius (R3) from the center of the body portion 50*a* of the electrode terminal 50 to the edge of the flat portion 50*d* may be 4% to 30% based on the radius (R2) of the closed portion 20*a* of the battery housing 20.

If R3 is small, the welding space becomes insufficient when the current collecting plate (second current collecting plate) 70 (FIG. 21) is welded to the flat portion 50*d* of the electrode terminal 50, and the welding area of the electrode terminal 50 decreases, so that the contact resistance may increase. In addition, R3 should be smaller than R1, and if R3 is large, the thickness of the inner flange portion 50*c* becomes thin, so that the force of the inner flange portion 50*c* compressing the insulating gasket 54 is reduced, thereby deteriorating the sealing ability of the insulating gasket 54.

If R3/R2 is adjusted between 4% and 30%, the welding process may be easily performed by securing a sufficient welding area between the flat portion 50*d* of the electrode terminal 50 and the current collecting plate 70 (FIG. 21), and it is possible to reduce contact resistance of the welding area and prevent deterioration of the sealing performance of the insulating gasket 54.

According to an embodiment of the present disclosure, the riveting structure of the electrode terminal 50 may be formed using a caulking jig that moves up and down. First, a preform (not shown) of the electrode terminal 50 is inserted into the perforated hole 23 formed in the closed portion 20*a* of the battery housing 20 with the insulating gasket 54 interposed therebetween. The preform refers to an electrode terminal before being riveted.

Next, the caulking jig is inserted into the inner space of the battery housing 20. The caulking jig has a groove and a protrusion corresponding to the final shape of the electrode terminal 50 on the surface facing the preform in order to form the electrode terminal 50 by riveting the preform.

Next, the caulking jig is moved downward to press-form the upper portion of the preform so that the preform is transformed into a riveted electrode terminal 50.

While the preform is pressed by the caulking jig, the outer gasket 54*a* interposed between the outer flange portion 50*b* and the outer surface of the closed portion 20*a* of the battery housing 20 is elastically compressed and its thickness is reduced. In addition, a portion of the inner gasket 54*b* interposed between the inner edge 24 of the perforated hole 23 and the preform is elastically compressed by the inner flange portion 50*c*, and its thickness is further reduced than other areas. In particular, the area of the inner gasket 54*b* where the thickness is intensively reduced is a portion indicated by a dotted line circle in FIG. 20. Accordingly, the sealing performance and airtightness between the riveted electrode terminal 50 and the battery housing 20 are remarkably improved.

Preferably, it is preferred that the insulating gasket 54 is compressed sufficiently to secure a desired sealing strength without being physically damaged during the process of riveting the preform.

In one example, when the insulating gasket 54 is made of polybutylene terephthalate, the insulating gasket 54 preferably has a compression rate of 50% or more at a point where it is compressed to a minimum thickness. The compression rate is a ratio of the change in thickness before and after compression to the thickness before compression.

In another example, when the insulating gasket 54 is made of polyfluoroethylene, the insulating gasket 54 preferably has a compression rate of 60% or more at a point where it is compressed to a minimum thickness.

In still another example, when the insulating gasket 54 is made of polypropylene, the insulating gasket 54 preferably has a compression rate of 60% or more at a point where it is compressed to a minimum thickness.

Preferably, the press-forming of the upper portion of the preform may be performed stepwise by moving the caulking jig up and down at least twelve times. That is, the preform may be deformed several times by press-forming the preform stepwise. At this time, the pressure applied to the caulking jig may be increased stepwise. By distributing the stress applied to the preform several times, it is possible to prevent the insulating gasket 54 from being damaged during the caulking process. In particular, when a portion of the inner gasket 54*b* interposed between the inner edge 24 of the perforated hole 23 and the preform is intensively compressed by the inner flange portion 50*c*, damage to the gasket is minimized.

If the caulking jig is separated from the battery housing 20 after the press-forming of the preform using the caulking jig is completed, as shown in FIG. 20, a riveting structure of the electrode terminal 50 according to an embodiment of the present disclosure may be obtained.

According to the above embodiment, the caulking jig press-forms the upper portion of the preform through up and down movement inside the battery housing 20. In some cases, a rotary jig used in the prior art may be used for press-forming the preform.

However, the rotary jig rotates while tilted at a predetermined angle with respect to the central axis of the battery housing 20. Therefore, a rotary jig with a large rotation radius may interfere with the inner wall of the battery housing 20. In addition, when the depth of the battery housing 20 is large, the length of the rotary jig becomes that much longer. In this case, the press-forming of the preform may not be performed properly as the rotation radius of the end of the rotary jig increases. Therefore, press-forming using a caulking jig is more effective than that using a rotary jig.

Figure 21:
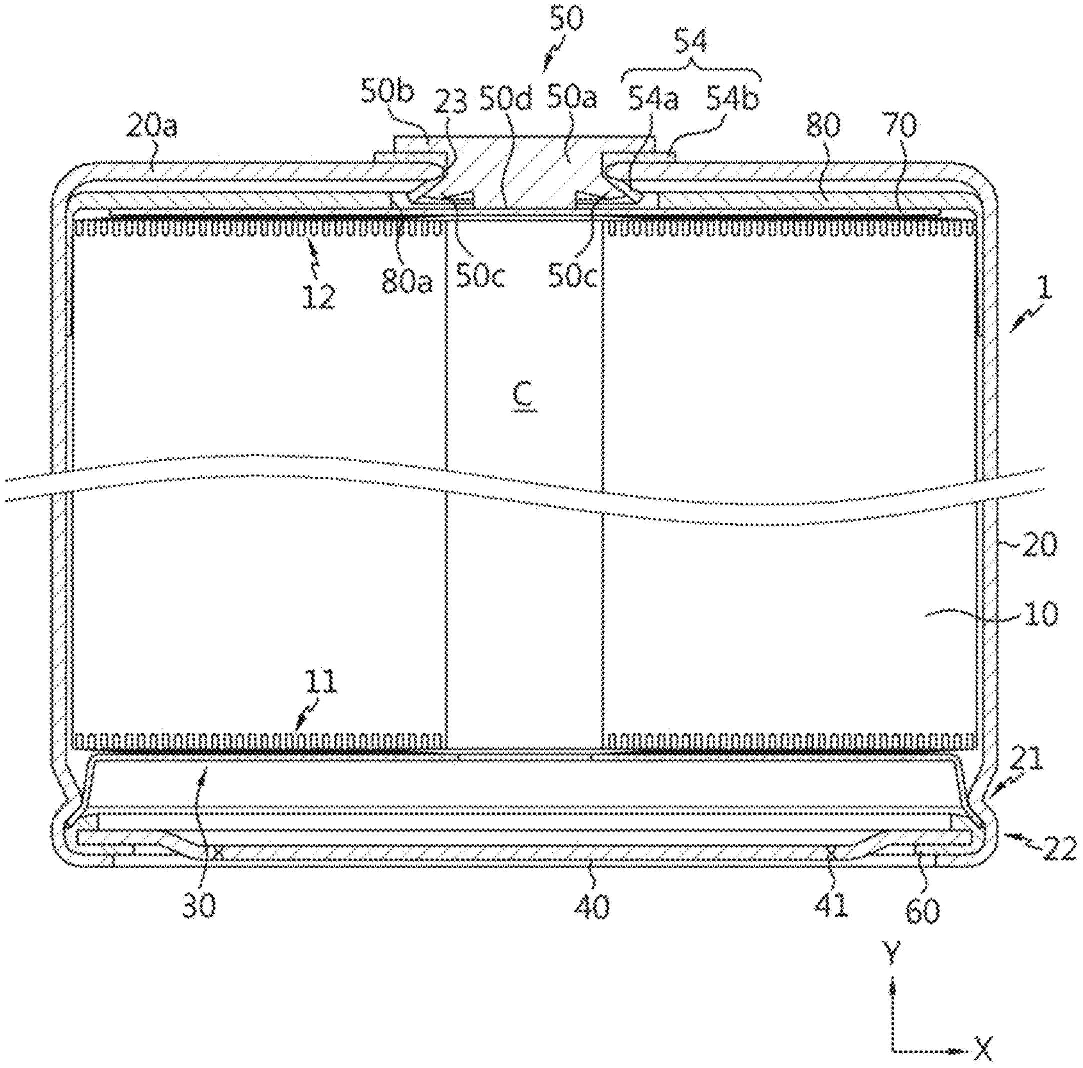
FIG. 21 is a cross-sectional view showing the cylindrical battery cell according to an embodiment of the present disclosure, taken along the longitudinal direction Y.

FIG. 21 is a cross-sectional view showing a cylindrical battery 1 according to an embodiment of the present disclosure, taken along the longitudinal direction Y. Although the overall structure of the cylindrical battery 1 has been described above, the overall structure of the cylindrical battery 1 will be described from another point of view as described above.

Referring to FIG. 21, in the cylindrical battery 1 according to an embodiment includes a jelly-roll type electrode assembly 10 in which first and second sheet-shaped electrodes are wound with a separator interposed therebetween, wherein a uncoated portion 11 of the first electrode is exposed on the lower portion and an uncoated portion 12 of the second electrode is exposed on the upper portion.

In an embodiment, the first electrode may be a negative electrode and the second electrode may be a positive electrode, or vice versa.

The winding method of the electrode assembly 10 is substantially the same as the winding method of the electrode assembly used in manufacturing the tab-less cylindrical battery according to the prior art described with reference to FIGS. 1 and 2.

In depicting the electrode assembly 10, only the uncoated portions 11 and 12, which are exposed and extended to the outside of the separator, are shown in detail, and the winding structure of the first electrode, the second electrode and the separator is not shown.

The cylindrical battery 1 also includes a cylindrical battery housing 20 that accommodates the electrode assembly 10 and is electrically connected to the uncoated portion 11 of the first electrode.

Preferably, one side (lower portion) of the battery housing 20 is open. In addition, the closed portion 20*a* of the battery housing 20 has a structure in which the electrode terminal 50 is riveted to the perforated hole 23 through a caulking process.

Specifically, the electrode terminal 50 may include a body portion 50*a* inserted into the perforated hole 23, an outer flange portion 50*b* extending along the outer surface from a circumference of one side of the body portion 50*a* exposed through the outer surface of the closed portion 20*a* of the battery housing 20, an inner flange portion 50*c* extending toward the inner surface from a circumference of the other side of the body portion 50*a* exposed through the inner surface of the closed portion 20*a* of the battery housing 20, and a flat portion 50*d* provided on the inner side of the inner flange portion 50*c*.

The cylindrical battery 1 may also include an insulating gasket 54 interposed between the electrode terminal 50 and the perforated hole 23.

The cylindrical battery 1 may also include a sealing body for sealing an open end of the battery housing 20 to be insulated from the battery housing 20. Preferably, the sealing body may include a cap plate 40 having no polarity and a sealing gasket 60 interposed between an edge of the cap plate 40 and the open end of the battery housing 20.

The cap plate 40 may be made of a conductive metal material such as aluminum, steel, or nickel. In addition, the sealing gasket 60 may be made of polypropylene, polybutylene terephthalate, polyfluorinated ethylene, and the like having insulation and elasticity. However, the present disclosure is not limited by the materials of the cap plate 40 and the sealing gasket 60.

The cap plate 40 may include a vent portion 41 that is ruptured when the pressure inside the battery housing 20 exceeds a critical value. The vent portion 41 may be formed on both surfaces of the cap plate 40. The vent portion 41 may form a continuous or discontinuous circular pattern, a straight line pattern, or other pattern on the surface of the cap plate 40.

The battery housing 20 may include a crimping portion 22 that is extended and bent to the inside of the battery housing 20 to surround and fix the edge of the cap plate 40 together with the sealing gasket 60 in order to fix the sealing body.

The battery housing 20 may also include a beading portion 21 press-fitted into the battery housing 20 in an area adjacent to the open end. When the sealing body is fixed by the crimping portion 22, the beading portion 21 supports the edge of the sealing body, particularly the outer circumferential surface of the sealing gasket 60.

The cylindrical battery 1 may further include a first current collecting plate 30 welded to the uncoated portion 11 of the first electrode. The first current collecting plate 30 is made of a conductive metal material such as aluminum, steel, or nickel. Preferably, at least a part of an edge of the first current collecting plate 30 not in contact with the uncoated portion 11 of the first electrode may be interposed between the beading portion 21 and the sealing gasket 60 and fixed by the crimping portion 22. Optionally, at least a part of the edge of the first current collecting plate 30 may be fixed to the inner circumference of the beading portion 21 adjacent to the crimping portion 22 through welding.

The cylindrical battery 1 may also include a second current collecting plate 70 welded to the uncoated portion 12 of the second electrode. Preferably, at least a part of the second current collecting plate 70, for example a center portion, may be welded to the flat portion 50*d* of the electrode terminal 50.

Preferably, when the second current collecting plate 70 is welded, a welding tool may be inserted through the winding center hole C existing in the core of the electrode assembly 10 and reach the welding point of the second current collecting plate 70. In addition, since the electrode terminal 50 supports the welding area of the second current collecting plate 70 when the second current collecting plate 70 is welded to the flat portion 50*d* of the electrode terminal 50, welding quality may be improved by applying strong pressure to the welding area. In addition, since the flat portion 50*d* of the electrode terminal 50 has a large area, a wide welding area may also be secured. Accordingly, internal resistance of the cylindrical battery 1 may be lowered by lowering the contact resistance of the welding area. The face-to-face welding structure of the riveted electrode terminal 50 and the second current collecting plate 70 is very useful for rapid charging using high C-rate current. This is because the current density per unit area can be lowered in the cross section in a direction in which the current flows, so the amount of heat generated in the current path may be lowered than before.

When welding the flat portion 50*d* of the electrode terminal 50 and the second current collecting plate 70, any one of laser welding, ultrasonic welding, spot welding and resistance welding may be used. The area of the flat portion 50*d* may be adjusted differently depending on the welding method, and is preferably 2 mm or more for welding strength and ease of the welding process.

In one example, when the flat portion 50*d* and the second current collecting plate 70 are welded with a laser and welded in a continuous or discontinuous line in the form of an arc pattern, the diameter of the flat portion 50*d* is preferably 4 mm or more. When the diameter of the flat portion 50*d* satisfies the corresponding condition, welding strength may be secured, and there is no difficulty in performing the welding process by inserting a laser welding tool into the winding center hole C of the electrode assembly 10.

In another example, when the flat portion 50*d* and the second current collecting plate 70 are ultrasonically welded and welded in a circular pattern, the diameter of the flat portion 50*d* is preferably 2 mm or more. If the diameter of the flat portion 50*d* satisfies the corresponding condition, welding strength may be secured, and there is no difficulty in preforming the welding process by inserting an ultrasonic welding tool into the winding center hole C of the electrode assembly 10.

The cylindrical battery 1 may further include an insulator 80. The insulator 80 may be interposed between the second current collecting plate 70 and the inner surface of the closed portion 20*a* of the battery housing 20, and between the inner circumference of the sidewall of the battery housing 20 and the electrode assembly 10. Preferably, the insulator 80 may include an insulator hole 80*a* exposing the flat portion 50*d* of the electrode terminal 50 toward the second current collecting plate 70 and cover the surface of the second current collecting plate 70 and an edge of one side (upper portion) of the electrode assembly 10.

Preferably, the uncoated portions 11, 12 of the first electrode and/or the second electrode may be bent from the outer circumference of the electrode assembly 10 toward the core to form a bent surface on the upper and lower portions of the electrode assembly 10. In addition, the first current collecting plate 30 may be welded to a bent surface formed by bending the uncoated portion 11 of the first electrode, and the second current collecting plate 70 may be welded to a bent surface formed by bending the uncoated portion 12 of the second electrode.

In order to relieve stress generated when the uncoated portions 11, 12 are bent, the first electrode and/or the second electrode may have an improved structure different from that of the conventional electrode (see FIG. 1).

Figure 22:
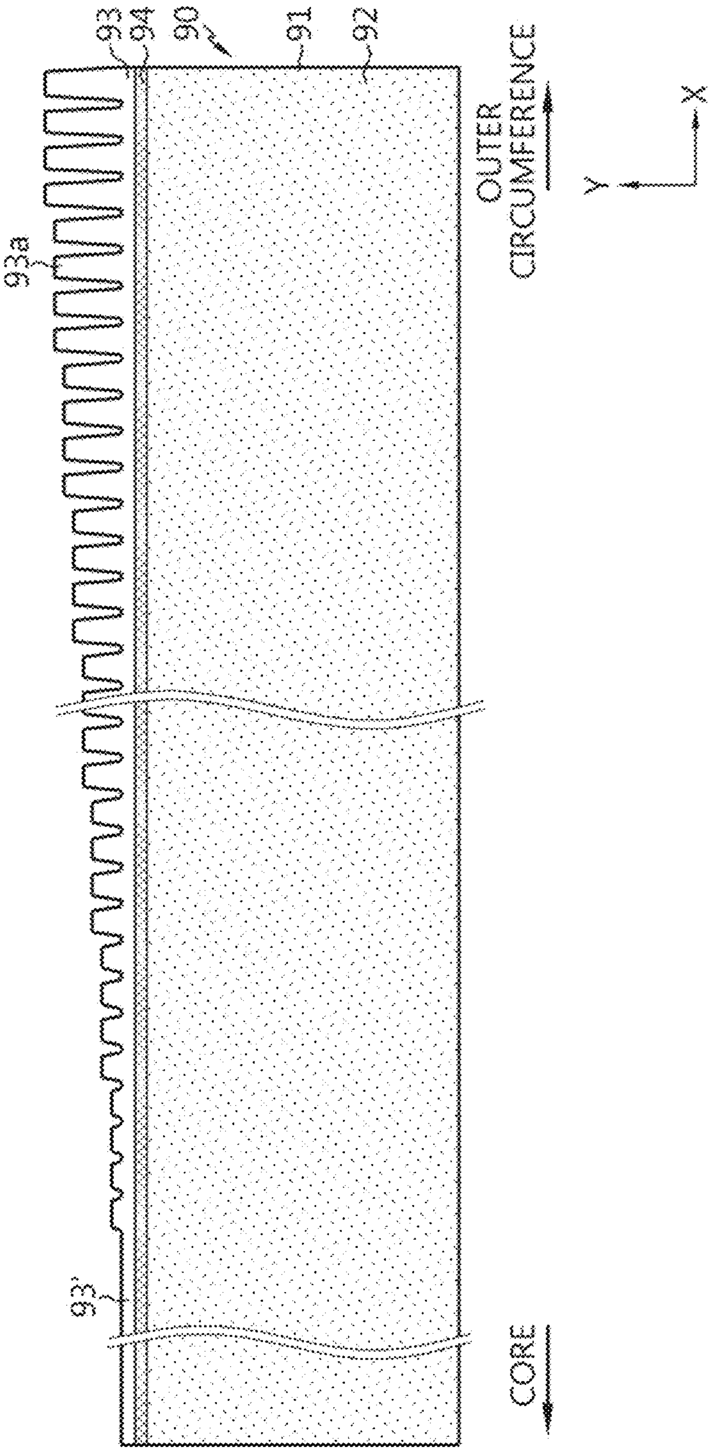
FIG. 22 is a plan view showing an electrode structure according to a preferred embodiment of the present disclosure.

FIG. 22 is a plan view showing a structure of an electrode 90 according to an embodiment of the present disclosure.

Referring to FIG. 22, the electrode 90 includes a sheet-shaped current collector 91 made of a foil of a conductive material, an active material layer 92 formed on at least one surface of the current collector 91, and an uncoated portion 93 formed on a long side end of the current collector 91 and not coated with an active material.

Preferably, the uncoated portion 93 may include a plurality of notched segments 93*a*. The plurality of segments 93*a* form a plurality of groups, and segments 93*a* belonging to each group may have the same height (length in the Y direction) and/or the same width (length in the X direction) and/or the same separation pitch. The number of segments 93*a* belonging to each group may be increased or decreased than shown. The segment 93*a* may have a trapezoidal shape, but may be deformed into a quadrilateral, equilateral quadrilateral, semi-circular or semi-elliptical shape.

Preferably, the height of the segments 93*a* may increase stepwise from the core toward the outer circumference. In addition, the core-side uncoated portion 93' adjacent to the core may not include the segment 93*a*, and the height of the core-side uncoated portion 93' may be smaller than that of the other region of the uncoated portion.

Optionally, the electrode 90 may include an insulating coating layer 94 covering a boundary between the active material layer 92 and the uncoated portion 93. The insulating coating layer 94 includes an insulating polymer resin and may optionally further include an inorganic filler. The insulating coating layer 94 serves to prevent an end of the active material layer 92 from contacting the active material layer of opposite polarity through a separator and to structurally support the bending of the segment 93*a*. To this end, when the electrode 90 is wound into an electrode assembly, at least a part of the insulating coating layer 94 is preferably exposed to the outside from the separator.

Figure 23:
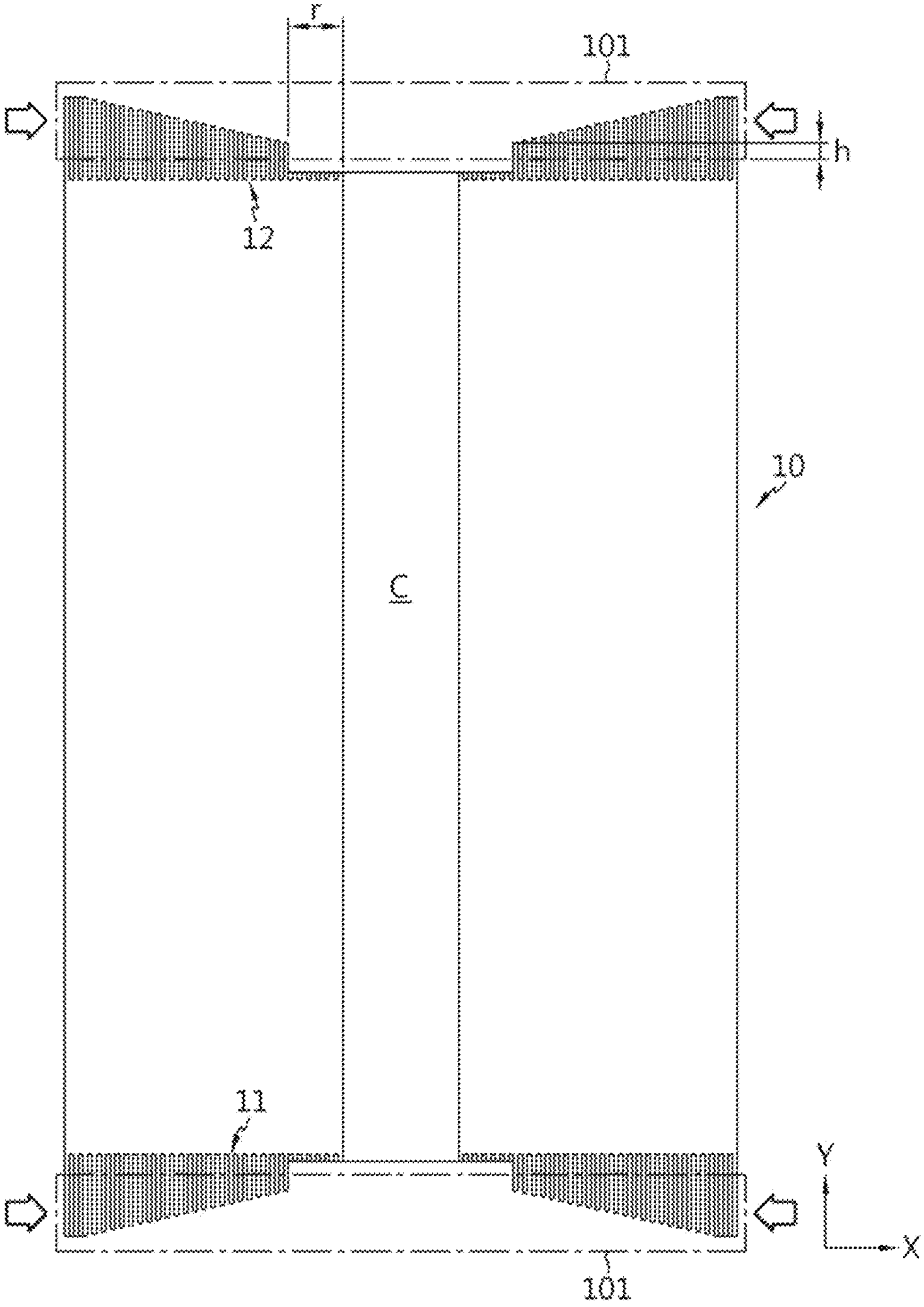
FIG. 23 is a cross-sectional view, taken along the longitudinal direction Y, showing an electrode assembly in which a segment structure of the uncoated portion of the electrode according to an embodiment of the present disclosure is applied to the first electrode and the second electrode.

FIG. 23 is a cross-sectional view, taken along the longitudinal direction Y, showing an electrode assembly 100 in which a segment structure of the uncoated portion of the electrode 90 according to an embodiment of the present disclosure is applied to the first electrode and the second electrode.

Figure 2:
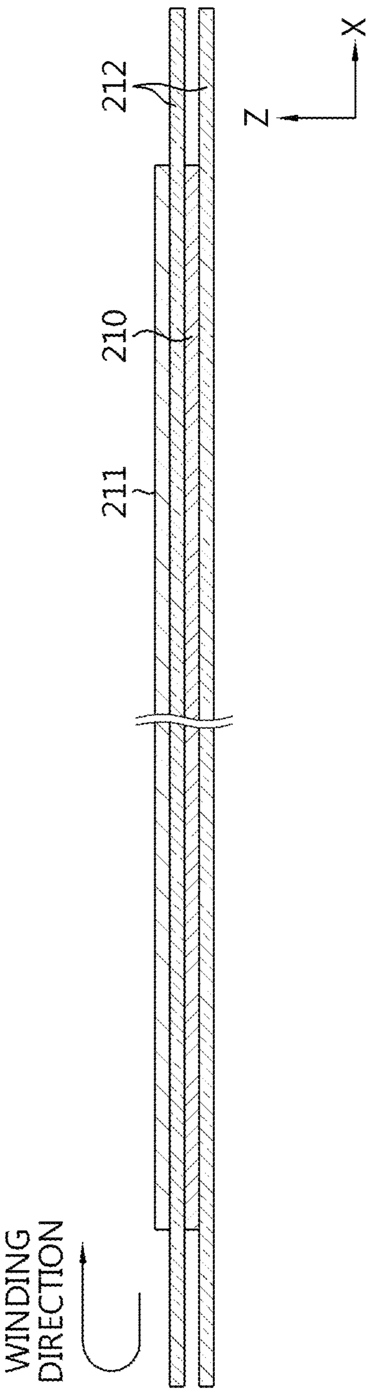
FIG. 2 is a diagram showing a process of winding an electrode assembly included in the conventional tab-less cylindrical battery.
Figure 3:
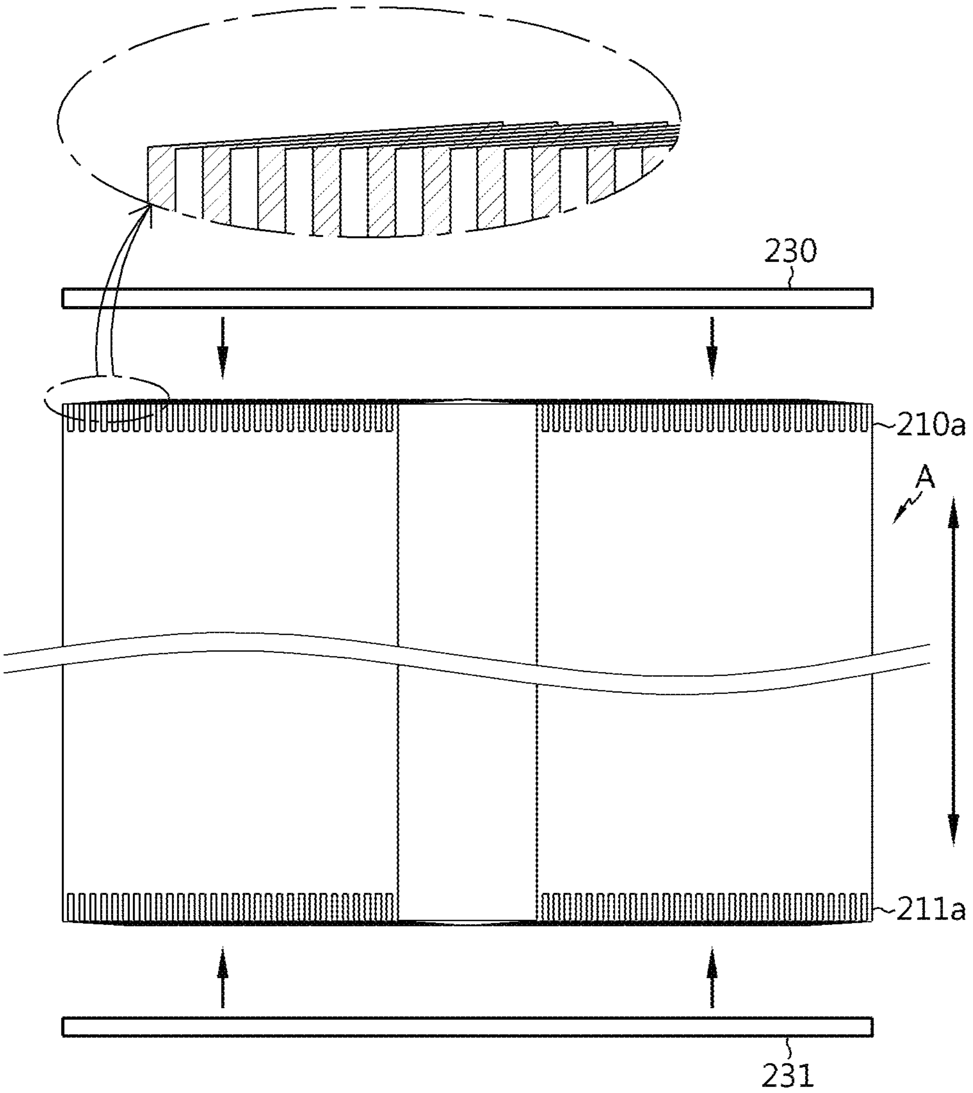
FIG. 3 is a diagram showing a process of welding a current collecting plate to a bent surface of an uncoated portion in the electrode assembly.
Figure 4:
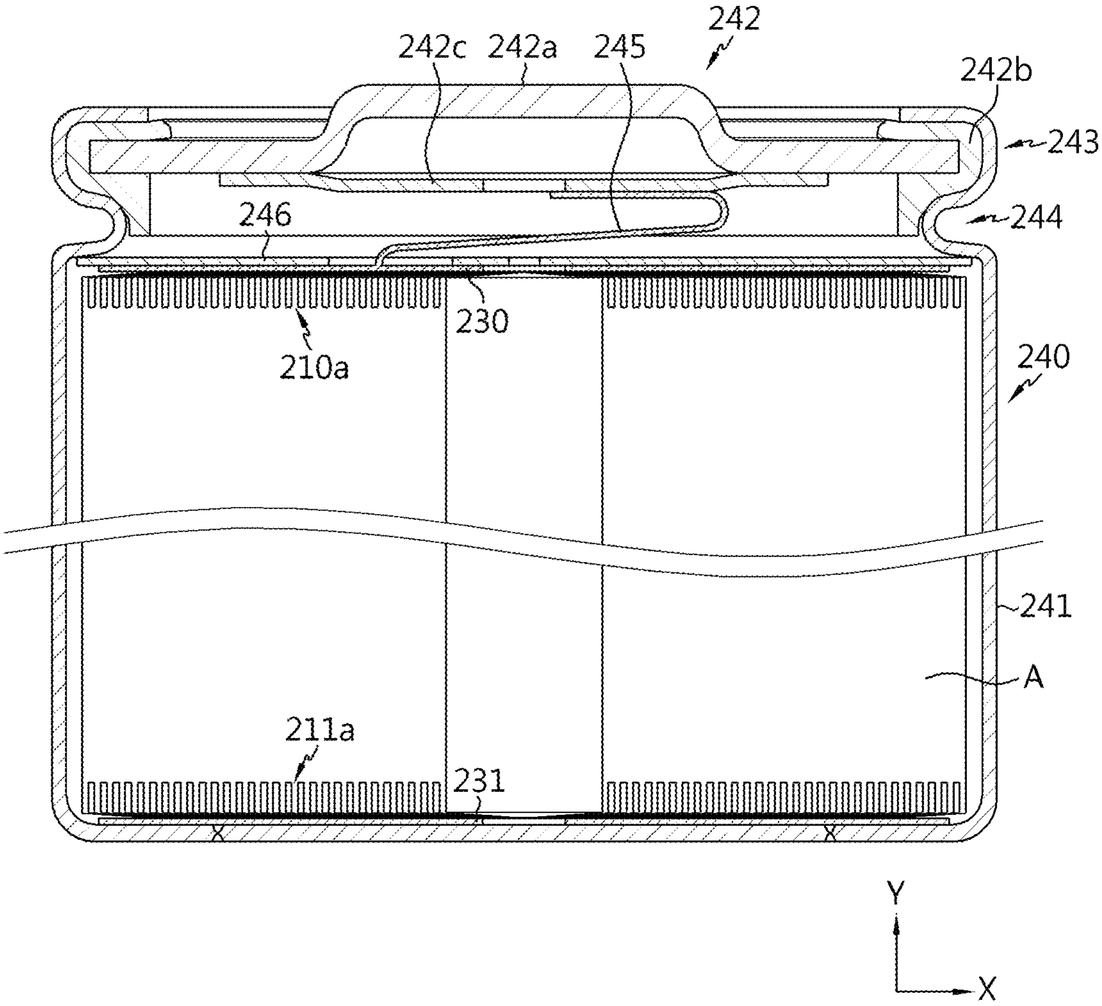
FIG. 4 is a sectional view showing a conventional tab-less cylindrical battery, taken along a longitudinal direction Y.

Referring to FIG. 23, the electrode assembly 100 may be manufactured by the winding method described through FIGS. 1 and 2. For convenience of description, the protruding structures of the uncoated portions 11, 12 extending to the outside of the separator are shown in detail, and the winding structure of the first electrode, the second electrode and the separator is omitted. The uncoated portion 11 that protrudes downward extends from the first electrode, and the uncoated portion 12 that protrudes upward extends from the second electrode.

The pattern in which the heights of the uncoated portions 11, 12 change is schematically shown. That is, the heights of the uncoated portions 11, 12 may vary irregularly according to the position where the section is cut. For example, when a side portion of the trapezoidal segment 93*a* is cut, the height of the uncoated portion in the cross section becomes lower than that of the segment 93*a*. Accordingly, it should be understood that the heights of the uncoated portions 11, 12 shown in the cross-sectional view of the electrode assembly 100 correspond to the average of the height of the uncoated portion included in each winding turn.

Figure 24:
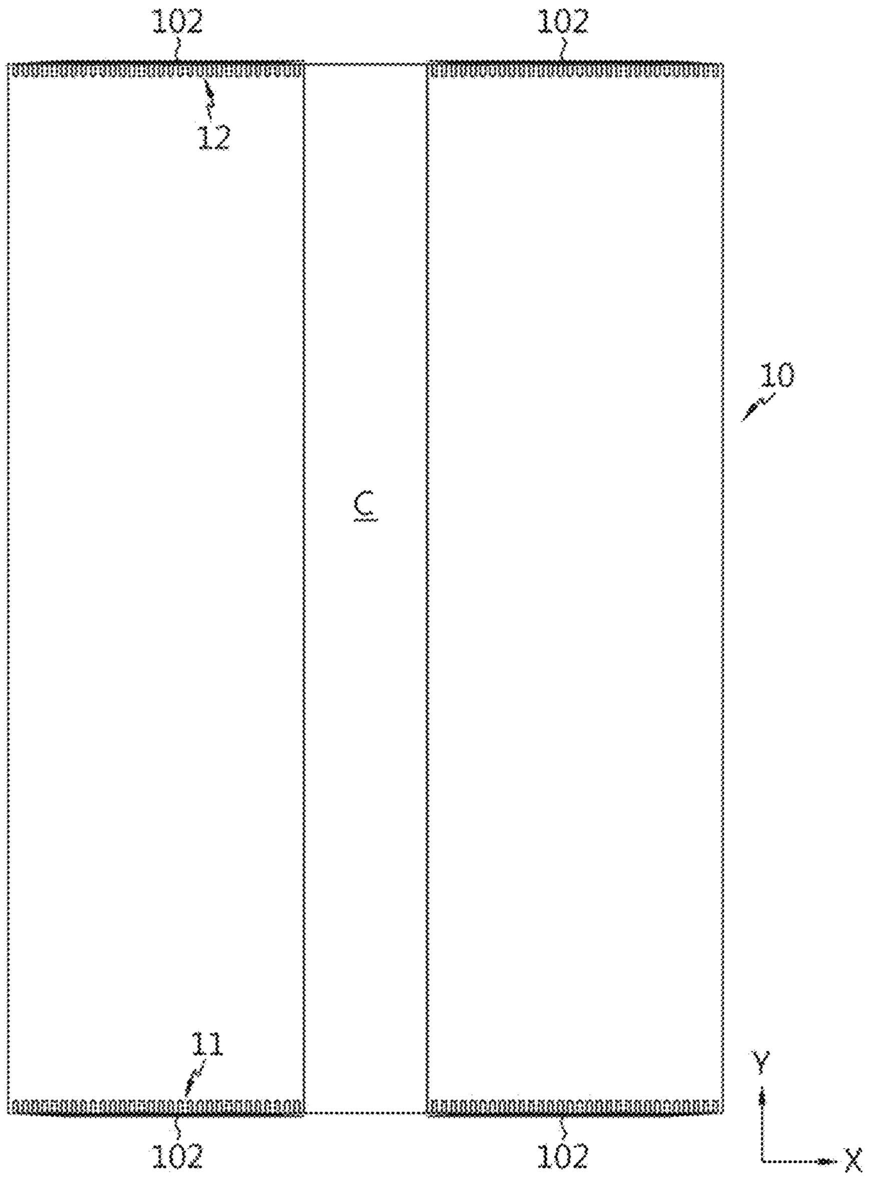
FIG. 24 is a cross-sectional view, taken along the longitudinal direction Y, showing the electrode assembly in which the uncoated portion is bent according to an embodiment of the present disclosure.

As shown in FIG. 24, the uncoated portions 11, 12 may be bent from the outer circumference of the electrode assembly 100 toward the core. In FIG. 23, the bent portion 101 is indicated by a dotted line box. When the uncoated portions 11, 12 are bent, the segments adjacent to each other in a radial direction overlap each other in several layers to form bent surfaces 102 on the upper and lower portions of the electrode assembly 100. At this time, the core-side uncoated portion 93' (FIG. 22) is not bent due to its low height, and the height (h) of the segment bent at the innermost side is less than or equal to the radial length (r) of the winding area formed by the core-side uncoated portion 93' with no segment structure. Therefore, the winding center hole C in the core of the electrode assembly 100 is not closed by the bent segments. If the winding center hole C is not closed, there is no difficulty in the electrolyte injection process, and the electrolyte injection efficiency is improved. In addition, the electrode terminal 50 and the second current collecting plate 70 may be easily welded by inserting a welding tool through the winding center hole C.

In the cylindrical battery 1 according to an embodiment of the present disclosure, the cap plate 40 does not have polarity. Instead, the first current collecting plate 30 is connected to the sidewall of the battery housing 20, so the outer surface of the closed portion 20*a* of the battery housing 20 has polarity opposite to that of the electrode terminal 50. Therefore, when connecting a plurality of cells in series and/or parallel, wiring such as bus bar connection may be performed on the upper portion of the cylindrical battery 1 using the outer surface of the closed portion 20*a* of the battery housing 20 and the electrode terminal 50. Through this, energy density may be improved by increasing the number of cells that can be mounted in the same space.

Hereinafter, an embodiment of a positive electrode active material used in the cylindrical battery according to the present disclosure will be described.

In an embodiment, the "primary particle" is a particle in which no grain boundary appears when observed in a field of view of 5000 to 20000 magnification using a scanning electron microscope (SEM) or an electron back scatter diffraction (EBSD). "Average particle diameter of primary particles" means an arithmetic average value calculated after measuring particle diameters of primary particles observed in a SEM or EBSD image.

"Secondary particle" is a particle formed by aggregating a plurality of primary particles. In the present disclosure, a secondary particle in which 10 or less primary particles are aggregated will be referred to as pseudo-single particles in order to distinguish it from a conventional secondary particle formed by aggregating tens to hundreds of primary particles.

In the present disclosure, "specific surface area" is measured by the BET method, and may be specifically calculated from the nitrogen gas adsorption amount under liquid nitrogen temperature (77K) using BELSORP-mino 11 of BEL Japan.

In the present disclosure, "$D_{min}$", "$D_{50}$" and "$D_{max}$" are particle size values of the cumulative volume distribution of the positive electrode active material measured using a laser diffraction method. Specifically, $D_{min}$ is a minimum particle size appearing in the cumulative volume distribution, $D_{50}$ is a particle size when the volume cumulative amount is 50%, and $D_{max}$ is a maximum particle size appearing in the cumulative volume distribution. If the positive electrode active material is a single particle, $D_{50}$ means an average particle diameter of the primary particles. In addition, when the positive electrode active material is a pseudo-single particle, $D_{50}$ means an average particle diameter of particles formed by aggregating primary particles.

The particle size value of the cumulative volume distribution may be measured by, for example, dispersing the positive electrode active material in a dispersion medium, then introducing the same into a commercially available laser diffraction particle size measuring device (e.g., Microtrac MT 3000), irradiating ultrasonic waves of about 28 kHz with output of 60 W thereto, and obtaining a volume cumulative particle size distribution graph.

In the present disclosure, "consist essentially of A" indicates that the A component and any unmentioned components that do not substantially affect the basic and novel characteristics of the present disclosure are included. The basic and novel characteristics of the present disclosure include at least one of minimizing particle breakage during battery manufacturing, minimizing gas generated by such particle breakage, and minimizing the occurrence of internal cracks. A person skilled in the art may recognize the material influence of these characteristics.

As a result of repeated research to develop a positive electrode for an electrochemical device with high safety while realizing high capacity and an electrochemical device including the same, inventors of the present discloser have confirmed that the safety of a large cylindrical battery can be dramatically improved when the positive electrode active material in the form of a single particle composed of one primary particle or a pseudo-single particle, which is an aggregate of 10 or less primary particles, is used alone as a positive electrode active material.

According to one aspect, the positive electrode includes a positive electrode current collector; and a positive electrode active material layer formed on at least one side surface of the positive electrode current collector, wherein the positive electrode active material layer may include a positive electrode active material, and optionally, a conductive material and/or a binder.

The positive electrode may have a structure in which a positive electrode active material layer is formed on at least one surface or both surfaces of a long sheet-shaped positive electrode current collector, and the positive electrode active material layer may include a positive electrode active material and a binder.

Specifically, the positive electrode may be manufactured by applying a positive electrode slurry, which is prepared by dispersing a positive electrode active material, a conductive material and a binder in a solvent such as dimethyl sulfoxide (DMSO), isopropyl alcohol, N-methyl pyrrolidone (NMP), acetone, water or the like, on one surface or both surfaces of a long sheet-shaped positive electrode current collector, removing the solvent of the positive electrode slurry through a drying process, and then roll-pressing the same. Meanwhile, when the positive electrode slurry is applied, a positive electrode including an uncoated portion (non-coated portion) may be manufactured by not applying the positive electrode slurry to a partial area of the positive electrode current collector, for example, one end of the positive electrode current collector.

In another aspect, the positive electrode active material includes single particle-based active material particles. In one embodiment, the single particle-based active material particles may be 90 wt % or more, 95 wt % or more, 98 wt % or more, or 99 wt % or more, based on 100 wt % of the positive electrode active material. In one specific embodiment, the positive electrode active material may be composed of only the single particle-based active material particles.

In this specification, the single particle-based active material particle refers to a single particle, a pseudo-single particle, or both of them. The single particle is a particle composed of one primary particle, and the pseudo-single particle is an aggregate of 10 or less primary particles.

Conventionally, it has been common to use a spherical secondary particle in which tens to hundreds of primary particles are aggregated as a positive electrode active material of a lithium battery. However, in the case of a positive electrode active material in the form of secondary particles in which many primary particles are aggregated, particle breakage in which primary particles fall off is easy to occur in the rolling process when manufacturing a positive electrode, and cracks occur inside the particles during the charging and discharging process. When particles of the positive electrode active material are broken or cracks occur inside the particles, the contact area with the electrolyte increases, so there is a problem in that gas generation due to a side reaction with the electrolyte increases. If the gas generation inside the cylindrical battery increases, the pressure inside the battery increases and there is a risk of battery explosion. In particular, when the volume of the cylindrical battery is increased, the amount of active material inside the battery increases as the volume increases, and as a result, the amount of gas generated increases significantly, so the risk of ignition and/or explosion of the battery increases further.

In contrast, the single particle-based active material particles in the form of a single particle composed of one primary particle or a pseudo-single particle in which 10 or less primary particles are aggregated have a higher particle strength than the positive electrode active material in the existing secondary particle form in which tens to hundreds of primary particles are aggregated, so particle breakage rarely occurs during the rolling process. In addition, since the number of primary particles constituting the single-particle-based active material particle is small, the volume expansion and contraction of the primary particles during charging and discharging is small, and thus the occurrence of cracks inside the particle is significantly reduced.

Therefore, when using the single particle-based active material particles as in the present disclosure, the amount of gas generated due to particle breakage and internal cracks may be significantly reduced. Accordingly, when the single particle-based active material particles are applied to a large cylindrical battery, excellent safety may be realized.

Meanwhile, the single particle and/or pseudo-single particle is included in an amount of 95 wt % to 100-wt %, preferably 98 wt % to 100 wt %, more preferably 99 wt % to 100 wt %, further preferably 100 wt %, based on the entire weight of the positive electrode active material included in the positive electrode.

When the content of single particle and/or pseudo-single particle satisfies the above range, sufficient safety may be obtained when applied to a large-sized battery. When the positive electrode active material in the form of a secondary particle is included in an amount exceeding 5 wt % in the entire positive electrode active material, the side reaction with the electrolyte increases due to fine powder generated from the secondary particle during electrode manufacturing and charging/discharging, which may deteriorate suppression of gas generation and lower the stability improvement effect when applied to a large-sized battery.

Meanwhile, positive electrode active materials including single particles and/or pseudo-single particles according to the present disclosure may have $D_{min}$ of 1.0 μm or more, 1.1 μm or more, 1.15 μm or more, 1.2 μm or more, or 125 μm or more, 1.3 μm or more, or 1.5 μm or more. When the $D_{min}$ of the positive electrode active material is less than 1.0 μm, the linear pressure increases during the positive electrode rolling process, which may easily cause particle breakage and deteriorate thermal stability, making it impossible to secure sufficient thermal stability when applied to a large-sized cylindrical battery.

Meanwhile, considering resistance and power characteristics, $D_{min}$ of the positive electrode active material may be 3 μm or less, 2.5 μm or less, or 2 μm or less. If $D_{min}$ is too large, the lithium ion diffusion distance within the particles may increase, and thus the resistance and power characteristics may deteriorate.

For example, $D_{min}$ of the positive electrode active material may be 10 μm to 3 μm, 1.0 μm to 2.5 μm, or 1.3 μm to 2.0 μm.

Meanwhile, the positive electrode active material may have a $D_{50}$ of 5 μm or less, 4 μm or less, or 3 μm or less, and may be, for example, 0.5 μm to 5 μm, preferably 1 μm to 5 μm, more preferably 2 μm to 5 μm.

The positive electrode active material in the form of single particles and/or pseudo-single particles has less lithium mobility than the positive electrode active material in the form of secondary particles because there are fewer interfaces between primary particles that serve as a diffusion path for lithium ions inside the particles, and accordingly there is a problem that the resistance increases. The increase in resistance intensifies as the size of the particles increases, and when the resistance increases, capacity and power characteristics are adversely affected. Therefore, by adjusting $D_{50}$ of the positive electrode active material to 5 μm or less, it is possible to suppress an increase in resistance by minimizing the lithium ion diffusion distance inside the positive electrode active material particle.

In addition, the positive electrode active material may have $D_{max}$ of 12 μm to 17 μm, preferably 12 μm to 16 μm, and more preferably 12 μm to 15 μm. When $D_{max}$ of the positive electrode active material satisfies the above range, resistance characteristics and capacity characteristics are more excellent. If $D_{max}$ of the positive electrode active material is too large, aggregation has occurred between single particles, and the lithium movement path inside the agglomerated particles is lengthened, resulting in poor lithium mobility, which may increase resistance. Meanwhile, if $D_{max}$ of the positive electrode active material is too small by excessive crushing process, $D_{min}$ may decrease to less than 1 μm, which causes particle breakage during rolling and deteriorates thermal stability.

Meanwhile, the positive electrode active material may have a particle size distribution (PSD) represented by Formula 1 below of 3 or less, preferably 2 to 3, more preferably 2.3 to 3.

$$\text{particle size distribution } (PSD) = (D_{max} - D_{min})/D_{50} \quad \text{Formula 1}$$

When the positive electrode active material has the above particle size distribution, the electrode density of the positive electrode may be properly maintained, and particle breakage and resistance increase may be effectively suppressed.

Meanwhile, the positive electrode active material may have an average particle diameter of the primary particles of 5 μm or less, 4 μm or less, 3 μm or less, or 2 μm or less, and may be, for example, 0.5 μm to 5 μm, preferably 1 μm to 5 μm, more preferably 2 m to 5 μm. When the average particle diameter of the primary particles satisfies the above range, the positive electrode active material in the form of a single particle and/or pseudo-single particle having excellent electrochemical properties may be formed. If the average particle diameter of the primary particles is too small, the number of aggregations of the primary particles forming the positive electrode active material increases, reducing the effect of suppressing particle breakage during rolling. If the average particle diameter of the primary particles is too large, the lithium diffusion path may be elongated, increasing resistance and deteriorating power characteristics.

In the present disclosure, the positive electrode active material preferably has a unimodal particle size distribution. Conventionally, in order to improve the electrode density of the positive electrode active material layer, bimodal positive electrode active materials in which a large particle diameter positive electrode active material with a large average particle diameter and a small particle diameter positive electrode active material with a small average particle diameter are mixed has been used frequently. However, in the positive electrode active material in the form of single particles or pseudo-single particles, when the particle size increases, the lithium movement path lengthens and the resistance increases remarkably. Thus, when large-diameter particles are mixed and used, a problem of deterioration in capacity and power characteristics may occur. Therefore, in the present disclosure, the increase in resistance may be minimized by using a positive electrode active material having a unimodal distribution.

Meanwhile, the positive electrode active material may include lithium nickel-based oxide, and specifically, may include lithium nickel-based oxide containing 80 mol % or more of Ni based on the total number of moles of transition metal. Preferably, the lithium nickel-based oxide may include 80 mol % or more and less than 100 mol % of Ni, 82 mol % or more and less than 100 mol % of Ni, or 83 mol % or more and less than 100 mol % of Ni. When the lithium nickel-based oxide having a high Ni content is used as above, high capacity may be realized.

More specifically, the positive electrode active material may include a lithium nickel-based oxide represented by the following [Chemical Formula 1].

$$Li_aNi_bCo_cM^1_dM^2_eO_2 \quad \text{[Chemical Formula 1]}$$

In Chemical Formula 1, $M^1$ may be Mn, Al or a combination thereof, and may be preferably Mn or Mn and Al.

$M^2$ is at least one selected from the group consisting of Zr, W, Y, Ba, Ca, Ti, Mg, Ta and Nb, preferably at least one selected from the group consisting of Zr, Y, Mg, and Ti, more preferably Zr, Y or a combination thereof. The $M^2$ element is not necessarily included, but when included in an appropriate amount, it may play a role of promoting grain growth or improving crystal structure stability during sintering.

The a represents the molar ratio of lithium in the lithium nickel-based oxide, and may be $0.8 \le a \le 1.2$, $0.85 \le a$ 1.15, or $0.9 \le a \le 1.2$. When the molar ratio of lithium satisfies the above range, a crystal structure of lithium nickel-based oxide may be stably formed.

The b represents the molar ratio of nickel among all metals except lithium in the lithium nickel-based oxide, and may be $0.8 \le b \le 1$, $0.82 \le b \le 1$, $0.8 \le b \le 1$, $0.85 \le b \le 1$, $0.88 \le b \le 1$ or $0.900 \le b \le 1$. When the molar ratio of nickel satisfies the above range, it is possible to realize high capacity by exhibiting high energy density.

The c represents the molar ratio of cobalt among all metals except lithium in the lithium nickel-based oxide, and may be $0 \le c \le 0.2$, $0 \le c \le 0.18$, $0.01 \le c \le 017$, $0.01 \le c \le 0.15$, $0.01 \le c \le 0.12$ or $0.01 \le c \le 0.10$. When the molar ratio of cobalt satisfies the above range, good resistance characteristics and power characteristics may be implemented.

The d represents the molar ratio of $M^1$ element among all metals except lithium in the lithium nickel-based oxide, and may be $0 \le d \le 0.2$, $0 \le d \le 0.18$, $0.01 \le d \le 0.17$, $0.01 \le d \le 0.15$, $0.01 \le d \le 0.12$, or $0.01 \le d \le 0.10$. When the molar ratio of $M^1$ element satisfies the above range, the structural stability of the positive electrode active material is excellent.

The e represents the molar ratio of $M^2$ element among all metals except for lithium in the lithium nickel-based oxide, and may be $0 \le e \le 0.1$ or $0 \le e \le 0.05$.

Meanwhile, the positive electrode active material according to the present disclosure may further include, if necessary, a coating layer including at least one coating element selected from the group consisting of Al, Ti, W, B, F, P, Mg, Ni, Co, Fe, Cr, V, Cu, Ca, Zn, Zr, Nb. Mo, Sr, Sb, Bi, Si and S on the surface of the lithium nickel-based oxide particle. Preferably, the coating element may be Al, B, Co, or a combination thereof.

When the coating layer is present on the surface of lithium nickel-based oxide particles, contact between the electrolyte and the lithium nickel-based oxide is suppressed by the coating layer, thereby reducing transition metal elution or gas generation due to side reactions with the electrolyte.

The positive electrode active material may be included in an amount of 80 wt % to 99 wt %, preferably 85 wt % to 99 wt %, more preferably 90 wt % to 99 wt %, based on the total weight of the positive electrode active material layer.

Meanwhile, as the positive electrode current collector, various positive electrode current collectors used in the art may be used. For example, stainless steel, aluminum, nickel, titanium, calcined carbon or aluminum, or stainless steel surface-treated with carbon, nickel, titanium, silver, or the like may be used as the positive electrode current collector.

The positive electrode current collector may typically have a thickness of 3 μm to 500 μm, and fine irregularities may be formed on the surface of the positive electrode current collector to increase adhesion of the positive electrode active material. The positive electrode current collector may be used in various forms of, for example, film, sheet, foil, net, porous material, foam, or nonwoven fabric.

Meanwhile, in one embodiment of the present disclosure, all or some of the single particle-based active material particles may have a core-shell structure in which the particle surface is coated with a conductive coating layer. The conductive coating layer may cover at least some or all of the particles. The conductive coating layer includes conductive nanomaterials.

The single particle-based active material particle has a problem in that the electrical conductivity is lowered because the resistance is higher than that of the conventional secondary particle type positive electrode active material and the contact area with the conductive material is small. When an excessive amount of conductive material is added to improve electrical conductivity, aggregation occurs in the positive electrode slurry, resulting in increased viscosity, which causes poor coating properties. Therefore, in order to implement smooth coating properties, the viscosity of the positive electrode slurry must be lowered by reducing the solid content. However, if the solid content in the positive electrode slurry decreases, the active material content decreases, which may deteriorate the capacity characteristics. In the present disclosure, in order to solve this problem, the surface of the single particle-based active material is coated with a conductive nanomaterial, so that excellent electrical conductivity may be realized without adding a separate conductive material to the positive electrode slurry.

In one embodiment of the present disclosure, when the single particle-based active material coated with a conductive nanomaterial is applied as the positive electrode active material, the positive electrode active material layer may not include a conductive material on a portion other than the conductive coating layer. Since there is no need to additionally use a conductive material that causes aggregation of the positive electrode slurry as described above, the viscosity of the positive electrode slurry may be reduced, the solid content may be decreased, and the electrode coating process efficiency and electrode adhesion may be improved.

In the present disclosure, the conductive nanomaterial may be a conductive material having a nano size so as to be smoothly coated on particles, and the type is not particularly limited. For example, the conductive nanomaterial may be a carbon nanotube, carbon nanoparticle, or the like.

The conductive nanomaterial may have various shapes, and may be, for example, spherical, flaky, or fibrous.

Meanwhile, the conductive coating layer may be formed by mixing single particle-based active material particles, which are a core part, and a conductive nanomaterial, and then thermally treating the mixture. At this time, the mixing may be performed as solid mixing or liquid mixing.

In one embodiment of the present disclosure, the positive electrode active material layer contains flake graphite. When using the single particle-based active material as the positive electrode active material, if the positive electrode active material layer contains flake graphite, in the case of rolling the positive electrode active material layer, the sliding effect of the flake graphite on the positive electrode active material is provided to improve the rolling characteristics of the electrode, and the porosity of the electrode may be lowered to a desired level. Accordingly, stability, initial resistance characteristics, and charge/discharge efficiency of a battery to which the positive electrode according to the present disclosure is applied may be improved.

In one embodiment of the present disclosure, the flake graphite may be included in an amount of 0.1 wt % to 5 wt %, preferably 0.1 wt % to 3 wt %, based on 100 wt % of the positive electrode active material layer.

When the content of flake graphite satisfies the above range, the positive electrode rolling characteristics are improved and excellent electrode density may be realized. If the content of flake graphite is too small, the effect of improving the rolling properties is insignificant, and if it is too large, it may cause an increase in slurry viscosity and decrease in phase stability, and resistance may increase due to a decrease in electrode uniformity through coupling with a conductive material.

Meanwhile, the flake graphite used in the present disclosure may have an average particle diameter of 1 μm to 20 μm, preferably 2 μm to 10 μm, more preferably 3 μm to 5 μm, but is not limited thereto. If the size of the flake graphite is too small, it is difficult to realize the desired porosity, and the current density may be lowered, resulting in lower capacity. At this time, the average particle diameter of the flake graphite may be measured using a laser diffraction method (ISO 13320).

In addition, the flake graphite may have an aspect ratio of 0.1 to 500, preferably 1 to 100, more preferably 1 to 30. When the aspect ratio of flake graphite satisfies the above range, the effect of lowering electrode resistance by improving conductivity occurs.

In addition, the flake graphite may have a density of 2.0 g/cm$^3$ to 2.5 g/cm$^3$ preferably 2.1 g/cm$^3$ to 2.4 g/cm$^3$, more preferably 2.2 g/cm$^3$ to 2.3 g/cm$^3$.

Meanwhile, in the present disclosure, the porosity of the positive electrode active material layer may be 15% to 23%, preferably 17% to 23%, more preferably 18% to 23%. When the porosity of the positive electrode active material layer satisfies the above range, the electrode density increases to realize excellent capacity and the resistance decreases. If the porosity is too low, the electrolyte impregnability is low, and lithium precipitation may occur due to non-impregnation of the electrolyte. If the porosity is too high, the contact between the electrodes is not good, which increases the resistance and decreases the energy density, so the capacity improvement effect is insignificant.

The porosity value of the positive electrode active material layer may be achieved i) by the positive electrode active material containing single particle-based active material particles and ii) by adding flake graphite to the positive electrode active material.

In implementing a high loading electrode with a relatively high loading amount of the positive electrode active material, when using a positive electrode active material in the form of a single particle or pseudo-single particle as in the present disclosure, particle breakage of the active material during rolling is significantly reduced compared to the conventional positive electrode active material in the form of a secondary particle, and damage to the positive electrode current collector (Al foil) is reduced, so rolling is possible with a relatively high linear pressure. Therefore, the porosity of the positive electrode active material layer may be decreased to the numerical range as described above, so the energy density may be increased.

In addition, if the positive electrode active material layer contains flake graphite as in the present disclosure, the flake graphite may provide a sliding effect during rolling and fill the pores of the positive electrode active material layer, so the porosity of the positive electrode active material layer may be reduced to the above numerical range.

In addition, the positive electrode may have a loading amount of 570 mg/25 cm$^2$ or more, preferably 600 mg/25 cm$^2$ to 800 mg/25 cm, more preferably 600 mg/25 cm$^2$ to 750 mg/25 cm$^2$. Specifically, in the lithium secondary battery according to the present disclosure, the loading amount of the positive electrode may be secured in a relatively high level because the rolling characteristics of the electrode are improved by applying a single particle and/or pseudo-single particle positive electrode active material and flake graphite, and through this, high-capacity characteristics may be implemented.

In one embodiment of the present disclosure, the positive electrode active material layer may further include a conductive material. The conductive material is used to impart conductivity to the electrode, and any material that does not cause chemical change inside the battery and has electronic conductivity may be used without particular limitations. Specific examples may include graphite such as natural graphite or artificial graphite; carbon-based materials such as carbon black, acetylene black, Ketjen black, channel black, furnace black, lamp black, thermal black, carbon fiber, or carbon nanotube; metal powder or metal fiber such as copper, nickel, aluminum, or silver; conductive whiskers such as zinc oxide or potassium titanate; conductive metal oxides such as titanium oxide; and conductive polymers of polyphenylene derivatives and the like, which may be used alone or as a mixture. The conductive material may be typically included in an amount of 1 wt % to 30 wt %, preferably 1 wt % to 20 wt %, more preferably 1 wt % to 10 wt %, based on the total weight of the positive electrode active material layer.

In one specific embodiment of the present disclosure, the conductive material may include carbon nanotube.

In one embodiment of the present disclosure, the positive electrode active material may include a multi-wall carbon nanotube having a large specific surface area and a small wall number as a conductive material. The multi-wall carbon nanotube may be included in an amount of 50 wt % or more, 70 wt % or more, 90 wt % or more, or 99 wt % or more, based on 100 wt % of the conductive material. In a specific embodiment of the present disclosure, the conductive material may include only the multi-walled carbon nanotube.

In the present disclosure, the multi-wall carbon nanotube has a BET specific surface area of 300 m$^2$/g to 500 m$^2$/g. The multi-wall carbon nanotube is referred to as 'new CNT' in order to be distinguished from the conventional one.

Figure 25:
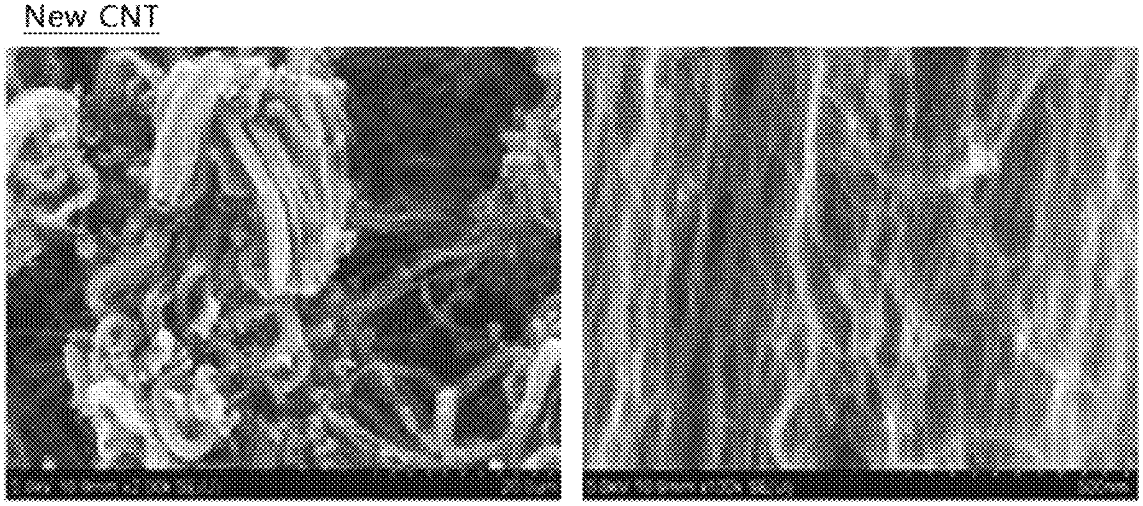
FIG. 25 is a scanning electron microscope (SEM) photograph showing a carbon nanotube (existing CNT) commonly used in the prior art.
Figure 26:
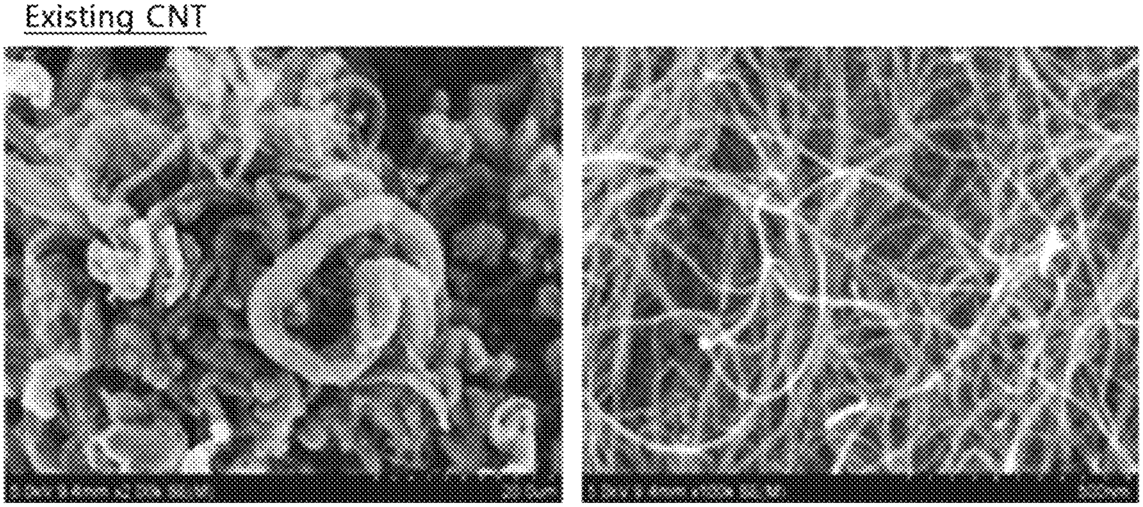
FIG. 26 is a SEM photograph showing a novel CNT according to an embodiment of the present disclosure.
Figures 27, 28:
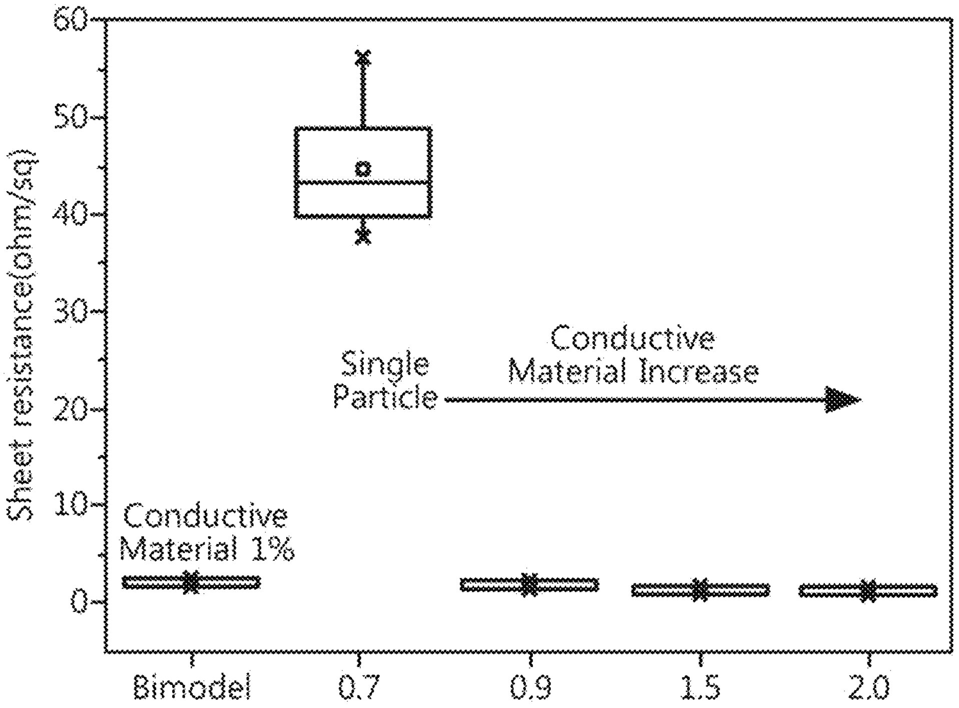
FIG. 27 is a table showing the comparison of physical properties of the existing CNT and the new CNT.
FIGS. 28 to 31 are graphs showing sheet resistance and high-temperature life characteristics for each conductive material ratio when single particle-based active material particles are applied as the positive electrode active material.
Figure 29:
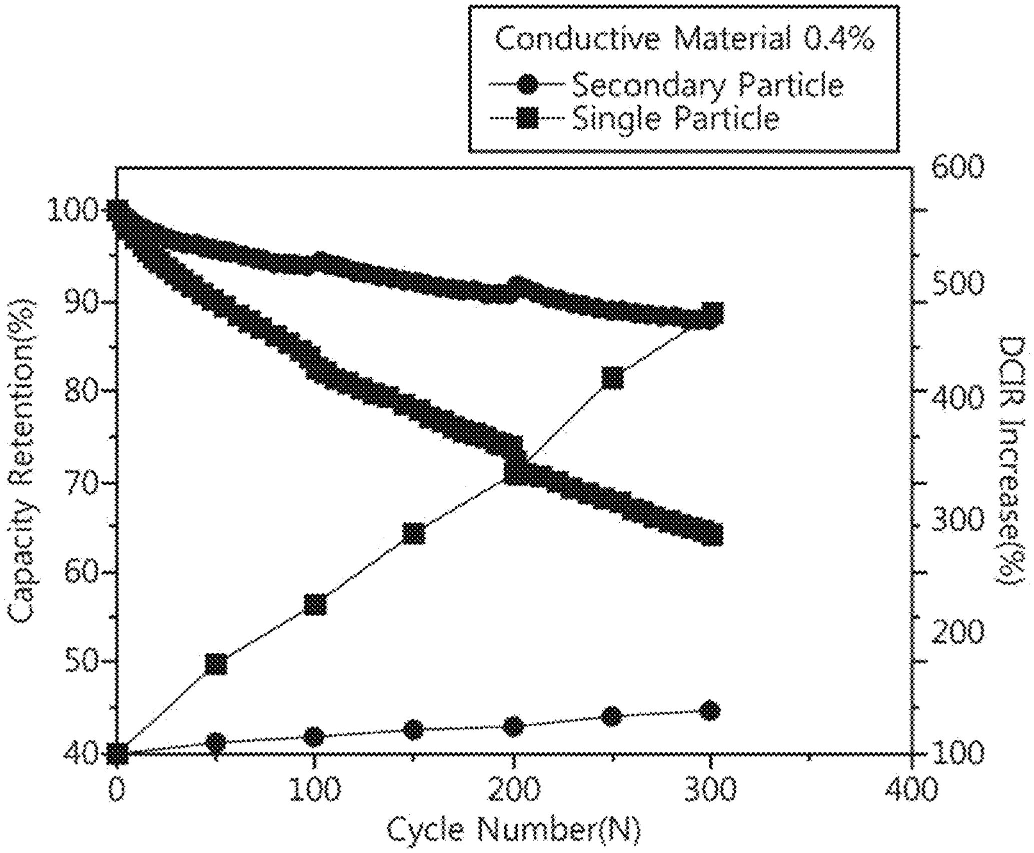
Figure 30:
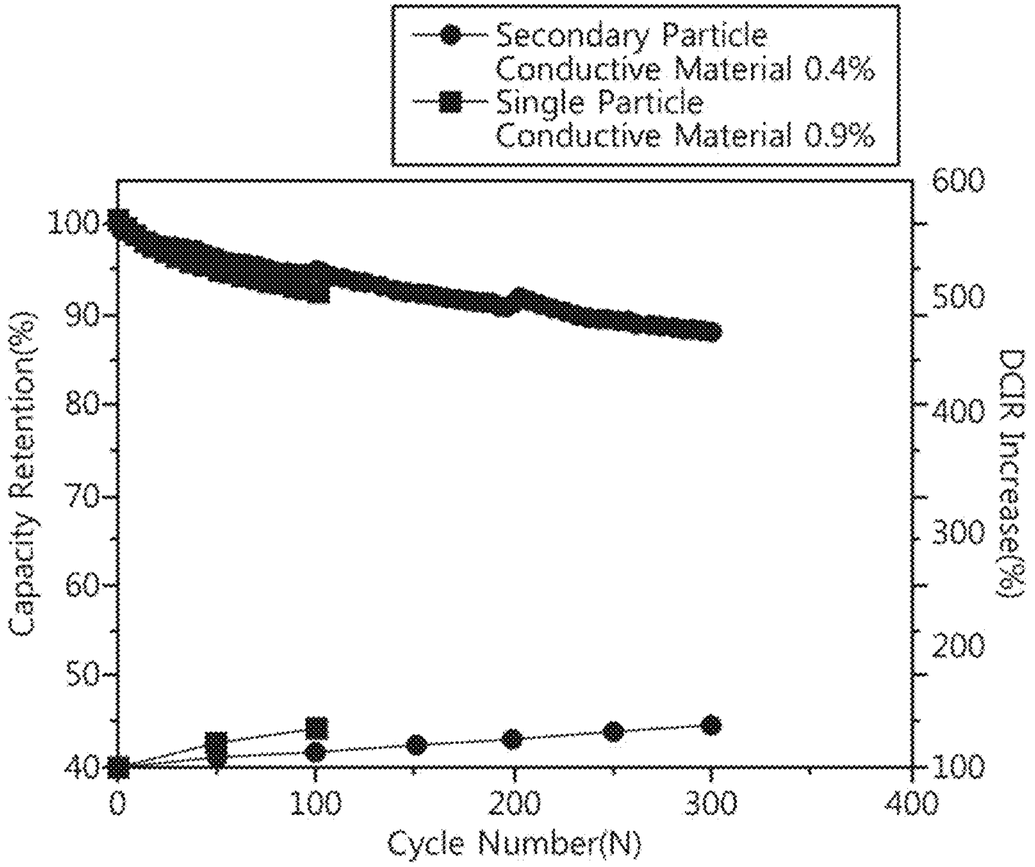

The carbon nanotube (conventional CNT) commonly used in the art had a BET specific surface area of less than 300 $m^2/g$. The SEM images and physical properties (FIG. 27) of the new CNT (FIG. 25) used in the present disclosure and the existing CNT (FIG. 26) may be compared as follows.

As can be seen from the SEM images, the new CNT applied to the present disclosure is a bundled type and has a multi-wall structure, but has a higher BET and a smaller wall number and diameter than the conventional CNT.

In the case of using the positive electrode active material in the form of a secondary particle, sufficient electrical conductivity could be achieved even if the existing CNT was used at a level of 0.4 wt % to 0.6 wt %. However, the single particle or pseudo-single particle positive electrode active material has higher resistance, compared to the conventional secondary particle type positive electrode active material, and the contact area with the conductive material is small, so the electrical conductivity is low. Thus, in order to realize sufficient electrical conductivity using the existing CNT with a BET specific surface area of less than 300 $m^2/g$, the content of the conductive material must be 0.9 wt % or more.

FIGS. 28 to 31 are graphs showing sheet resistance and high-temperature life characteristics for each conductive material ratio when single particles or pseudo-single particles are applied as the positive electrode active material.

Through the graphs, it may be understood that when a single particle or pseudo-single particle is applied as the positive electrode active material, the usage amount of conductive material should increase compared to the case of applying an existing positive electrode active material in the form of a secondary particle.

However, when the content of carbon nanotube is increased to 0.9 wt % or more, aggregation occurs in the positive electrode slurry, resulting in an increase in viscosity, and thus coating properties deteriorate. Therefore, in order to implement smooth coating properties, the viscosity of the positive electrode slurry must be lowered by reducing the solid content in the positive electrode slurry. However, when the solid content in the positive electrode slurry decreases, the content of active material decreases and the capacity characteristics deteriorate.

As a result of repeated research to solve this problem, the inventors of the present disclosure have found that when a carbon nanotube with a BET specific surface area of 300 $m^2/g$ to 500 $m^2/g$ is applied as a conductive material together with a positive electrode active material, which is a single particle-based active material particle, sufficient electrical conductivity can be secured with only a relatively small amount of carbon nanotube, and accordingly, the slurry viscosity can be maintained low even when the solid content of the positive electrode slurry is formed as high as 70 wt % to 80 wt %.

Specifically, the carbon nanotube used in the present disclosure may be a multi-wall carbon nanotube having a BET specific surface area of 300 $m^2/g$ to 500 $m^2/g$, preferably 300 $m^2/g$ to 450 $m^2/g$. When the BET specific surface area satisfies the above range, sufficient electrical conductivity may be secured even with a small amount of carbon nanotube.

In addition, the carbon nanotube may be a multi-wall carbon nanotube having a wall number of 2 to 8, preferably 2 to 6, more preferably 3 to 6.

In addition, the carbon nanotube may have a diameter of 1 nm to 8 nm, preferably 3 urn to 8 nm, more preferably 3 nm to 6 nm.

The carbon nanotube may be included in an amount of 0.7 wt % or less, preferably 0.3 wt % to 0.7 wt %, more preferably 0.4 wt % to 0.6 wt %, based on the total weight of the positive electrode active material layer. When the content of the carbon nanotube satisfies the above range, sufficient electrical conductivity may be achieved, and the solid content in the positive electrode slurry may be maintained high, so that the content of the positive electrode active material may be high in the positive electrode active material layer and, as a result, excellent capacity characteristics may be implemented.

Figures 31, 32:
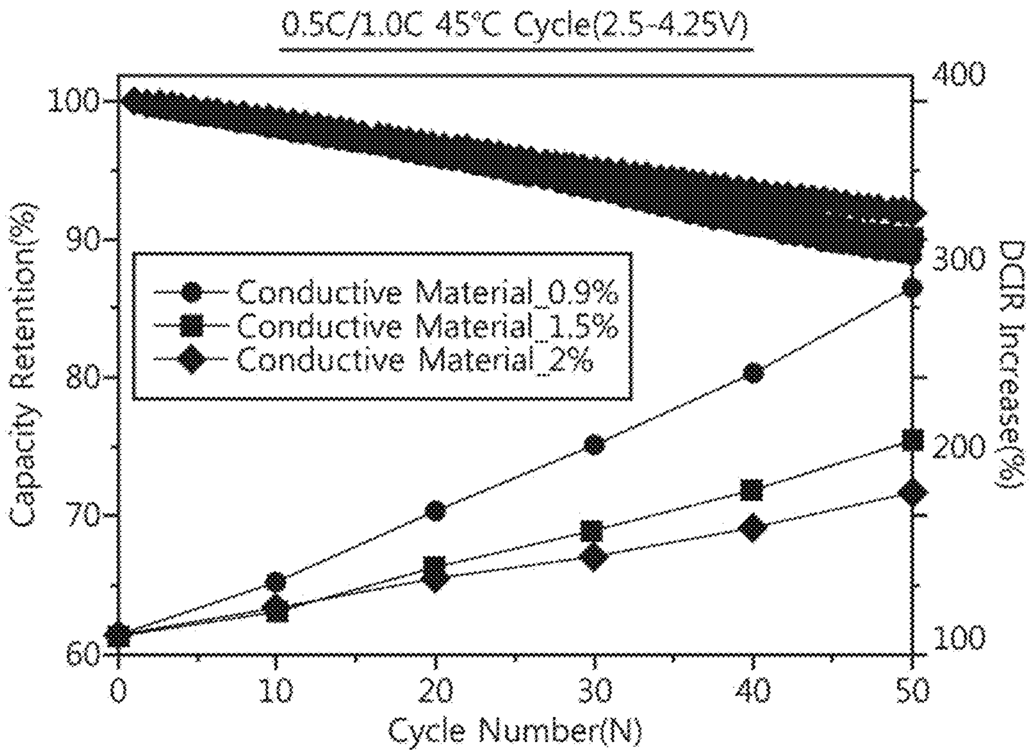
FIG. 32 is a table comparatively showing the solid content and viscosity of the positive electrode slurry and the resistance values of the MP coating layer and the MP interface layer when carbon nanotubes (new CNT) with a BET specific surface area of 300 $m^2/g$ to 500 $m^2/g$ are applied and when carbon nanotubes (existing CNT) with a BET of 200 $m^2/g$ or more and less than 300 $m^2/g$ are applied.

The table shown in FIG. 32 comparatively shows the solid content and viscosity of the positive electrode slurry and the resistance values at the MP coating layer and MP interface layer in the case where a carbon nanotube (new CNT) having a BET specific surface area of 300 $m^2/g$ to 500 $m^2/g$ is applied and the case where a carbon nanotube (existing CNT) having a BET of 200 m/g or more and less than 300 $m^2/g$ is applied. Through the table, it may be found that when the new CNT is applied, the positive electrode slurry has a lower viscosity and excellent electrical conductivity even when the solid content of the positive electrode slurry is higher than that of the conventional CNT.

The binder serves to improve the attachment among the particles of the positive electrode active material and the adhesion between the positive electrode active material and the positive electrode current collector. Specific examples of the binder include polyvinylidene fluoride (PVDF), vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinyl pyrrolidone, polytetrafluoroethylene, polyethylene, polypropylene, ethylene-propylene-diene monomer rubber (EPDM rubber), sulfonated-EPDM, styrene butadiene rubber (SBR), fluoro rubber, or various copolymers thereof, which may be used alone or as a mixture. The binder may be included in an amount of 1 wt % to 30 wt %, preferably 1 wt % to 20 wt %, more preferably 1 wt % to 10 wt %, based on the total weight of the positive electrode active material layer.

Another aspect of the present disclosure relates to an electrode assembly including the positive electrode, and a battery including the electrode assembly. The electrode assembly includes a negative electrode and a positive electrode, and the positive electrode has the above-described characteristics.

In the electrode assembly, for example, a separator may be stacked to be interposed between the negative electrode and the positive electrode to form a stacked or stacked/folded structure, or may be wound to form a jelly-roll structure. In addition, when the jelly-roll structure is formed, a separator may be additionally placed on the outer side in order to prevent the negative electrode and the positive electrode from contacting each other.

The negative electrode includes a negative electrode current collector; and a negative electrode active material layer formed on at least one side surface of the negative electrode current collector. The negative electrode may have a structure in which a negative electrode active material layer is formed on one surface or both surfaces of a long sheet-shaped negative electrode current collector, and the negative electrode active material layer may include a negative electrode active material, a conductive material, and a binder.

Specifically, the negative electrode may be manufactured by coating a negative electrode slurry, which is prepared by dispersing a negative electrode active material, a conductive material and a binder in a solvent such as dimethyl sulfoxide (DMSO), isopropyl alcohol, N-methylpyrrolidone (NMP), acetone, or water, on one surface or both surfaces of a long sheet-shaped negative electrode current collector, removing the solvent of the negative electrode slurry through a drying process, and then roll-pressing. When the negative electrode slurry is coated, a negative electrode having an uncoated portion may be manufactured by not applying the negative electrode slurry to a partial area of the negative electrode current collector, for example, one end of the negative electrode current collector.

As the negative electrode active material, a compound capable of reversible intercalation and de-intercalation of lithium may be used. Specific examples of the negative electrode active material include carbonaceous materials such as artificial graphite, natural graphite, graphitized carbon fiber, or amorphous carbon; silicon-based materials such as Si, Si-Me alloy (where Me is at least one selected from the group consisting of Al, Sn, Mg, Cu, Fe, Pb, Zn, Mn, Cr, Ti, and Ni), $SiO_y$ (where $0 \leq y \leq 2$), or Si—C composites; lithium metal thin film; metal materials capable of being alloyed with lithium, such as Sn or Al; and the like, which may be used alone or as a mixture.

In the present disclosure, the negative electrode may include a silicon-based negative electrode active material. The silicon-based negative electrode active material may be a Si, Si-Me alloy (where Me is one selected from the group consisting of Al, Sn, Mg, Cu, Fe, Pb, Zn, Mn, Cr, Ti, and Ni), SiO, (here, $0 \leq y \leq 2$), Si—C composites, or a combination thereof, and may be preferably $SiO_y$ (here, $0 \leq y \leq 2$). Since the silicon-based negative electrode active material has a high theoretical capacity, capacity characteristics may be improved when the silicon-based negative electrode active material is included.

The silicon-based negative electrode active material may be doped with $M^b$ metal, and in this case, the $M^b$ metal may be a Group 1 metal element or a Group 2 metal element, and specifically, may be Li, Mg, or the like. Specifically, the silicon-based negative electrode active material may be Si, $SiO_y$ (here, $0 \leq y \leq 2$), Si—C composites, or the like, doped with $M^b$ metal. In the case of the metal-doped silicon-based negative electrode active material, the active material capacity is somewhat lowered due to the doping element, but high energy density may be realized due to its high efficiency.

Figure 56:
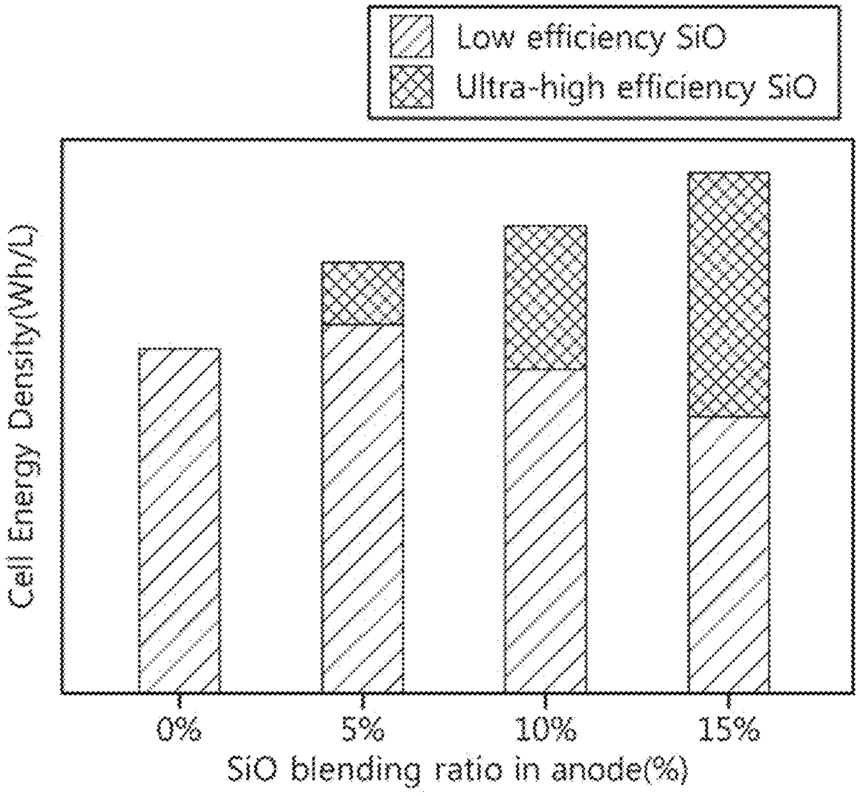
FIG. 56 is a graph showing the change in energy density depending on the content of a silicon-based negative electrode active material and the presence or absence of doping of the silicon-based negative electrode active material, in a battery using a mixture of a silicon-based negative electrode active material and a carbon-based negative electrode active material as a negative electrode active material.

FIG. 56 is a graph showing the change in energy density depending on the content of a silicon-based negative electrode active material and the presence or absence of doping of the silicon-based negative electrode active material, in a battery using a mixture of a silicon-based negative electrode active material and a carbon-based negative electrode active material as a negative electrode active material.

In FIG. 56, low efficiency SiO refers to un-doped SiO, and ultra-high efficiency SiO refers to Mg/Li-doped SiO. Through FIG. 56, it may be found that the energy density improves as the content of the silicon-based negative electrode active material among the total negative electrode active materials increases. In addition, it may be found that as the ratio of the doped silicon-based negative electrode active material among the silicon-based negative electrode active materials increases, the effect of improving the energy density becomes better.

The silicon-based negative electrode active material may further include a carbon coating layer on the particle surface. At this time, the carbon coating amount may be 20 wt % or less, preferably 1 wt % to 20 wt %, based on the total weight of the silicon-based negative electrode active material. The carbon coating layer may be formed through a method such as dry coating, wet coating, chemical vapor deposition (CVD), physical vapor deposition (PVD), or atomic layer deposition (ALD).

In one embodiment of the present disclosure, the silicon-based negative electrode active material may have a capacity of 1000 mAh/g to 4000 mAh/g, and an initial efficiency of about 60% to 95%.

In another embodiment of the present disclosure, $D_{50}$ of the silicon-based negative electrode active material may be 3 urn to 8 μm, and $D_{min}$ to $D_{max}$ may be included in the range of 0.5 μm to 30 urn.

The negative electrode, if necessary, may further include a carbon-based negative electrode active material as a negative electrode active material. The carbon-based negative electrode active material may be, for example, artificial graphite, natural graphite, graphitized carbon fiber, amorphous carbon, soft carbon, hard carbon, or the like, but is not limited thereto.

When using a mixture of the silicon-based negative electrode active material and the carbon-based negative electrode active material as the negative electrode active material, the mixing ratio of the silicon-based negative electrode active material and the carbon-based negative electrode active material may be 1:99 to 20:80, preferably 1:99 to 15:85, more preferably 1:99 to 10:90, in weight ratio.

The negative electrode active material may be included in an amount of 80 wt % to 99 wt %, preferably 85 wt % to 99 wt %, more preferably 90 wt % to 99 wt %, based on the total weight of the negative electrode active material layer.

If necessary, the negative electrode active material may further include at least one selected from lithium metal and metal materials capable of alloying with lithium, such as Sri or Al.

As the negative electrode current collector, negative electrode current collectors generally used in the art may be used, and, for example, copper, stainless steel, aluminum, nickel, titanium, calcined carbon; copper or stainless steel surface-treated with carbon, nickel, titanium, silver, etc.; aluminum-cadmium alloy; and the like may be used. The negative electrode current collector may typically have a thickness of 3 μm to 500 μm, and, like the positive electrode current collector, fine irregularities may be formed on the surface of the current collector to enhance the bonding force of the negative electrode active material. For example, the negative electrode current collector may be used in various forms such as films, sheets, foils, nets, porous materials, foams, or nonwoven fabrics.

The conductive material is used to impart conductivity to the negative electrode, and any material that has electronic conductivity without causing chemical change inside the battery may be used without particular limitations. Specific examples of the conductive material include graphite such as natural graphite or artificial graphite; carbon-based materials such as carbon black, acetylene black, Ketjen black, channel black, furnace black, lamp black, thermal black, carbon fiber, or carbon nanotube; metal powders or metal fibers such as copper, nickel, aluminum, or silver; conductive whiskers such as zinc oxide or potassium titanate; conductive metal oxides such as titanium oxide; and conductive polymers such as polyphenylene derivatives, which may be used alone or as a mixture. The conductive material may be typically included in an amount of 1 wt % to 30 wt %, preferably 1 wt % to 20 wt %, more preferably 1 wt % to 10 wt %, based on the total weight of the negative electrode active material layer.

The binder serves to improve the attachment among the particles of the negative electrode active material and the adhesion between the negative electrode active material and the negative electrode current collector. Specific examples of the binder include polyvinylidene fluoride (PVDF), vinylidene fluoride-hexafluoropropylene copolymer (PVDF-co-HFP), polyvinyl alcohol, polyacrylonitrile, and carboxymethyl cellulose. (CMC), starch, hydroxypropyl cellulose, regenerated cellulose, polyvinyl pyrrolidone, polytetrafluoroethylene, polyethylene, polypropylene, ethylene-propylene-diene monomer rubber (EPDM rubber), sulfonated-EPDM, styrene butadiene rubber (SBR), fluoro rubber, or various copolymers thereof, and the like, which may be used alone or as a mixture. The binder may be included in an amount of 1 wt % to 30 wt %, preferably 1 wt % to 20 wt %, more preferably 1 wt % to 10 wt %, based on the total weight of the negative electrode active material layer.

The electrode assembly further includes a separator, and the separator is disposed in the electrode assembly in a manner interposed between the negative electrode and the positive electrode. The separator separates the negative electrode from the positive electrode and provides a path for lithium ion movement. Any material used as a separator in a lithium battery may be used without particular limitations.

The separator may use a porous polymer film, for example, a porous polymer film made of polyolefin-based polymers such as ethylene homopolymer, propylene homopolymer, ethylene/butene copolymer, ethylene/hexene copolymer, and ethylene/methacrylate copolymer, or a laminated structure of two or more layers thereof used. In addition, conventional porous non-woven fabrics, for example, non-woven fabrics made of high melting point glass fibers, polyethylene terephthalate fibers, or the like may be used. In addition, a coated separator containing a ceramic component or a polymer material may be used to secure heat resistance or mechanical strength.

Another aspect of the present disclosure relates to a battery including the electrode assembly. The battery includes a battery case in which the electrode assembly and an electrolyte are accommodated together. As for the battery case, any case commonly used in the art such as a pouch type or a metal can type may be selected without particular limitation.

As the electrolyte used in the present disclosure, various electrolytes usable in lithium batteries, such as organic liquid electrolyte, inorganic liquid electrolyte, solid polymer electrolyte, gel polymer electrolyte, inorganic solid electrolyte, or molten inorganic electrolyte, may be used, and the type is not particularly limited.

Specifically, the electrolyte may include an organic solvent and a lithium salt.

The organic solvent may use any material that may serve as a medium through which ions involved in the electrochemical reaction of the battery may move without particular limitation. Specifically, as the organic solvent, ester-based solvents such as methyl acetate, ethyl acetate, γ-butyrolactone, or ε-caprolactone; ether-based solvents such as dibutyl ether or tetrahydrofiran; ketone-based solvents such as cyclohexanone; aromatic hydrocarbon-based solvents such as benzene or fluorobenzene; carbonate-based solvents such as dimethyl carbonate (DMC), diethyl carbonate (DEC), methylethyl carbonate (NEC), ethylmethyl carbonate (FMC), ethylene carbonate (EC) or propylene carbonate (PC); alcohol-based solvents such as ethyl alcohol or isopropyl alcohol; nitriles such as R—CN (R is a C2 to C20 straight-chain, branched or cyclic hydrocarbon group, and may contain a double-bonded aromatic ring or an ether bond); amides such as dimethylformnamide; dioxolanes such as 1,3-dioxolane; or sulfolanes may be used. Among them, carbonate-based solvents are preferred, and a mixture of cyclic carbonates (e.g., ethylene carbonate or propylene carbonate) having high ionic conductivity and high permittivity capable of increasing the charge and discharge performance of the battery and low-viscosity linear carbonate-based compound (e.g., ethyl methyl carbonate, dimethyl carbonate or diethyl carbonate) is more preferred.

As the lithium salt, any compound capable of providing lithium ions used in a lithium battery may be used without particular limitation. Specifically, $LiPF_6$, $LiClO_4$, $LiAsF_6$, LiIBFi, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$ or the like may be used as the lithium salt. The concentration of the lithium salt is preferably within the range of 0.1 M to 5.0 M, preferably 0.1 M to 3.0 M. When the concentration of the lithium salt is within the above range, the electrolyte has appropriate conductivity and viscosity, so it may exhibit excellent electrolyte performance, and lithium ions may move effectively.

In addition to the components of the electrolyte, the electrolyte may additionally include additives for the purpose of improving the lifespan characteristics of the battery, suppressing the decrease in battery capacity, and improving the discharge capacity of the battery. For example, haloalkylene carbonate-based compounds such as difluoroethylene carbonate, pyridine, triethylphosphite, triethanolamine, cyclic ether, ethylene diamine, n-glyme, hexamethyl phosphate triamid, nitrobenzene derivatives, sulfur, quinone imine dyes, N-substituted oxazolidinones, N,N-substituted imidazolidines, ethylene glycol dialkyl ethers, ammonium salts, pyrroles, 2-methoxy ethanol, aluminum trichloride or the like may be used alone or as a mixture as the additives, without being limited thereto. The additive may be included in an amount of 0.1 wt % to 10 wt %, preferably 0.1 wt % to 5 wt %, based on the total weight of the electrolyte.

In another embodiment of the present disclosure, the positive electrode may include a loading reduction portion with a smaller loading amount of the positive electrode active material, compared to an adjacent region. If the positive electrode has such a structure, the region of the positive electrode active material portion may be increased without worrying about precipitation of lithium. Accordingly, the energy density of the electrode assembly may be improved.

Recently, in order to realize high energy density and reduce cost, development is progressing in the direction of increasing the size of the battery. Depending on the size of the battery, as the energy increases, the resistance of battery should decrease. To reduce the resistance, a method of using the current collector of the electrode as an electrode tab rather than a method of attaching an electrode tab to the electrode may be used. At this time, due to the nature of the electrode manufacturing process of applying the electrode slurry on the electrode current collector, a portion in which the loading amount is reduced occurs at the boundary between the negative electrode active material portion coated with the negative electrode slurry and the negative electrode current collector. Considering the N/P ratio, there is a possibility that metallic lithium is precipitated on the positive electrode active material portion facing the portion where the loading amount is reduced. Here, the N/P ratio is a value obtained by dividing the capacity of the negative electrode, which is calculated considering the area and capacity per mass of the negative electrode, by the capacity of the positive electrode, which is obtained considering the area and capacity per mass of the positive electrode, and generally has a value of 1 or more. That is, the capacity of the negative electrode is adjusted large. For reference, if the N/P ratio is less than 1, metallic lithium is likely to be precipitated during charging and discharging, which causes rapid deterioration in safety of the battery during high rate charging and discharging. In other words, the N/P ratio has a significant effect on the safety and capacity of the battery. Due to the risk of metal lithium precipitation as described above, the positive electrode active material portion cannot be located on the portion of the positive electrode facing the portion where the loading amount of the negative electrode is reduced. This causes the energy density of the battery not to increase. Accordingly, in the present disclosure, the energy density is improved by increasing the region of the positive electrode active material portion.

Figure 52:
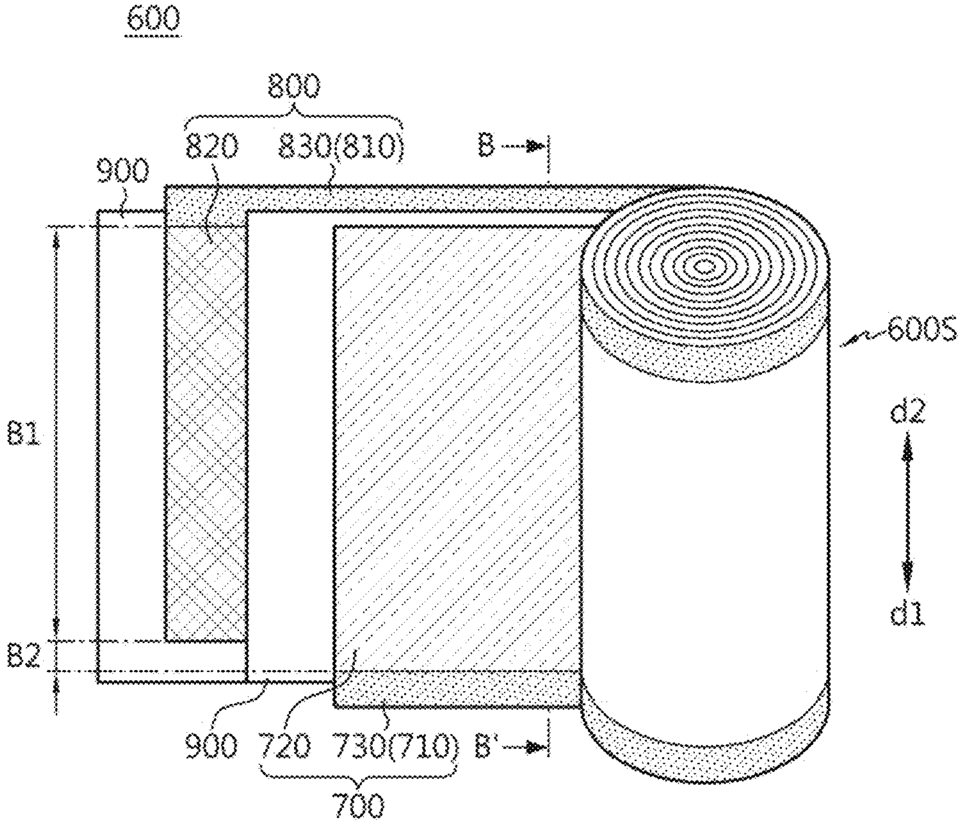
FIG. 52 is a diagram showing an electrode assembly according to a comparative example.
Figure 53:
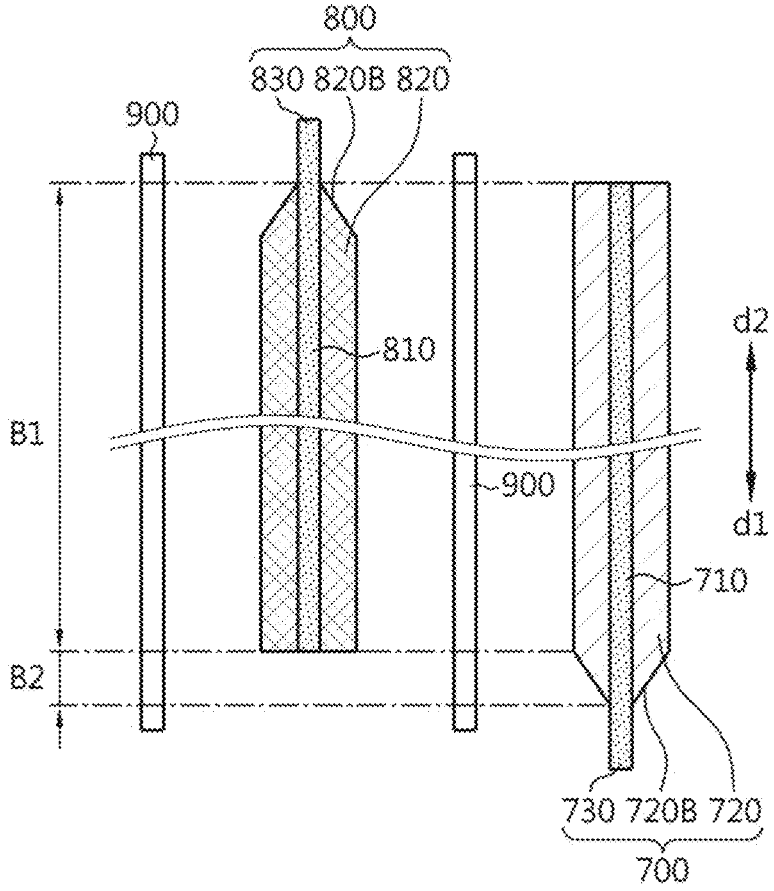
FIG. 53 is a cross-sectional view, taken along the cutting line B-B' in FIG. 52.

FIG. 52 is a diagram showing an electrode assembly according to an embodiment of the present disclosure, and FIG. 53 is a cross-sectional view, taken along the cutting line A-A' in FIG. 52.

Figure 44:
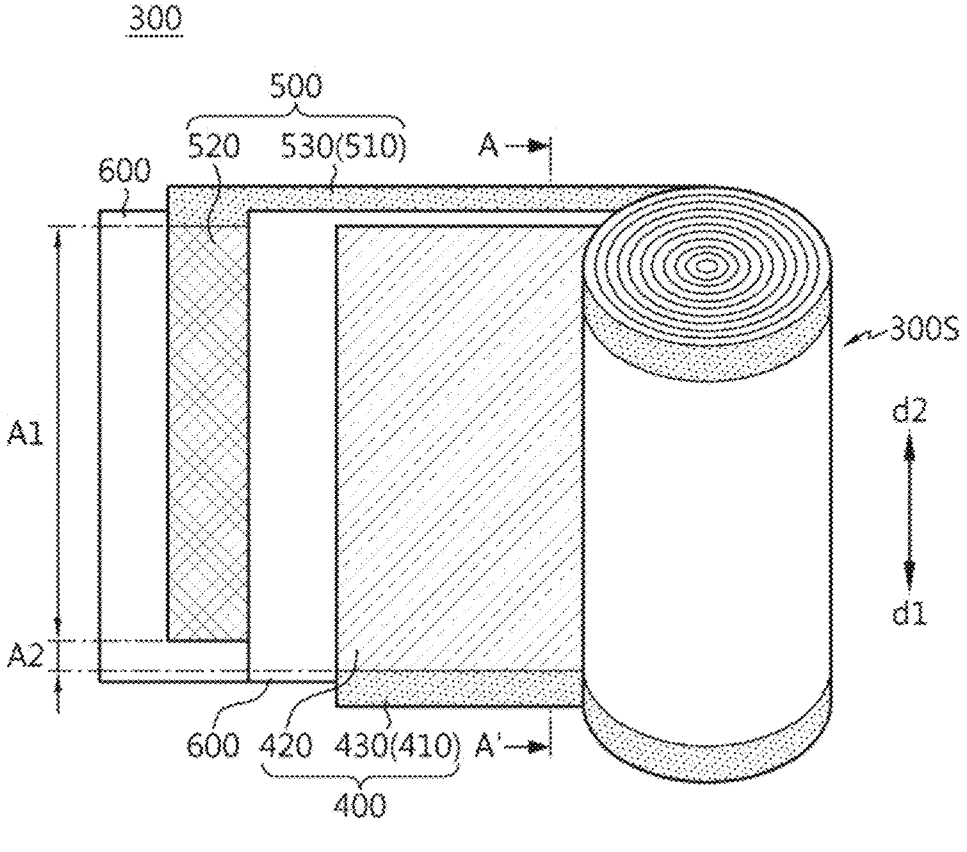
FIG. 44 is a diagram showing an electrode assembly according to an embodiment of the present disclosure.
Figure 45:
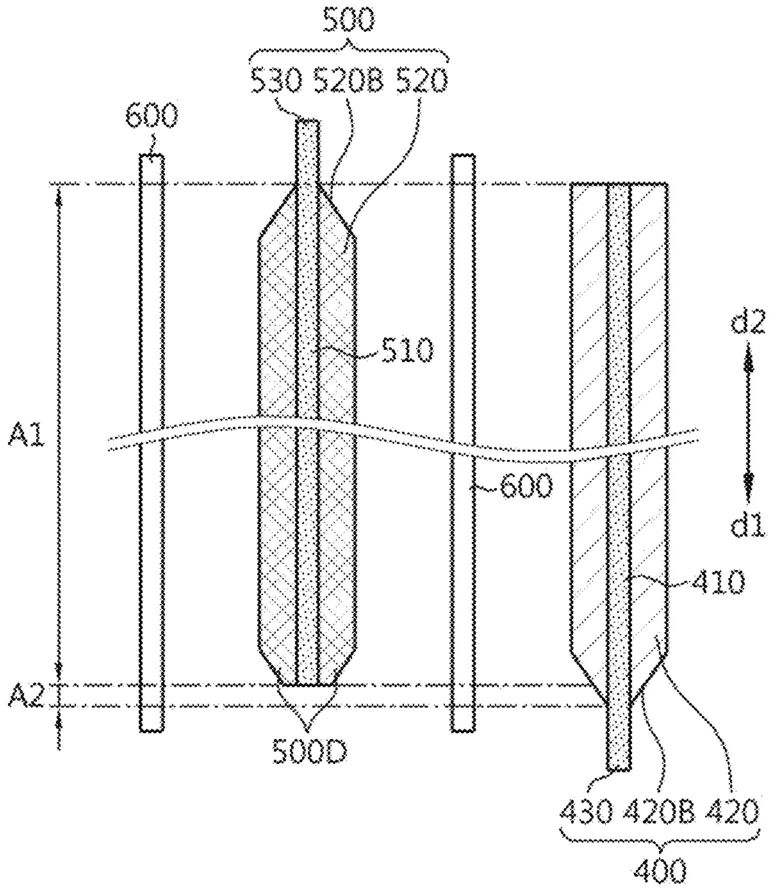
FIG. 45 is a cross-sectional view, taken along the cutting line A-A' in FIG. 44.

Referring to FIGS. 44 and 45, an electrode assembly 300 according to an embodiment of the present disclosure includes a negative electrode 400, a positive electrode 500, and a separator 600. The separator 600 is located between the negative electrode 400 and the positive electrode 500. The negative electrode 400, the positive electrode 500, and the separator 600 are wound together to form a jelly-roll structure 300S. Here, the jelly-roll structure 300S refers to a structure formed by winding the negative electrode 400, the positive electrode 500, and the separator 600. In addition, when the jelly-roll structure 300S is formed, it is preferable that a separator 600 is additionally disposed on the outer side in order to prevent the negative electrode 400 and the positive electrode 500 from contacting each other.

The negative electrode 400 includes a negative electrode current collector 410 and a negative electrode active material portion 420 formed by coating a negative electrode active material on the negative electrode current collector 410. In particular, as shown in the drawings, the negative electrode active material may be coated on both surfaces of the negative electrode current collector 410 to form the negative electrode active material portion 420. In addition, in the negative electrode current collector 410, a negative electrode uncoated portion 430 to which the negative electrode active material is not applied extends in the first direction d1. The negative electrode uncoated portion 430 extends along one end of the wound negative electrode 400. In addition, the negative electrode uncoated portion 430 extends beyond the separator 600 in the first direction d1.

Accordingly, the negative electrode uncoated portion 430 may be exposed at one end in the first direction of the jelly-roll structure 300S.

The positive electrode 500 includes a positive electrode current collector 510 and a positive electrode active material portion 520 formed by coating a positive electrode active material on the positive electrode current collector 510. In particular, as shown in the drawings, the positive electrode active material may be coated on both surfaces of the positive electrode current collector 510 to form the positive electrode active material portion 520. Also, in the positive electrode current collector 510, a positive electrode uncoated portion 530 to which the positive electrode active material is not applied extends in the second direction d2. The positive electrode uncoated portion 530 extends along one end of the wound positive electrode 500. In addition, the positive electrode uncoated portion 530 extends beyond the separator 600 in the second direction d2. Accordingly, the positive electrode uncoated portion 530 may be exposed at one end in the second direction of the jelly-roll structure 300S.

Here, first direction d1 and second direction d2 are directions opposite to each other. Also, the first direction d1 and the second direction d2 may be directions parallel to the height direction of the jelly-roll structure 300S.

The electrode assembly 300 according to this embodiment has a structure in which a separate electrode tab is not attached, but the negative electrode uncoated portion 430 of the negative electrode current collector 410 and the positive electrode uncoated portion 530 of the positive electrode current collector 510 themselves are used as electrode tabs in order to reduce resistance.

Although not shown in the drawings, the negative electrode uncoated portion 430 and/or the positive electrode uncoated portion 530 may have substantially the same structure of the uncoated portion of the electrode described above.

In one embodiment, the positive electrode active material portion 520 includes a loading reduction portion 5001) having a smaller loading amount of positive electrode active material than an adjacent area, and the loading reduction portion 500D is located at one end in the first direction d1 of the positive electrode 500. Also, more specifically, in the loading reduction portion 500D, the loading amount of the positive electrode active material may gradually decrease in the first direction d1.

Here, the loading amount means the amount of active material applied per unit area. In a portion having a large loading amount, a lot of negative electrode active material or positive electrode active material is applied to the unit area, so the negative electrode active material portion or the positive electrode active material portion may have a relatively greater thickness. In a portion having a small loading amount, a small amount of negative electrode active material or positive electrode active material is applied to the unit area, so the negative electrode active material portion or the positive electrode active material portion may have a relatively smaller thickness.

The active material portion may be formed by applying a slurry containing an active material. In this process, a boundary portion having a gradually decreasing loading amount may be formed between the uncoated portion and the active material portion.

Specifically, the negative electrode active material portion 420 may include a negative electrode boundary portion 420B forming a boundary between the negative electrode active material portion 420 and the negative electrode uncoated portion 430. The loading amount of the negative electrode boundary portion 420B may decrease in a direction toward the negative electrode uncoated portion 430.

Similarly, the positive electrode active material portion 520 may include a positive electrode boundary portion 520B forming a boundary between the positive electrode active material portion 520 and the positive electrode uncoated portion 530. The loading amount of the positive electrode boundary portion 520B may decrease in a direction toward the positive electrode uncoated portion 530.

The negative electrode boundary portion 420B or the positive electrode boundary portion 520B in which the loading amount gradually decreases as above is naturally generated in the process of applying the slurry containing the active material to the negative electrode current collector 410 or the positive electrode current collector 510.

In this case, in a region corresponding to the positive electrode boundary portion 520B, based on a direction perpendicular to the second direction d2, the amount of the positive electrode active material may be smaller than the amount of the negative electrode active material. Since the N/P ratio has a value greater than 1, the problem of precipitation of metallic lithium does not occur.

However, there is a problem in a region corresponding to the negative electrode boundary portion 420B. In the region corresponding to the negative electrode boundary portion 420B, based on a direction perpendicular to the first direction d1, the amount of the negative electrode active material may be smaller than the amount of the positive electrode active material. This may cause a problem of precipitation of metallic lithium because the N/P ratio has a value smaller than 1.

Accordingly, in this embodiment, the loading reduction portion 500D is provided on the positive electrode 500, and the negative electrode active material portion 420 may be located in a portion corresponding to the loading reduction portion 500D based on a direction perpendicular to the first direction d1. More specifically, the negative electrode boundary portion 420B may be located at a portion corresponding to the loading reduction portion 5001) based on a direction perpendicular to the first direction d1.

The loading reduction portion 500D having a smaller loading amount of positive electrode active material than adjacent areas is provided at a position corresponding to the negative electrode boundary portion 420B having a gradually decreasing loading amount, so that the region where the positive electrode active material is applied may be increased without worrying about lithium precipitation. In particular, the loading amount of the positive electrode active material may gradually decrease in the loading reduction portion 5001) along the first direction d1, corresponding to the shape of the negative electrode boundary portion 420B in which the loading amount gradually decreases in a direction toward the negative electrode uncoated portion 430. Therefore, it is possible to maintain a high N/P ratio of the negative electrode 400 and the positive electrode 500 in the region where the negative electrode boundary portion 420B is formed, thereby preventing lithium precipitation.

Hereinafter, a method for manufacturing an electrode assembly according to an embodiment of the present disclosure will be described in detail with reference to FIGS. 46 to 51.

Figure 46:
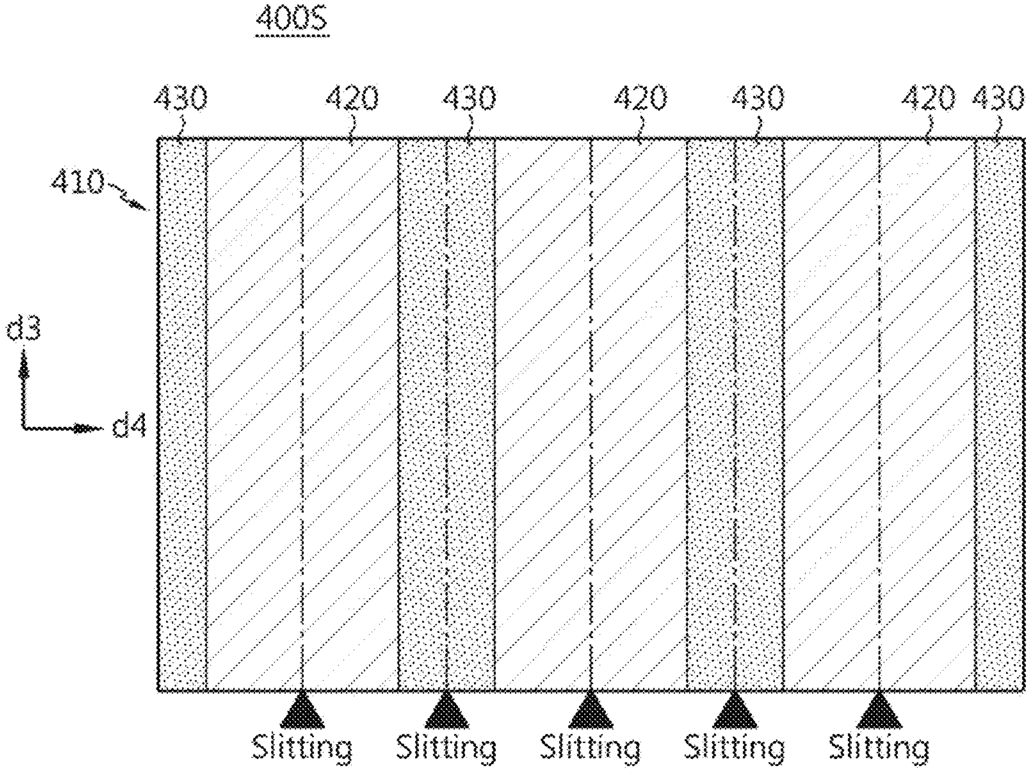
FIGS. 46 and 47 are diagrams showing a process of manufacturing a negative electrode according to an embodiment of the present disclosure.
Figure 47:
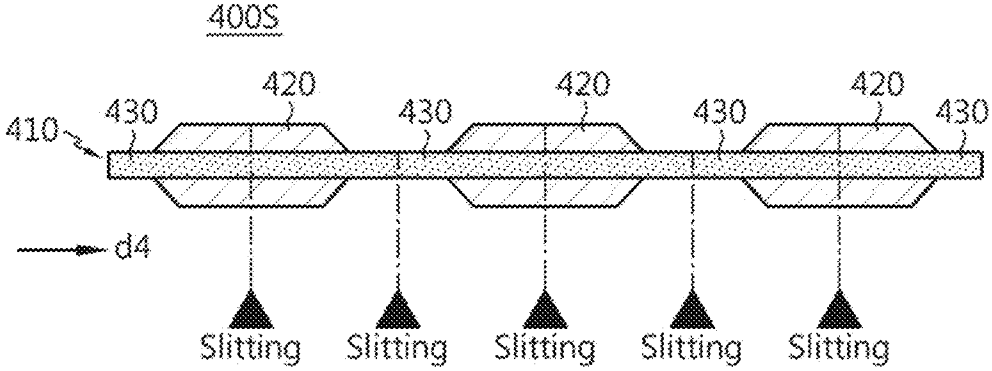

FIGS. 46 and 47 are diagrams illustrating a process of manufacturing a negative electrode according to an embodiment of the present disclosure. Specifically, FIG. 46 is a plan view showing the negative electrode sheet from above, and FIG. 47 is a front view showing the negative electrode sheet of FIG. 46 from the front.

Referring to FIGS. 46 and 47, in the method for manufacturing an electrode assembly according to an embodiment of the present disclosure includes a step of manufacturing a negative electrode sheet 400S so that a negative electrode active material portion 420 coated with a negative electrode active material and a negative electrode uncoated portion 430 not coated with a negative electrode active material are alternately located on a negative electrode current collector 410.

Specifically, the negative electrode active material portion 420 may be formed by applying the negative electrode active material to extend along the third direction d3. In addition, a plurality of negative electrode active material portions 420 may be located to be spaced apart along the fourth direction d4 by spacing the coated portions along the fourth direction d4 perpendicular to the third direction d3. That is, the coating process may be performed so that the negative electrode uncoated portion 430 is positioned between the plurality of negative electrode active material portions 420.

Here, the third direction d3 and the fourth direction d4 are directions for explanation based on the negative electrode sheet 400S, and are directions unrelated to the first direction d1 and the second direction d2 in the jelly-roll structure 300S described above.

Figure 48:
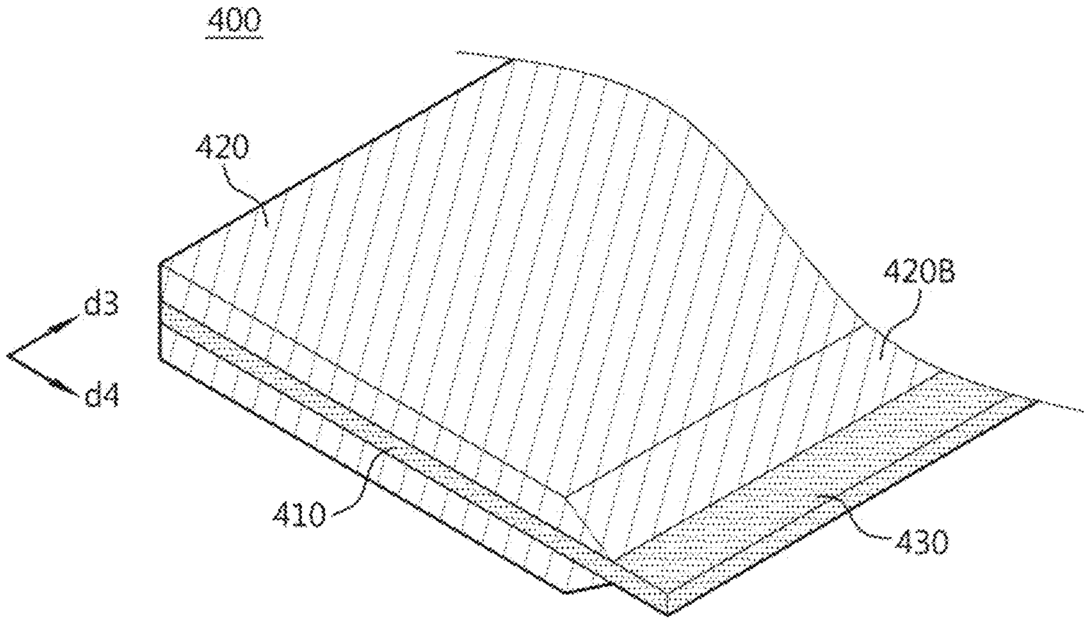
FIG. 48 is a perspective view showing a negative electrode according to an embodiment of the present disclosure.

After that, a step of manufacturing a negative electrode 400 by slitting the negative electrode uncoated portion 430 and the negative electrode active material portion 420 may be followed, FIG. 48 is a perspective view showing a negative electrode according to an embodiment of the present disclosure.

Referring to FIGS. 46 to 48, slitting may be performed in a direction parallel to the third direction d3 for the negative electrode uncoated portion 430 and the negative electrode active material portion 420, respectively, as indicated by dotted lines in FIGS. 46 and 47.

Accordingly, several negative electrodes 400 as shown in FIG. 48 may be manufactured from the negative electrode sheet 400S. That is, the negative electrode 400 of FIG. 48 corresponds to one of several negative electrodes manufactured by slitting the negative electrode sheet 400S of FIGS. 46 and 47. By slitting the negative electrode uncoated portion 430 and the negative electrode active material portion 420 of the negative electrode sheet 400S, respectively, the negative electrode 400 in which the negative electrode uncoated portion 430 extends at one side may be manufactured.

When forming the negative electrode active material portion 420, a slurry containing the negative electrode active material may be applied on the negative electrode current collector 410. In the process of applying the slurry, a negative electrode boundary portion 420B having a loading amount decreasing in a direction toward the negative electrode uncoated portion 430 may be formed at the boundary between the negative electrode active material portion 420 and the negative electrode uncoated portion 430.

Figure 49:
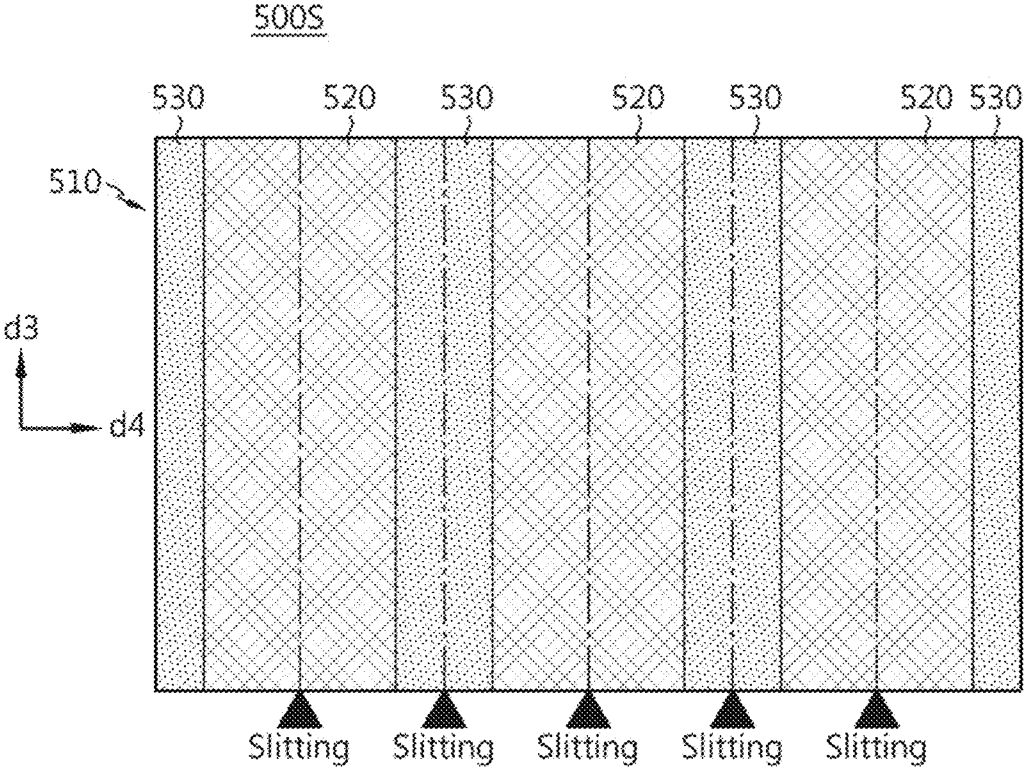
FIGS. 49 and 50 are diagrams showing a process of manufacturing a positive electrode according to an embodiment of the present disclosure.
Figure 50:
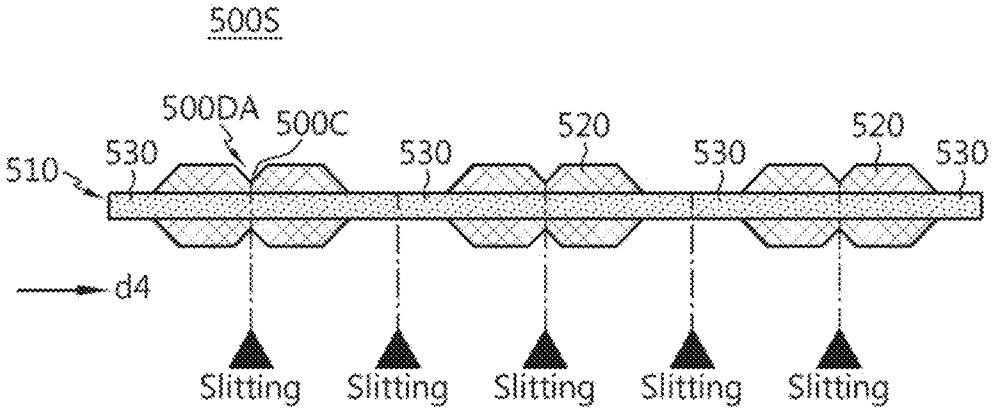

FIGS. 49 and 50 are diagrams showing a process of manufacturing a positive electrode according to an embodiment of the present disclosure. Specifically, FIG. 49 is a plan view showing the positive electrode sheet from above, and FIG. 50 is a front view showing the positive electrode sheet of FIG. 49 from the front.

Referring to FIGS. 49 and 50, the method for manufacturing an electrode assembly according to an embodiment of the present disclosure includes a step of manufacturing a positive electrode sheet 500S so that a positive electrode active material portion 520 coated with a positive electrode active material and a positive electrode uncoated portion 530 not coated with a positive electrode active material are alternately located on the positive electrode current collector 510.

Specifically, the positive electrode active material portion 520 may be formed by applying the positive electrode active material to extend along the third direction d3. In addition, a plurality of positive electrode active material portions 520 may be located to be spaced apart by adjusting the coating interval along the fourth direction d4 perpendicular to the third direction d3. That is, the coating process may be performed so that the positive electrode uncoated portion 530 is located between the plurality of positive electrode active material portions 520.

Here, third direction d3 and fourth direction d4 are directions for description based on the positive electrode sheet 500S, and are directions unrelated to the first direction d1 and the second direction d2 in the jelly-roll structure 300S described above.

Figure 51:
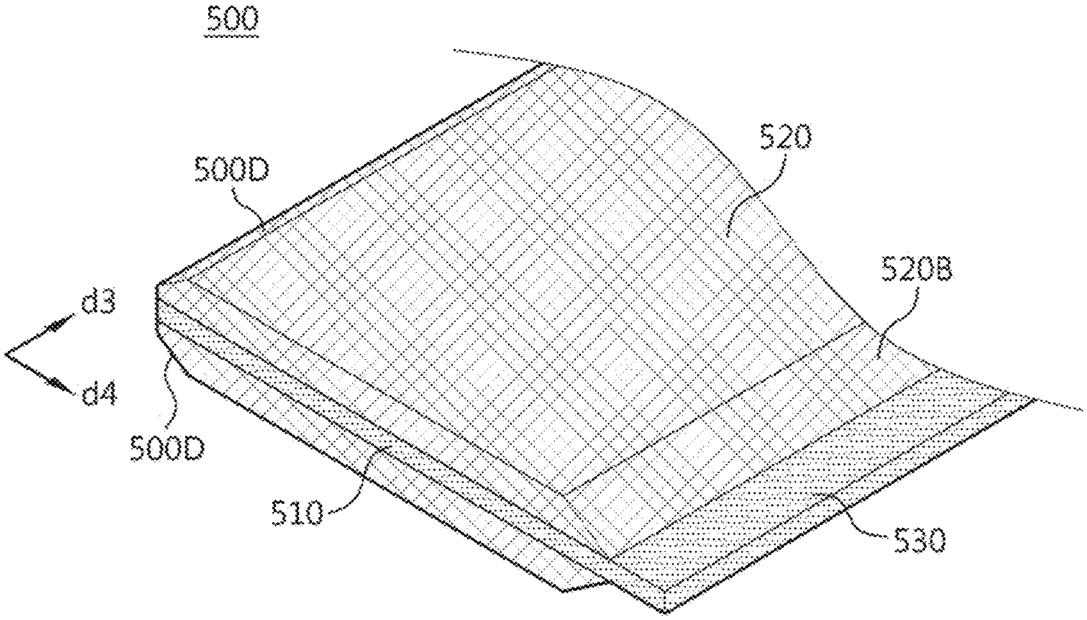
FIG. 51 is a perspective view showing a positive electrode according to an embodiment of the present disclosure.

After that, a step of manufacturing a positive electrode 500 by slitting the positive electrode uncoated portion 530 and the positive electrode active material portion 520 may be followed. FIG. 51 is a perspective view showing a positive electrode 500 according to an embodiment of the present disclosure.

Referring to FIGS. 49 to 51, slitting may be performed in a direction parallel to the third direction d3 for the positive electrode uncoated portion 530 and the positive electrode active material portion 520, respectively, as indicated by dotted lines in FIGS. 49 and 50. Accordingly, several positive electrodes 500 as shown in FIG. 51 may be man featured from the positive electrode sheet 500S. That is, the positive electrode 500 of FIG. 51 corresponds to one of several positive electrodes manufactured by slitting the positive electrode sheet 500S of FIGS. 49 and 50. By slitting the positive electrode uncoated portion 530 and the positive electrode active material portion 520 of the positive electrode sheet 500S, respectively, the positive electrode 500 in which the positive electrode uncoated portion 530 extends at one side may be manufactured.

When forming the positive electrode active material portion 520, a slurry containing the positive electrode active material may be applied on the positive electrode current collector 510. In the process of applying the slurry, a positive electrode boundary portion 520B having a loading amount decreasing in a direction toward the positive electrode uncoated portion 530 may be formed at the boundary between the positive electrode active material portion 520 and the positive electrode uncoated portion 530.

Referring to FIGS. 44, 48 and 51 together, a step of forming a jelly-roll structure 300S by winding the negative electrode 400 and the positive electrode 500 together with the separator 600 may be followed. At this time, in the jelly-roll structure 300S, the negative electrode uncoated portion 430 may extend beyond the separator 600 in a first direction d1, and the positive electrode uncoated portion 530 may extend beyond the separator 600 in a second direction d2 opposite to the first direction d1.

Referring to FIGS. 49 to 51 again, in the method for manufacturing an electrode assembly according to an embodiment of the present disclosure, the positive electrode sheet 500S includes a loading reduction area 500DA in which the loading amount of the positive electrode active material is smaller than that of the adjacent area. There is no particular limitation in the method of forming the loading reduction area 500DA, and for example, it may be formed by adjusting the degree of coating of the slurry.

In the step of manufacturing the positive electrode 500, the loading reduction area 500DA of the positive electrode active material portion 520 is slit. The slitted loading reduction area 500DA forms a loading reduction portion 500D having a smaller loading amount of the positive electrode active material than the adjacent area in the jelly-roll structure 300S shown in FIGS. 44 and 45.

Specifically, a loading reduction area 500DA having a smaller loading amount of the positive electrode active material than the adjacent area is formed in the positive electrode active material portion 520 formed on the positive electrode sheet 500S. As shown in FIG. 50, the loading reduction area 500DA may be formed in the center of the positive electrode active material portion 520. Meanwhile, the loading reduction area 500DA may be configured such that the loading amount of the positive electrode active material gradually decreases toward the center portion 500C of the loading reduction area 500DA, and in the step of manufacturing the positive electrode 500, the loading reduction portion 500D according to this embodiment may be provided by slitting the center portion 500C of the loading reduction area 500DA.

That is, in applying the slurry containing a positive electrode active material, by forming the loading reduction area 500DA and slitting the center portion 500C of the loading reduction area 500DA, several positive electrodes 500 having the loading reduction portion 5001) may be manufactured.

Referring to FIG. 51, the loading reduction portion 500D may be provided at one end of the manufactured positive electrode 500, and the positive electrode uncoated portion 530 may be provided at the other end of the positive electrode 500 opposite to the one end Referring to FIGS. 44 and 45, when the positive electrode 500 is wound to form a jelly-roll structure 300S, the loading reduction portion 500D may be located at one end in the first direction d1 of the positive electrode 500, and the positive electrode uncoated portion 530 may be located at one end in the second direction d2 of the positive electrode 500.

In addition, as the center portion 500C of the loading reduction area 500DA is slitted, the loading amount of the positive electrode active material in the loading reduction portion 500D may gradually decrease along the first direction d1.

In addition, in the jelly-roll structure 300S, the negative electrode active material portion 420 may be located at a portion corresponding to the loading reduction portion 500D based on a direction perpendicular to the first direction d1. More specifically, in the jelly-roll structure 300S, the negative electrode boundary portion 420B may be located at a portion corresponding to the loading reduction portion 500D based on a direction perpendicular to the first direction d1.

The corresponding positional relationship between the loading reduction portion 500) and the negative electrode boundary portion 420B has already been described above and thus will not be described again.

Hereinafter, with reference to FIGS. 52 to 55, an electrode assembly according to a comparative example will be described, and advantages of the electrode assembly according to this embodiment compared to the electrode assembly according to the comparative example will be described.

FIG. 52 is a diagram showing an electrode assembly according to a comparative example. FIG. 53 is a cross-sectional view, taken along the cutting line B-B' in FIG. 52.

Referring to FIGS. 52 and 53, the electrode assembly 600 according to the comparative example includes a negative electrode 700, a positive electrode 800 and a separator 900, and the negative electrode 700, the positive electrode 800 and the separator 900 are wound to form a jelly-roll structure 600S.

The negative electrode 700 may include a negative electrode current collector 710, a negative electrode active material portion 720, and a negative electrode uncoated portion 730. In addition, the negative electrode uncoated portion 730 may extend in the first direction d1, and the negative electrode active material portion 720 may include a negative electrode boundary portion 720B that forms a boundary between the negative electrode active material portion 720 and the negative electrode uncoated portion 730 and has a gradually decreasing loading amount.

Figure 54:
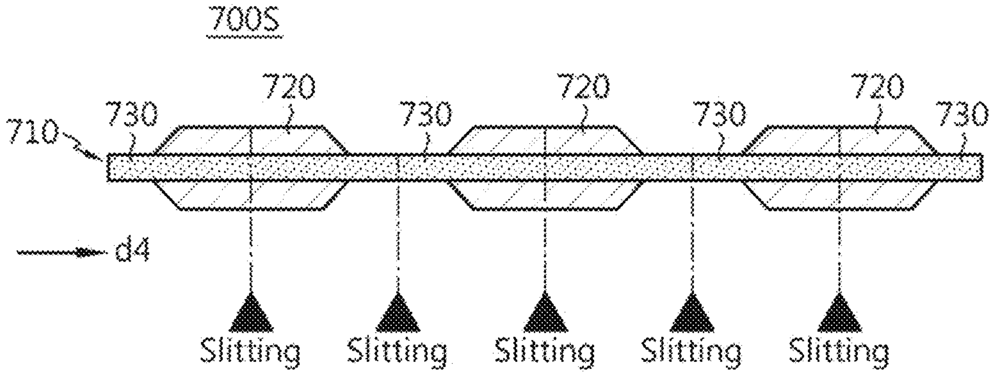
FIG. 54 is a diagram showing a process of manufacturing a negative electrode according to a comparative example.

FIG. 54 is a diagram showing a process of manufacturing a negative electrode 700 according to a comparative example.

Referring to FIG. 54, after the negative electrode sheet 700S is manufactured so that the negative electrode active material portion 720 and the negative electrode uncoated portion 730 are alternately positioned along the fourth direction d4, a plurality of negative electrodes 700 may be manufactured by slitting the negative electrode uncoated portion 730 and the negative electrode active material portion 720.

Meanwhile, referring to FIGS. 52 and 53 again, the positive electrode 800 may include a positive electrode current collector 810, a positive electrode active material portion 820, and a positive electrode uncoated portion 880. In addition, the positive electrode uncoated portion 830 may extend in the second direction d2 opposite to the first direction d1, and the positive electrode active material portion 820 may include a positive electrode boundary portion 82013 that forms a boundary between the positive electrode active material portion 820 and the positive electrode uncoated portion 830 and has a gradually decreasing loading amount.

Figure 55:
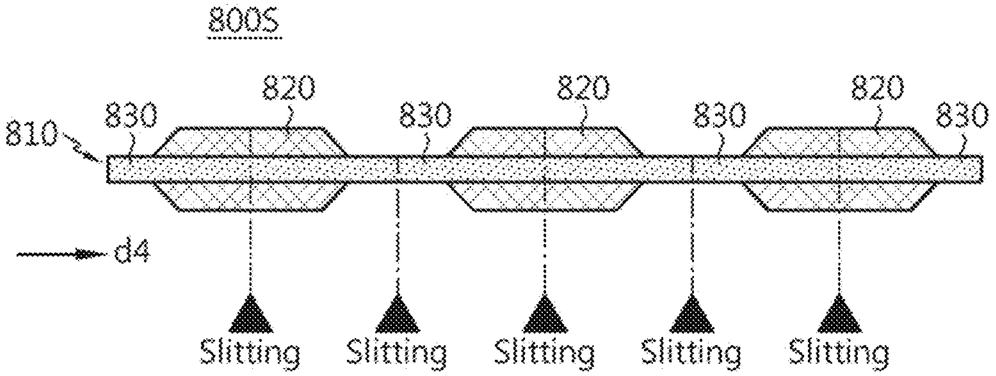
FIG. 55 is a diagram showing a process of manufacturing a positive electrode according to a comparative example.

FIG. 55 is a diagram showing a process of manufacturing a positive electrode 800 according to a comparative example.

Referring to FIG. 55, after the positive electrode sheet 800S is manufactured so that the positive electrode active material portion 820 and the positive electrode uncoated portion 830 are alternately positioned along the fourth direction d4, a plurality of positive electrodes 800 may be manufactured by slitting the positive electrode uncoated portion 830 and the positive electrode active material portion 820.

After that, the negative electrode 700 and the positive electrode 800 manufactured as above may be wound together with the separator 900 to manufacture an electrode assembly 600 according to the comparative example.

That is, the electrode assembly 600 according to the comparative example may have a structure similar to that of the electrode assembly 300 according to this embodiment, except for the loading reduction portion 5001) (see FIG. 49).

Referring to FIGS. 52 and 53, in the case of the electrode assembly 600 according to the comparative example, the positive electrode active material portion 820 cannot be located in a portion corresponding to the negative electrode boundary portion 720B, based on a direction perpendicular to the first direction d1. If the positive electrode active material portion 820 extends to a portion corresponding to the negative electrode boundary portion 720B, the corresponding portion has a low N/P ratio value and is highly likely to precipitate metallic lithium. Therefore, in order to prevent lithium precipitation, the length of the positive electrode active material portion 820 must be limited. That is, the positive electrode active material portion 820 can be formed only in the region B1 shown in the drawing, and the positive electrode active material portion 820 cannot be formed in the region B2. This results in reducing the length of the positive electrode active material portion 820 due to the negative electrode boundary portion 720B.

Meanwhile, referring to FIGS. 44 and 45, in the case of the electrode assembly 300 according to this embodiment, based on the direction perpendicular to the first direction d1, the positive electrode active material portion 520, particularly the loading reduction portion 500D, may be located in a portion corresponding to the negative electrode boundary portion 420B. Since the loading reduction portion 500D having a smaller loading amount of the positive electrode active material than the adjacent area is provided at a position corresponding to the negative electrode boundary portion 420B, the N/P ratio in the corresponding portion may be maintained high and lithium precipitation may be prevented. Accordingly, the positive electrode active material portion 520 may be formed as much as the region A1, and the region A2 in which the positive electrode active material portion 520 cannot be formed may be reduced. For example, the width of the positive electrode 500 in the height direction compared to the width of the negative electrode 400 in the height direction may be increased to 98% or more.

If the region A1 of FIGS. 44 and 45 is compared with the region B1 of FIGS. 52 and 53, in the electrode assembly 300 according to this embodiment, the length of the positive electrode active material portion may be increased as much as the loading reduction portion 500D, and thus a higher energy density may be provided in a limited space compared to the electrode assembly 600 according to the comparative example.

Another aspect of the present disclosure relates to a cylindrical battery, which includes a jelly-roll type electrode assembly having a structure in which a positive electrode, a negative electrode, and a separator interposed between the positive electrode and the negative electrode are wound in one direction; a cylindrical battery housing in which the electrode assembly is accommodated; and a battery cap serving as a sealing body disposed at the upper portion of the battery housing to seal the battery housing. Here, the positive electrode is prepared according to the present disclosure and includes single particle-based active material particles having an average particle diameter $D_{50}$ of 5 μm or less as the positive electrode active material. The cylindrical battery may further include an electrolyte, and the above description may be referred to for the electrolyte.

The electrode assembly may have a stack type, stack/folding type, or jelly-roll type structure as described above. In one specific embodiment of the present disclosure, in the electrode assembly, the positive electrode may have a loading reduction portion as described above.

In the case of a conventional cylindrical battery, current is concentrated on a strip-shaped electrode tab, resulting in great resistance, high heat generation, and poor current collection efficiency.

As the demand for high-capacity batteries increases with the recent development of electric vehicle technology, the development of bulky large-sized cylindrical batteries is required. In the case of a conventional small cylindrical battery generally used in the art, that is, a cylindrical battery having a form factor of 1865 or 2170, resistance or heat generation does not seriously affect battery performance because the capacity is small. However, when the specifications of the conventional small cylindrical battery are applied as they are to a large cylindrical battery, a serious problem may occur in battery safety.

As the size of the battery increases, the amount of heat and gas generated inside the battery also increases, and the temperature and pressure inside the battery rise due to such heat and gas, which may cause the battery to ignite or explode. In order to prevent this, heat and gas inside the battery must be properly discharged to the outside, and for this, the cross-sectional area of the battery, which serves as a passage for discharging heat to the outside of the battery, must increase to match the increase in volume. However, in general, since the increase in cross-sectional area does not reach the increase in volume, as the size of the battery increases, the amount of heat generated inside the battery increases, resulting in problems such as increased risk of explosion and reduced output. In addition, when rapid charging is performed at a high voltage, a large amount of heat is generated around the electrode tab for a short period of time, and the battery may ignite. Accordingly, the present disclosure proposes a cylindrical battery having a high safety while having a large volume to implement a high capacity.

In addition, since a high loading electrode to which the positive electrode active material in the form of single particle or pseudo-single particle is applied may be applied to the cylindrical battery, the initial resistance characteristics and charge/discharge efficiency of the cylindrical battery may be improved.

The cylindrical battery according to the present disclosure significantly reduces gas generation compared to the prior art by applying a positive electrode active material in the form of single particle or pseudo-single particle. Accordingly, even a large cylindrical battery having a form factor ratio of 0.4 or more may exhibit excellent safety.

The cylindrical battery according to the present disclosure may preferably be a battery having a tab-less structure that does not include an electrode tab, but is not limited thereto.

In the battery of the tab-less structure, for example, each of the positive electrode and the negative electrode includes an uncoated portion on which an active material layer is not formed, and may have a structure in which the positive electrode uncoated portion and the negative electrode uncoated portion are respectively located at the upper and lower ends of the electrode assembly, a collector plate is coupled to the positive electrode uncoated portion and the negative electrode uncoated portion, and the collector plate is connected to an electrode terminal.

When the cylindrical battery is formed in a tab-less structure as described above, since the concentration of current is less than that of the conventional battery equipped with an electrode tab, heat generation inside the battery may be effectively reduced, thereby improving the thermal safety of the battery, Hereinafter, the present disclosure will be described in more detail through specific examples.

Example 1

A single particle type positive electrode active material $Li[Ni_{0.9}Co_{0.06}Mn_{0.03}Al_{0.01}]O_2$ having a unimodal particle size distribution with an average particle diameter $D_{50}$ of 3 μm:carbon nanotube:PVDF binder were mixed in N-methyl pyrrolidone at a weight ratio of 97.8:0.6:1.6 to prepare a positive electrode slurry. The positive electrode slurry was coated on one surface of an aluminum current collector sheet, dried at 120° C., and then rolled to prepare a positive electrode.

A negative electrode active material (graphite:SiO=95:5 mixture by weight) conductive material (super C), styrene-butadiene rubber (SBR):carboxymethyl cellulose (CMC) were mixed in water at a weight ratio of 96:2:1.5:0.5 to prepare a negative electrode slurry. The negative electrode slurry was coated on one Surface of a copper current collector sheet, dried at 150° C., and then rolled to prepare a negative electrode.

A separator was interposed between the positive electrode and the negative electrode prepared as above, stacked in the order of separator/positive electrode/separator/negative electrode, and then wound to prepare a jelly-roll type electrode assembly. The electrode assembly prepared as described above was inserted into a cylindrical battery housing, and an electrolyte was injected thereto to prepare a 4680 cell.

Comparative Example 1

A 4680 cell was manufactured in the same manner as in Example 1, except that secondary particle type $Li[Ni_{0.9}Co_{0.05}Mn_{0.04}Al_{0.01}]O_2$ having a bimodal particle size distribution with a large particle average diameter $D_{50}$ of 9 μm and a small particle average diameter $D_{50}$ of 4 μm was used as the positive electrode active material.

Experimental Example 1

A hot box test was performed on the 4680 cells manufactured by Example 1 and Comparative Example 1.

Specifically, each of the 4680 cells manufactured by Example 1 and Comparative Example 1 was placed in a hot box chamber at room temperature, heated to 130° C. at a heating rate of 5° C./min, and maintained for 30 minutes to perform a hot box evaluation and the temperature change of the battery over time was measured. For accurate evaluation, the hot box evaluation was performed twice on the cell of Example 1. The measurement results are shown in FIGS. 36 and 37.

Figure 36:
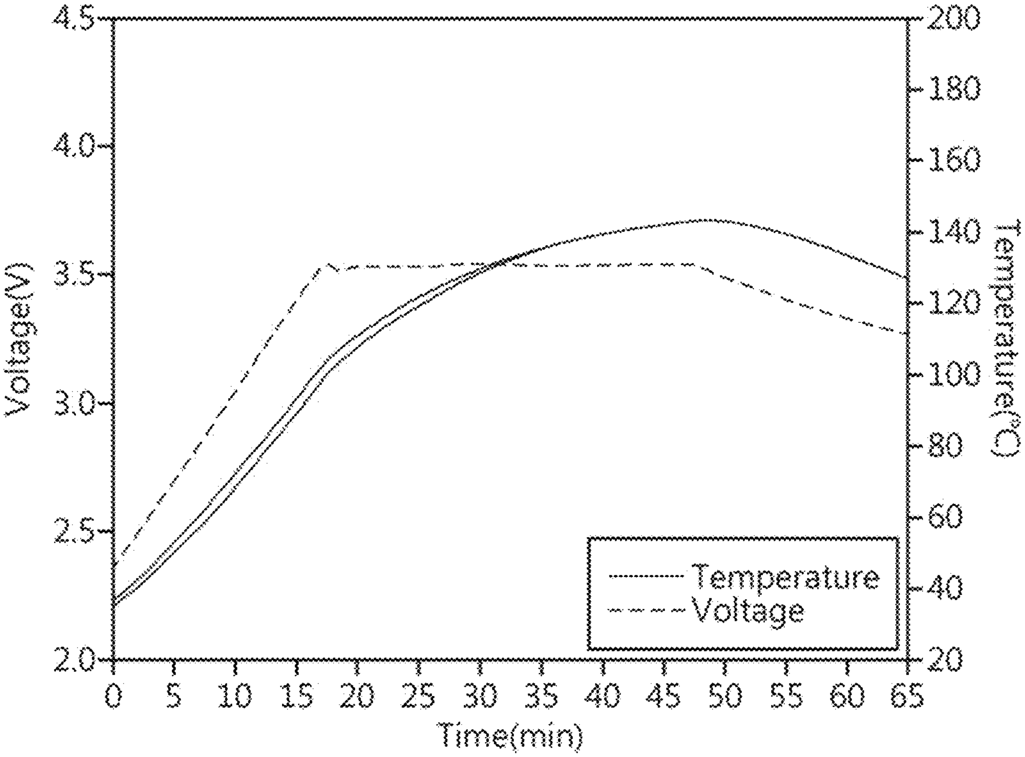
FIG. 36 is a graph showing a hot box test result of a 4680 cell manufactured by Example 1 of the present disclosure.
Figure 37:
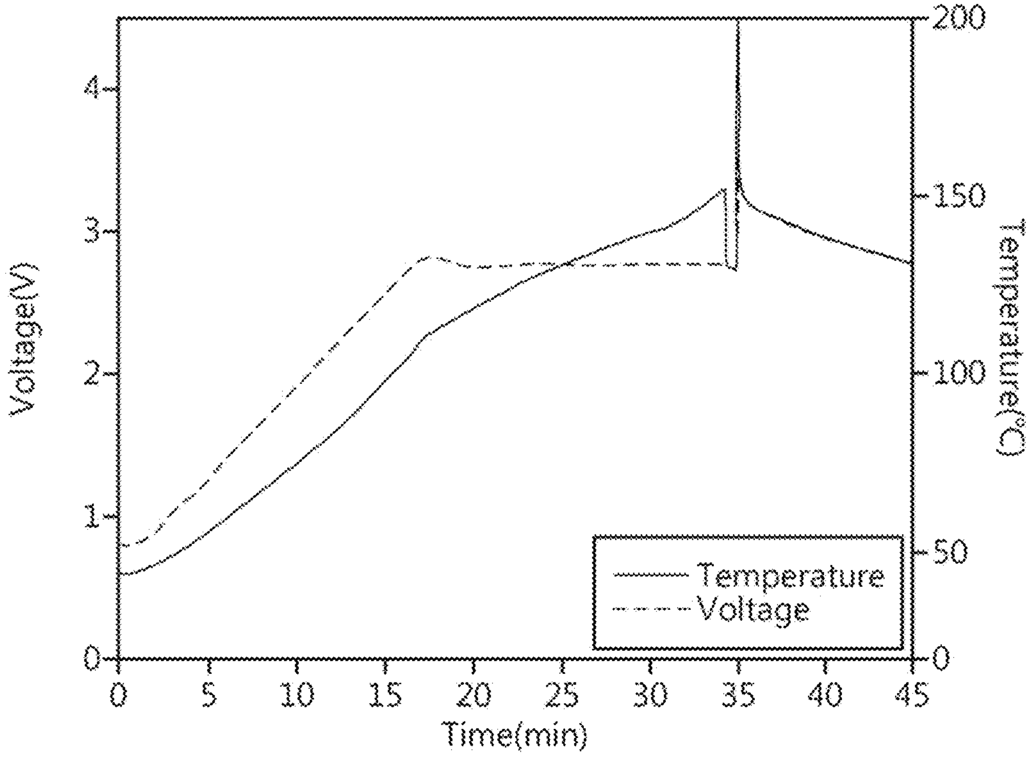
FIG. 37 is a graph showing a hot box test result of a 4680 cell manufactured by Comparative Example 1.

FIG. 36 is a graph showing a hot box test result of the 4680 cell manufactured by Example 1 of the present disclosure, and FIG. 37 is a graph showing a hot box test result of the 4680 cell manufactured by Comparative Example 1.

Through FIGS. 36 and 37, it may be found that in the case of the lithium secondary battery of Example 1 using the single particle positive electrode active material, the voltage and temperature of the battery were maintained stably until 65 minutes, whereas in the lithium secondary battery of Comparative Example 1, the temperature of the battery rapidly increased after 35 minutes.

Example 2-1

Figure 33:
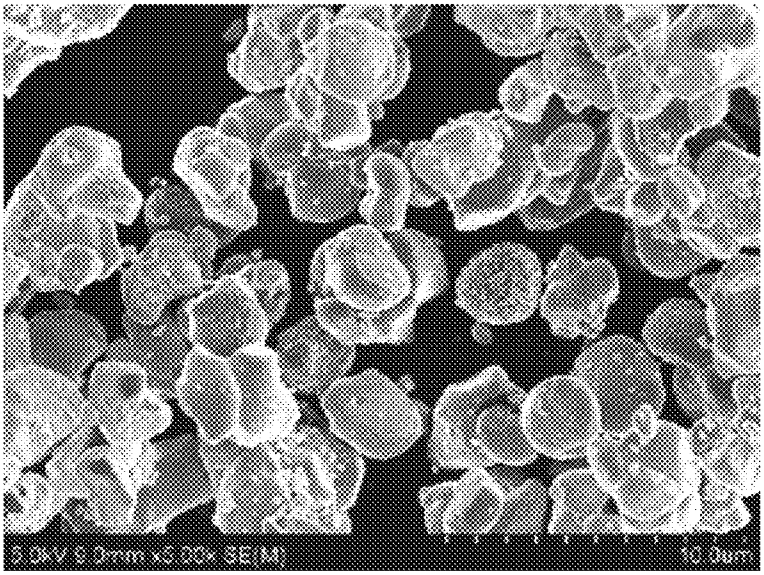
FIG. 33 is a SEM picture showing a positive electrode active material used in Example 2-1 of the present disclosure.

A positive electrode active material (composition:$Li[Ni_{0.9}Co_{0.06}Mn_{0.03}Al_{0.01}]O_2$), which has a unimodal particle size distribution where $D_{min}$=1.78 μm, $D_{50}$=4.23 μm, and $D_{max}$=13.1 μm and in which single particles and pseudo-single particles were mixed was prepared. FIG. 33 shows a SEM picture of the positive electrode active material used in Example 2-1.

The positive electrode active material:carbon nanotube: PVDF binder were mixed in N-methyl pyrrolidone at a weight ratio of 97.8:0.6:1.6 to prepare a positive electrode slurry. The positive electrode slurry was coated on one surface of an aluminum current collector sheet, dried at 120° C., and then rolled to prepare a positive electrode.

A negative electrode active material (graphite:SiO=95:5 mixture by weight) conductive material (super C):styrene-butadiene rubber (SBR):carboxymethyl cellulose (CMC) were mixed in water at a weight ratio of 96:2:1.5:0.5 to prepare a negative electrode slurry. The negative electrode slurry was coated on one surface of a copper current collector sheet, dried at 150° C., and then rolled to prepare a negative electrode.

A separator was interposed between the positive electrode and the negative electrode prepared as above, stacked in the order of separator/positive electrode/separator/negative electrode, and then wound to prepare a jelly-roll type electrode assembly. The electrode assembly prepared as described above was inserted into a battery housing, and an electrolyte was injected thereto to prepare a 4680 cell.

Example 2-2

Figure 34:
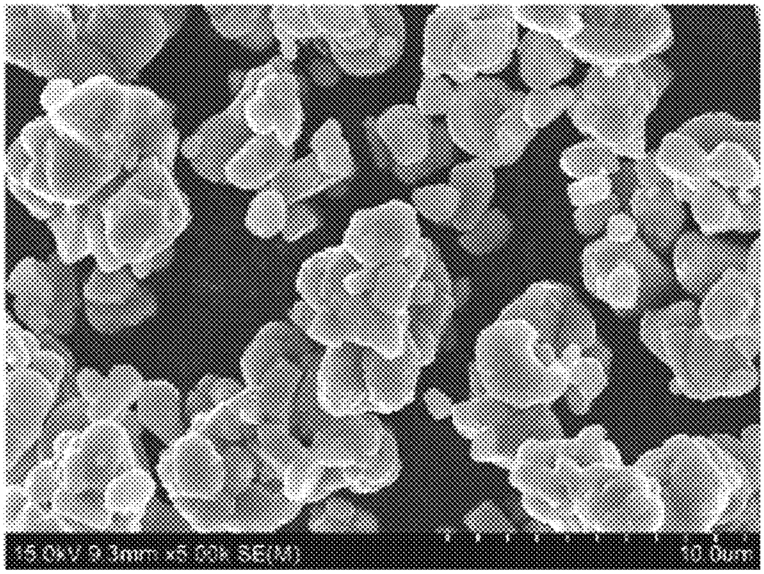
FIG. 34 is a SEM picture showing a positive electrode active material used in Example 2-2 of the present disclosure.

A 4680 cell was manufactured in the same manner as in Example 2-1, except that a positive electrode active material (composition:$Li[Ni_{0.9}Co_{0.06}Mn_{0.02}Al_{0.01}]O_2$), which has a unimodal particle size distribution where $D_{min}$=1.38 μm, $D_{50}$=4.69 μm, and $D_{max}$=18.5 μm and in which single particles and pseudo-single particles were mixed was used as the positive electrode active material. FIG. 34 shows a SEM picture of the positive electrode active material used in Example 2-2.

Comparative Example 2-1

A 4680 cell was manufactured in the same manner as in Example 2-1, except that a secondary particle type positive electrode active material (composition: $Li[Ni_{0.9}Co_{0.05}Mn_{0.04}Al_{0.01}]O_2$) having a bimodal particle size distribution with a large particle average diameter $D_{50}$ of 9 μm and a small particle average diameter $D_{50}$ of 4 μm was used as the positive electrode active material.

Comparative Example 2-2

A 4680 cell was manufactured in the same manner as in Example 2-1, except that a positive electrode active material (composition:$Li[Ni_{0.9}Co_{0.06}Mn_{0.03}Al_{0.01}]O_2$), which has a unimodal particle size distribution where $D_{min}$=0.892 μm $D_{50}$=3.02 μm, and $D_{max}$=11 μm and in which single particles and pseudo-single particles were mixed was used as the positive electrode active material.

Figure 35:
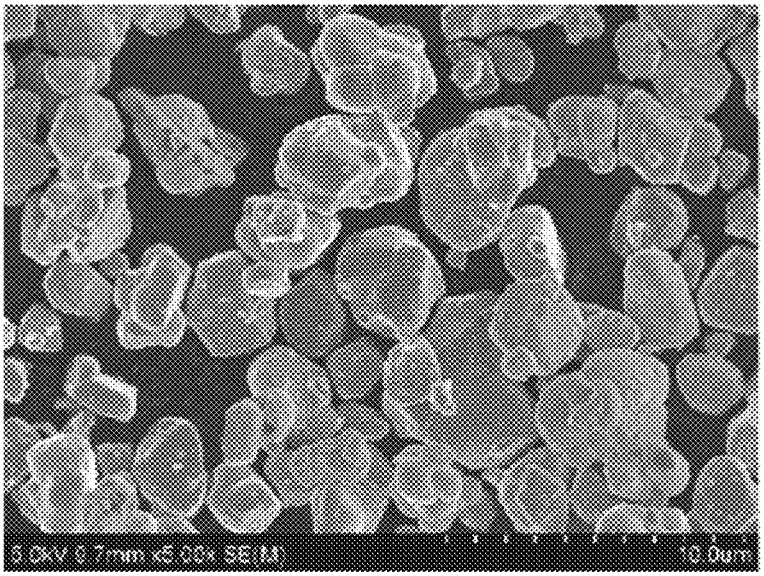
FIG. 35 is a SEM picture showing a positive electrode active material used in Comparative Example 2-2 of the present disclosure.

FIG. 35 shows a SEM picture of the positive electrode active material used in Comparative Example 2-2.

Experimental Example 2-1

A hot box test was performed on the 4680 cells manufactured by Examples 2-1 and 2-2 and Comparative Examples 2-1 and 2-2.

Specifically, each of the 4680 cells manufactured by Example 2-1 and Comparative Example 2-1 was placed in a hot box chamber at room temperature, heated up to 130° C. at a heating rate of 5° C./min, and maintained for 30 minutes, and then the temperature change of the cell was measured. A case in which thermal runaway and ignition did not occur during the test was marked as Pass, and a case in which thermal runaway and/or ignition occurred was marked as Fail. Also, for the accuracy of the test, the test was performed more than twice for the cells of Examples 2-1 and 2-2.

Figure 38:
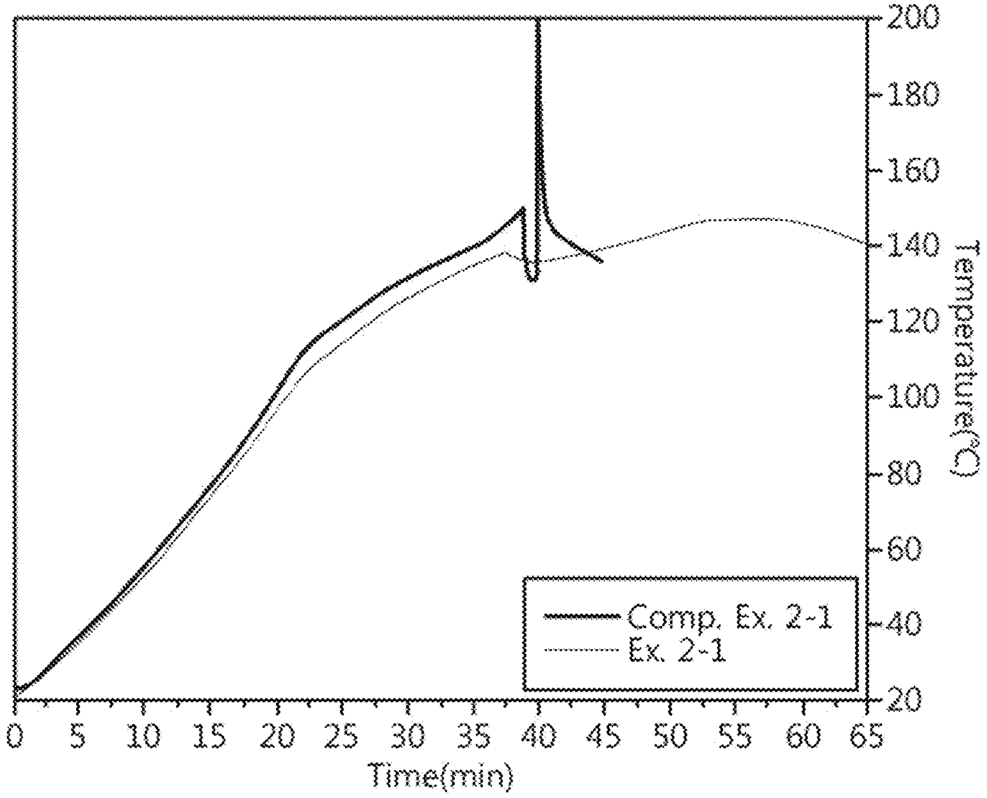
FIG. 38 is a graph showing hot box test results of Sample 1 of Example 2-1 of the present disclosure and a 4680 cell manufactured by Comparative Example 2-1.

Measurement results are shown in Table 1 below and FIGS. 38 and 39. FIG. 38 is a graph showing hot box test results of Sample 1 of Example 2-1 and the 4680 cell manufactured by Comparative Example 2-1, and FIG. 39 is a graph showing hot box test results of Samples 2 and 3 of Example 2-1, Samples 1 and 2 of Example 2-2, and the 4680 cell manufactured by Comparative Example 2-2.

TABLE 1

| | Sample # | Venting time (min) | Maximum temperature (° C.) | Hot box test result |
|---|---|---|---|---|
| Example 2-1 | 1 | 16 | 139 | Pass |
| | 2 | 20.9 | 141 | Pass |
| | 3 | 23.7 | 137 | Pass |
| Example 2-2 | 1 | 16.0 | 148 | Pass |
| | 2 | 15.8 | 147 | Pass |
| Comparative Example 2-1 | 1 | 17 | not measurable | Fail |
| Comparative Example 2-2 | 1 | 16.2 | not measurable | Fail |

Figure 39:
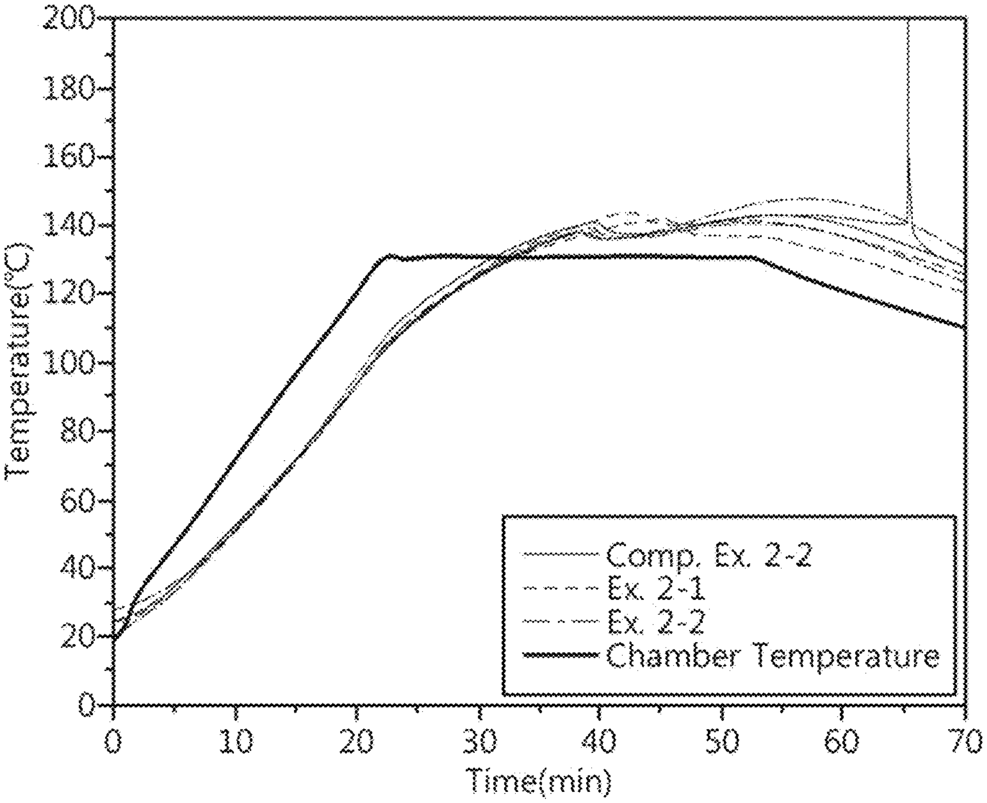
FIG. 39 is a graph showing hot box test results of Samples 2 and 3 of Example 2-1 of the present disclosure, Samples 1 and 2 of Example 2-2, and a 4680 cell manufactured by Comparative Example 2-2.

Referring to Table 1 and FIGS. 38 and 39, it may be found that, in the case of the 4680 cell of Example 2-1 to which the positive electrode active material in the form of a single particle/pseudo-single particle with $D_{min}$ of 1.0 μm or more was applied, the voltage and temperature of the battery were maintained stably until 65 minutes, while in the case of the 4680 cells of Comparative Example 2-1 in which a secondary particle was applied as the positive electrode active material and Comparative Example 2-2 in which a positive electrode active material in the form of a single particle/pseudo-single particle with $D_{min}$ of less than 1.0 μm was applied, the battery temperature of the 4680 cell rapidly increased.

Experimental Example 2-2

Figure 40:
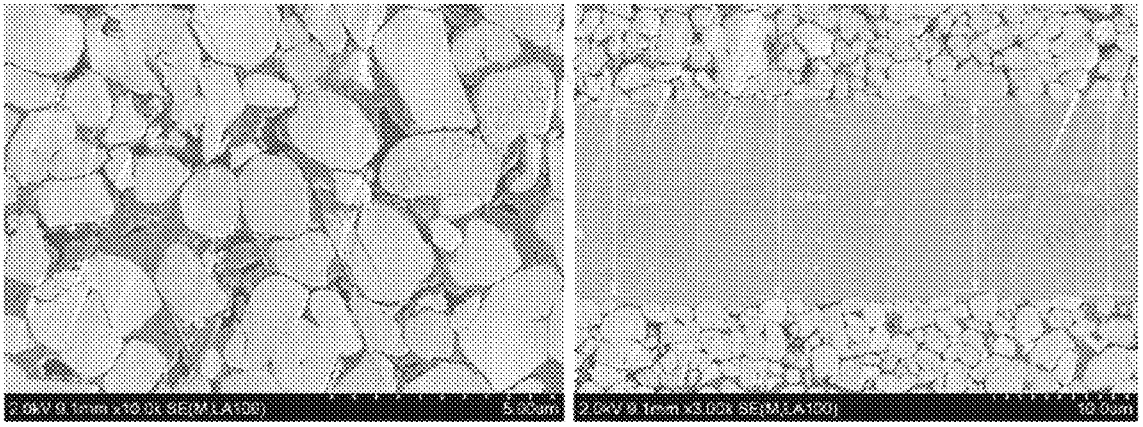
FIG. 40 is a cross-sectional SEM picture of the positive electrode manufactured in Example 2-1 of the present disclosure.

After rolling the positive electrodes manufactured in Example 2-1 and Comparative Example 2-1, in order to check the degree of breakage of the positive electrode active material particles, the positive electrode was cut with an ion milling device and the cross section was photographed with a SEM. FIG. 40 shows a cross-sectional SEM picture of the positive electrode manufactured in Example 2-1, and FIG. 41 shows a cross-sectional SEM picture of the positive electrode manufactured in Comparative Example 2-1.

Figure 41:
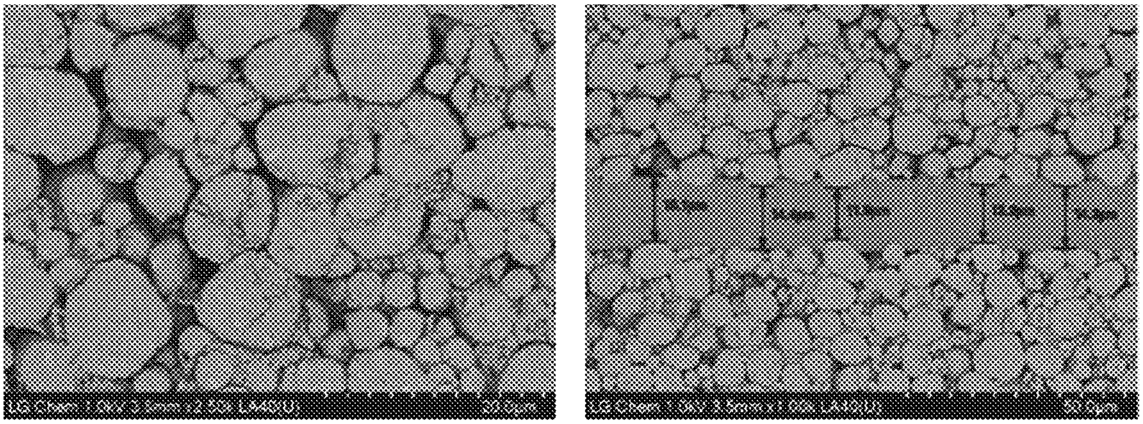
FIG. 41 is a cross-sectional SEM picture of the positive electrode manufactured in Comparative Example 2-1.

Through FIGS. 40 and 41, the positive electrode of Example 2-1 has almost no particle breakage of the positive electrode active material even after rolling, whereas in the positive electrode of Comparative Example 2-2 using secondary particles, a number of cracks were observed in the particles of the positive electrode active material after rolling.

Example 3-1

A positive electrode active material powder (composition: $Li[Ni_{0.9}Co_{0.06}Mn_{0.03}Al_{0.01}]O_2$), which has a unimodal particle size distribution where $D_{min}$=1.78 $D_{min}$, $D_{50}$=4.23 μm, $D_{max}$=13.1 μm and in which single particles and pseudo-single particles were mixed, flake graphite (SFG6L), conductive material (multi-wall carbon nanotube), and PVDF binder were mixed in N-methyl pyrrolidone at a weight ratio of 96.3:1.5:0.4:1.8 to prepare a positive electrode slurry. The positive electrode slurry was coated on one surface of an aluminum current collector sheet, dried, and rolled at a linear pressure of 3.0 ton/cm to prepare a positive electrode. The porosity of the positive electrode active material layer of the positive electrode prepared as described above was measured, and the porosity was measured to be 17.5%.

Example 3-2

A positive electrode was manufactured in the same manner as in Example 3-1, except that the positive electrode active material, flake graphite, conductive material, and binder were mixed in a weight ratio of 97.2:0.6:0.4:1.8, and the porosity of the positive electrode active material layer was measured. The porosity of the positive electrode active material layer was measured to be 19%.

Example 3-3

A positive electrode was manufactured in the same manner as in Example 3-1, except that the positive electrode active material, flake graphite, conductive material, and binder were mixed in a weight ratio of 97.4:0.4:0.4:1.8, and the porosity of the positive electrode active material layer was measured. The porosity of the positive electrode active material layer was measured to be 20%.

Example 3-4

A positive electrode was manufactured in the same manner as in Example 3-1, except that the positive electrode active material, flake graphite, conductive material, and binder were mixed in a weight ratio of 97.6:0.2:0.4:18, and the porosity of the positive electrode active material layer was measured. The porosity of the positive electrode active material layer was measured to be 21%.

Comparative Example 3-1

A positive electrode was prepared in the same manner as in Example 3-1, except that the positive electrode slurry was prepared by mixing the positive electrode active material, conductive material, and binder in N-methyl pyrrolidone at a weight ratio of 97.8:0.4:1.8 without adding flake graphite, and the porosity of the positive electrode active material layer was measured. The porosity of the positive electrode active material layer was measured to be 24%.

Comparative Example 3-2

A positive electrode was manufactured in the same manner as in Example 3-1 except that the positive electrode active material, conductive material, and binder were mixed in N-methyl pyrrolidone at a weight ratio of 97.8:0.4:1.8 to prepare a positive electrode slurry, and rolled at a line pressure of 2.0 ton/cm without adding flake graphite, and the porosity of the positive electrode active material layer was measured. The porosity of the positive electrode active material layer was measured to be 30%.

Experimental Example 3-1—Measurement of Charge/Discharge Capacity and Charge/Discharge Efficiency Coin half-cells including the positive electrodes according to Examples 3-1 to 3-4 and Comparative Examples 3-1 and 3-2 were manufactured, charged up to 4.25V under a 0.2 C current condition, and then discharged to 2.5V under a 0.2 C current condition, and the charge capacity (mAh/g) and discharge capacity (mAh/g) of each coin half-cell were measured. The measurement results are shown in Table 2 below.

TABLE 2

| | Add amount of flake graphite (wt %) | Porosity (%) | Charging capacity (mAh/g) | Discharging capacity (mAh/g) | Efficiency (%) |
|---|---|---|---|---|---|
| Example 3-1 | 1.5 | 17.5 | 230.3 | 209.3 | 90.9 |
| Example 3-2 | 0.6 | 19 | 229.4 | 206.9 | 90.2 |
| Example 3-3 | 0.4 | 20 | 230.4 | 207.3 | 90.0 |
| Example 3-4 | 0.2 | 21 | 229.1 | 205.5 | 89.7 |
| Comparative Example 3-1 | 0 | 24 | 229.1 | 204.2 | 89.1 |
| Comparative Example 3-2 | 0 | 30 | 225.4 | 199.7 | 88.6 |

Through Table 2, it may be found that Examples 3-1 to 3-4 using an positive electrode to which flake graphite is added shows lower porosity and excellent capacity characteristics compared to Comparative Examples 3-1 to 3-2.

Experimental Example 3-2—Check Resistance Characteristics

While charging the coin half-cells including the positive electrodes according to Example 3-3, Comparative Example 3-1, and Comparative Example 3-2 to 4.2V, resistance characteristics according to SOC were measured. The experimental results are shown in FIG. 42.

Figure 42:
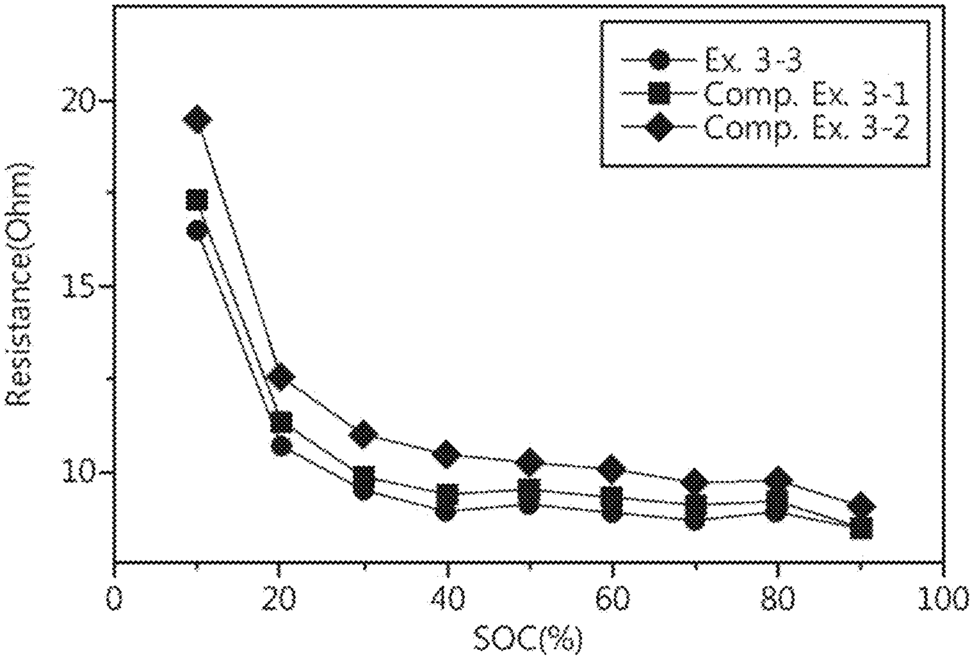
FIG. 42 is a graph showing the results of measuring resistance characteristics according to SOC while charging a coin half-cell including a positive electrode according to Example 3-3 of the present disclosure, Comparative Example 3-1 and Comparative Example 3-2 to 4.2V.

Referring to FIG. 42, it may be found that the resistance value of Example 3-3, in which flake graphite is added to the positive electrode active material layer, is lower than those of Comparative Example 3-1 and Comparative Example 3-2, which do not include flake graphite, based on SOC 10%. This shows that when flake graphite is added to the positive electrode active material layer, resistance characteristics at low SOC are improved.

Experimental Example 3-3—Measurement of High-Temperature Life Characteristics and Resistance Increase Rate A separator was interposed between the positive electrode and the negative electrode according to Example 3-1, Example 3-3, and Comparative Example 3-1, and stacked in the order of separator/positive electrode/separator/negative electrode, and then wound to prepare a jelly-roll type electrode assembly. The electrode assembly prepared as described above was inserted into a cylindrical battery housing, and then an electrolyte was injected thereto to manufacture a 4680 cell.

At this time, a negative electrode active material (graphite:SiO=95:5 mixture by weight):conductive material (super C):styrene-butadiene rubber (SBR):carboxymethyl cellulose (CMC) were mixed in water at a weight ratio of 96:2:1.5:0.5 to prepare a negative electrode slurry, and then the negative electrode slurry was coated on to one surface of a copper current collector sheet, dried at 150° C., and then rolled to prepare a negative electrode.

Based on one cycle in which the 4680 cell prepared as described above was charged to 4.2V at 40° C. at 0.5 C and then discharged to 2.5V at 0.5 C, 50 cycles of charge and discharge were performed, and then capacity retention and resistance increase rate (DCIR increase) were measured. The measurement results are shown in FIG. 43.

Figure 43:
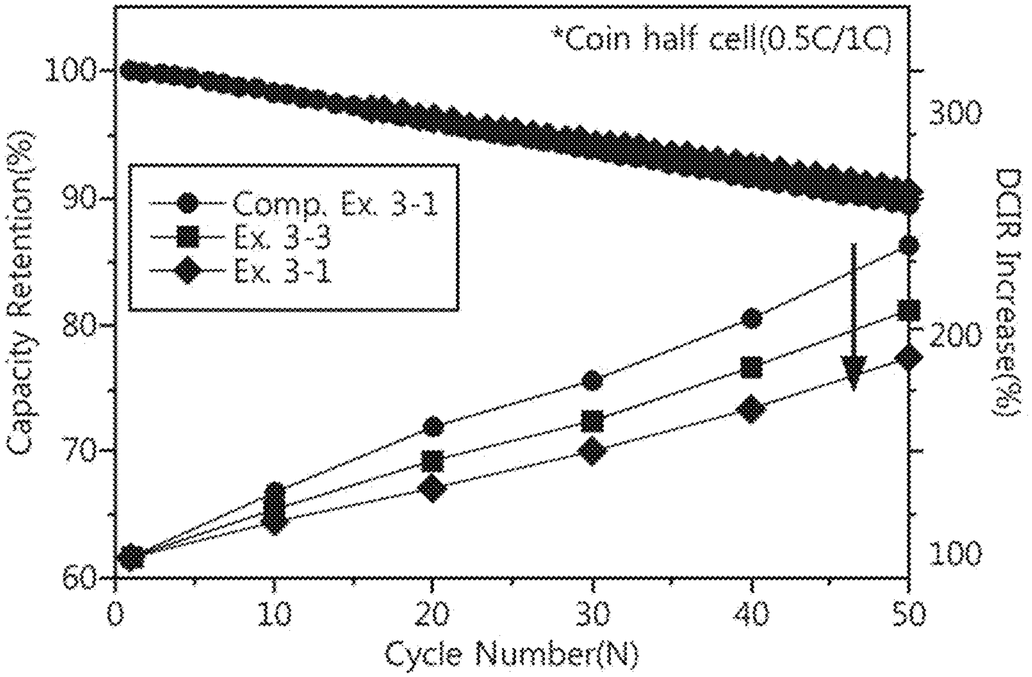
FIG. 43 is a graph showing the measurement result of capacity retention and resistance increase (DCIR increase) obtained through a charge/discharge cycle experiment for a 4680 cell according to Example 3-1 and Example 3-3 of the present disclosure, and Comparative Example 3-1.

Referring to FIG. 43, in the case of the secondary batteries of Examples 3-1 and 3-3, it is shown that the change in capacity retention according to the number of cycles is smaller than that of the secondary battery of Comparative Example 3-1, and the change in resistance increase rate according to the number of cycles is also small.

In the cylindrical battery of the present disclosure, the positive electrode as described above may be the first electrode, and the negative electrode may be the second electrode. In contrast, the positive electrode may be the second electrode, and the negative electrode may be the first electrode.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery, comprising:

an electrode assembly including a first electrode having a first uncoated portion and a second electrode having a second uncoated portion;

a battery housing configured to accommodate the electrode assembly through an open portion;

a current collecting plate having a support portion disposed on a first surface of the electrode assembly, a plurality of uncoated portion coupling portions extending from the support portion and coupled to the first uncoated portion, and a plurality of first housing coupling portions extending from the support portion and coupled to an inner surface of the battery housing;

a cap plate configured to cover the open portion;

an electrode terminal riveted through a perforated hole formed in a closed portion of the battery housing provided opposite to the open portion and electrically coupled to the second uncoated portion; and an insulating gasket interposed between the electrode terminal and the perforated hole, wherein the electrode terminal includes:

a body portion inserted into the perforated hole;

an outer flange portion configured to extend along an outer surface of the closed portion of the battery housing from a circumference of the body portion exposed through the outer surface of the closed portion;

an inner flange portion configured to extend from a circumference of the body portion exposed through an inner surface of the closed portion; and a flat portion provided on an inner side of the inner flange portion.

2. The battery according to claim 1, wherein the first housing coupling portion is coupled to a beading portion of the battery housing.

3. The battery according to claim 1, wherein the first housing coupling portion includes:

a first contact portion coupled to the inner surface of the battery housing; and a first connection portion for connecting the support portion and the first contact portion.

4. The battery according to claim 3, wherein at least a part of the first contact portion has a curved shape extending along an inner circumference of the battery housing.

5. The battery according to claim 3, wherein the first connection portion includes a first bending portion in which an extension direction of the first connection portion is changed.

6. The battery according to claim 1, wherein the current collecting plate further includes a second housing coupling portion extending from an end of the uncoated portion coupling portion and coupled to the inner surface of the battery housing.

7. The battery according to claim 6, wherein the second housing coupling portion includes:

a second contact portion coupled to the inner surface of the battery housing; and a second connection portion for connecting the uncoated portion coupling portion and the second contact portion.

8. The battery according to claim 7, wherein at least a part of the second contact portion has a curved shape extending along an inner circumference of the battery housing.

9. The battery according to claim 7, wherein the second connection portion includes a second bending portion in which an extension direction of the second connection portion is changed.

10. The battery according to claim 1, wherein the flat portion of the electrode terminal and the inner surface of the closed portion are parallel to each other.

11. The battery according to claim 1, wherein an angle between the inner flange portion and the inner surface of the closed portion is 0 degrees to 60 degrees.

12. The battery according to claim 1, wherein a recess portion is provided between the inner flange portion and the flat portion.

13. The battery according to claim 12, wherein the recess portion has a cross section of an asymmetric groove.

14. The battery according to claim 13, wherein the asymmetrical groove includes a sidewall of the flat portion and an inclined surface of the inner flange portion connected to an end of the sidewall of the flat portion.

15. The battery according to claim 14, wherein the sidewall of the flat portion is perpendicular to the inner surface of the closed portion.

16. The battery according to claim 1, wherein a thickness of the inner flange portion decreases in a direction extending away from the body portion.

17. The battery according to claim 1, wherein the insulating gasket includes:

an outer gasket interposed between the outer flange portion and the outer surface of the closed portion, and an inner gasket interposed between the inner flange portion and the inner surface of the closed portion, wherein the inner gasket and the outer gasket have different thicknesses depending on positions thereof.

18. The battery according to claim 17, wherein a thickness of the insulating gasket in an area interposed between an inner edge of the perforated hole and the inner flange portion is smaller than a remainder of the insulating gasket.

19. The battery according to claim 18, wherein the inner edge of the perforated hole includes an opposing surface facing the inner flange portion.

20. The battery according to claim 17, wherein the inner gasket extends further from the electrode terminal than the inner flange portion.

21. The battery according to claim 17, wherein a height of the flat portion from the inner surface of the closed portion is greater than or equal to a height of an end of the inner gasket from the inner surface of the closed portion.

22. The battery according to claim 1, wherein a height of the flat portion from the inner surface of the closed portion is greater than or equal to a height of an end of the inner flange portion from the inner surface of the closed portion.

23. The battery according to claim 1, wherein an active material layer of the second electrode includes a positive electrode active material containing a single particle, a pseudo-single particle, or a combination thereof, wherein $D_{min}$, which a minimum particle size in a cumulative volume distribution of the positive electrode active material, is 1.0 μm or more;

wherein, in the volume cumulative distribution of the positive electrode active material, $D_{50}$, which is a particle size when a volume cumulative amount is 50%, is 5.0 μm or less, and wherein, $D_{max}$, which is a maximum particle size in the volume cumulative distribution of the positive electrode active material, is 12 μm to 17 μm.

24. The battery according to claim 23, wherein the positive electrode active material has a unimodal particle size distribution showing a single peak in a volume cumulative particle size distribution graph, and the particle size distribution (PSD) represented by the following formula is 3 or less:

$$PSD=(D_{max}-D_{min})/D_{50}.$$

25. The battery according to claim 23, wherein the single particle, the pseudo-single particle, or the combination thereof is included in an amount of 95 wt % to 100 wt % based on a total weight of the positive electrode active material included in the active material layer of the first-second electrode.

26. The battery according to claim 23, wherein the positive electrode active material includes a lithium nickel-based oxide containing 80 mol % or more of Ni based on the total number of moles of a transition metal.

27. The battery according to claim 23, wherein the active material layer of the second electrode has a porosity of 15% to 23%, and the active material layer of the second electrode contains flake graphite in a weight ratio of 0.05 wt % to 5 wt %.

28. The battery according to claim 23, wherein the active material layer of the second electrode further contains carbon nanotubes.

29. The battery according to claim 23, wherein an active material layer of the first electrode includes a silicon-based negative electrode active material and a carbon-based negative electrode active material, and wherein the silicon-based negative electrode active material and the carbon-based negative electrode active material are included in a weight ratio of 1:99 to 20:80.

30. A battery pack, comprising:

a plurality of batteries according to claim 1; and a pack housing configured to accommodate the plurality of batteries.

31. A vehicle, comprising the battery pack according to claim 30.

* * * * *